United States Patent
Takashima et al.

(10) Patent No.: US 8,150,231 B2
(45) Date of Patent: Apr. 3, 2012

(54) DATA PROCESSING METHOD, DATA PROCESSING APPARATUS, INFORMATION RECORDING MEDIUM AND COMPUTER PROGRAM CROSS REFERENCES TO RELATED APPLICATIONS

(75) Inventors: Yoshikazu Takashima, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1631 days.

(21) Appl. No.: 11/093,066

(22) Filed: Mar. 28, 2005

(65) Prior Publication Data

US 2005/0238323 A1    Oct. 27, 2005

(30) Foreign Application Priority Data

Mar. 29, 2004  (JP) ................................. 2004-094657
Nov. 5, 2004   (JP) ................................. 2004-323009

(51) Int. Cl.
  *H04N 9/80*   (2006.01)
  *H04N 5/94*   (2006.01)
  *H04N 9/88*   (2006.01)
  *H04N 5/84*   (2006.01)
  *H04N 5/89*   (2006.01)

(52) U.S. Cl. ........ 386/239; 386/263; 386/333; 386/353; 386/356

(58) Field of Classification Search .................... 386/95, 386/96, 119, 124, 125, 126, 239, 263, 333, 386/337–341, 353–357
See application file for complete search history.

(56) References Cited

U.S. PATENT DOCUMENTS

| | | | | |
|---|---|---|---|---|
| 6,122,436 | A  * | 9/2000 | Okada et al. ................... | 386/126 |
| 2004/0105351 | A1* | 6/2004 | Ueki ........................... | 369/30.23 |
| 2006/0156358 | A1* | 7/2006 | Adolph et al. .................. | 725/90 |
| 2008/0226265 | A1* | 9/2008 | Takashima et al. ............ | 386/126 |

FOREIGN PATENT DOCUMENTS

| | | |
|---|---|---|
| JP | 8-107541 | 4/1996 |
| JP | 8-336102 | 12/1996 |
| JP | 10-27461 | 1/1998 |
| JP | 11-126427 | 5/1999 |

(Continued)

OTHER PUBLICATIONS

Office Action issued Aug. 3, 2010, in Japan Patent Application No. 2004-323009.

*Primary Examiner* — Thai Tran
*Assistant Examiner* — Hung Dang
(74) *Attorney, Agent, or Firm* — Oblon, Spivak, McClelland, Maier & Neustadt, L.L.P.

(57) ABSTRACT

There is provided an apparatus and a method determining a data arrangement that guarantees seamless reproduction even in a case of occurrence of a jump in a browsable slide show. An allowable jump range between an image data clip and an audio data clip required for data reading in the browsable slide show in which a consecutive reproduction processing of a still image and an audio reproduction processing are performed in parallel is determined so as to determine arrangement conditions of data to be stored in an information recording medium on the basis of the determined allowable jump range. This configuration enables the browsable slide show to be carried out as a seamless reproduction processing without any data discontinuity. Furthermore, it becomes possible to provide a plurality of combinations of readout rates of the audio data and image data.

1 Claim, 32 Drawing Sheets

FOREIGN PATENT DOCUMENTS

| | | |
|---|---|---|
| JP | 11-144378 | 5/1999 |
| JP | 11-177934 | 7/1999 |
| JP | 2001-67798 | 3/2001 |
| JP | 2002-158974 | 5/2002 |
| JP | 2003-30838 | 1/2003 |
| JP | 2003-174622 | 6/2003 |
| JP | 2003-259303 | 9/2003 |
| WO | WO 02/23896 A1 | 3/2002 |
| WO | WO 2004/023485 | 3/2004 |

\* cited by examiner

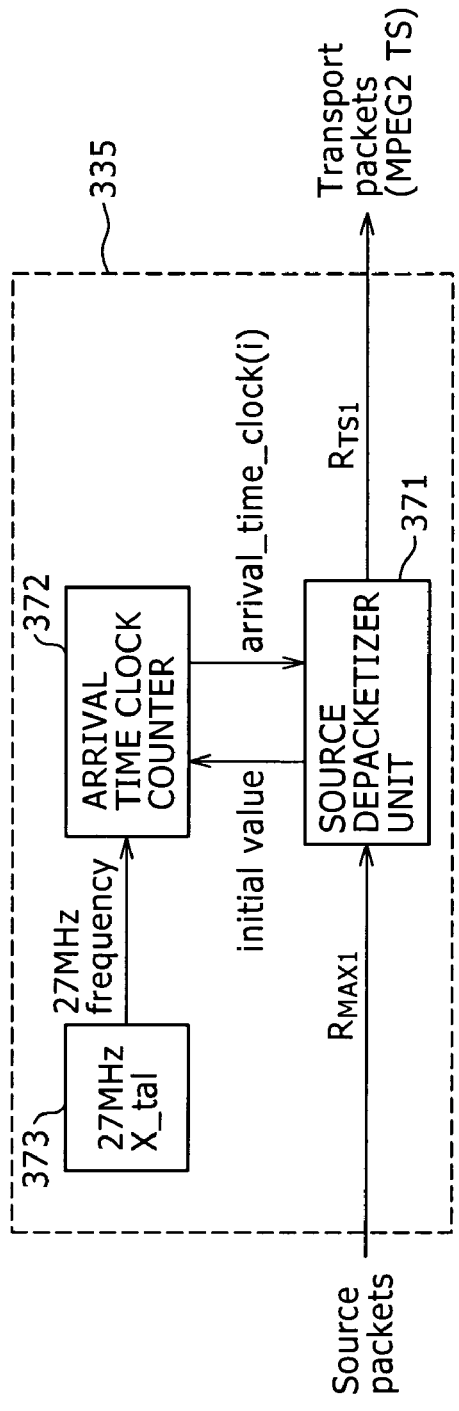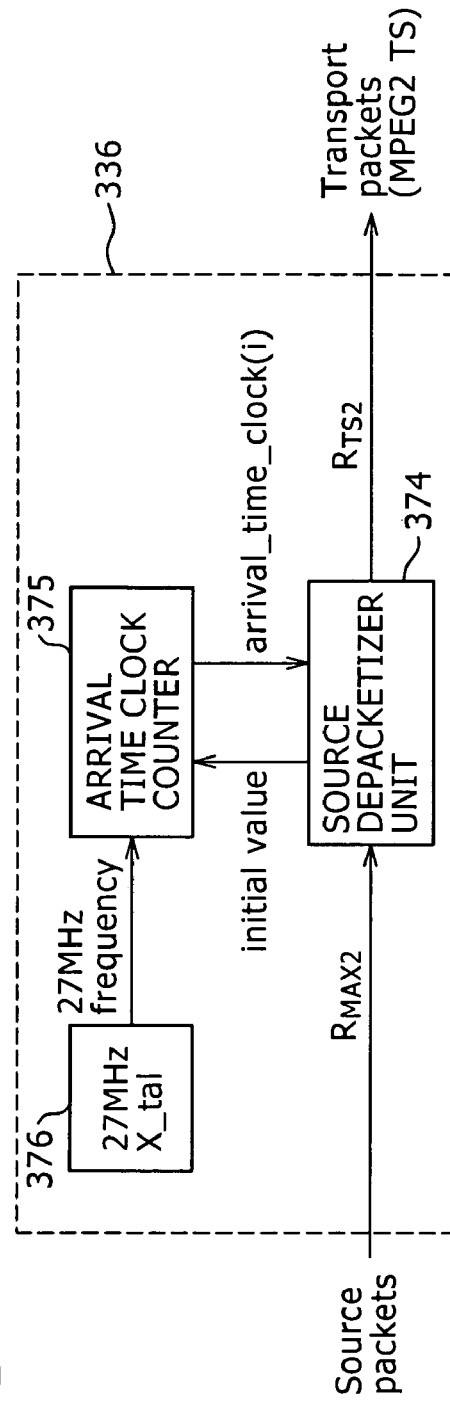

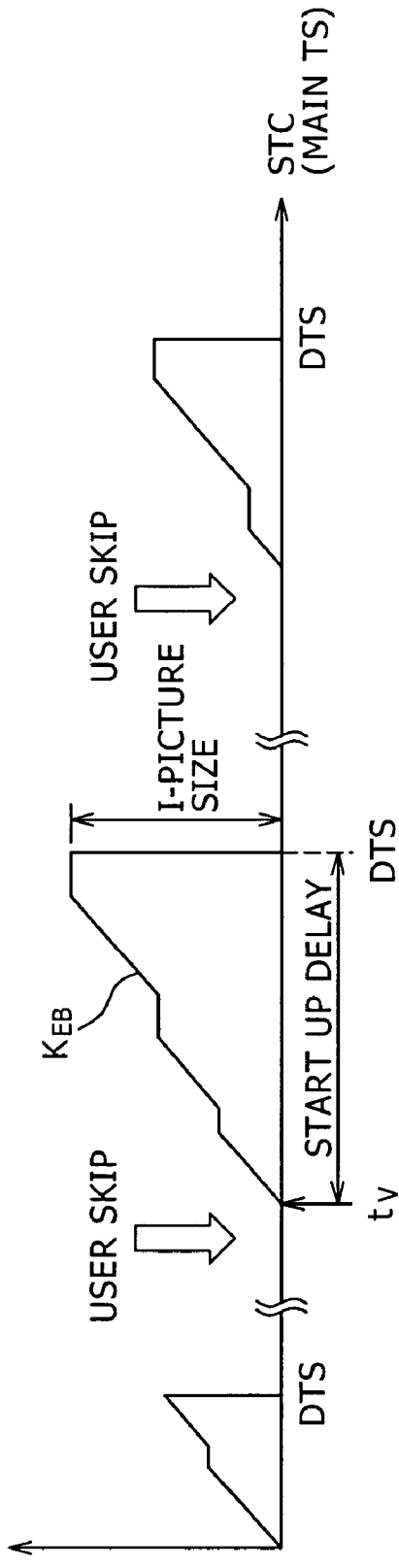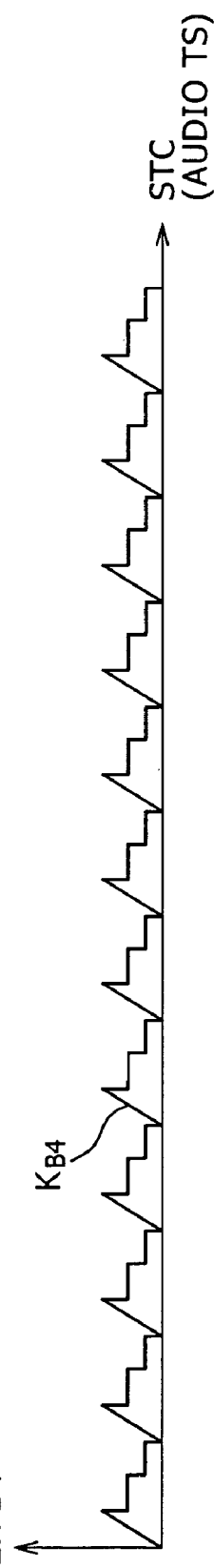

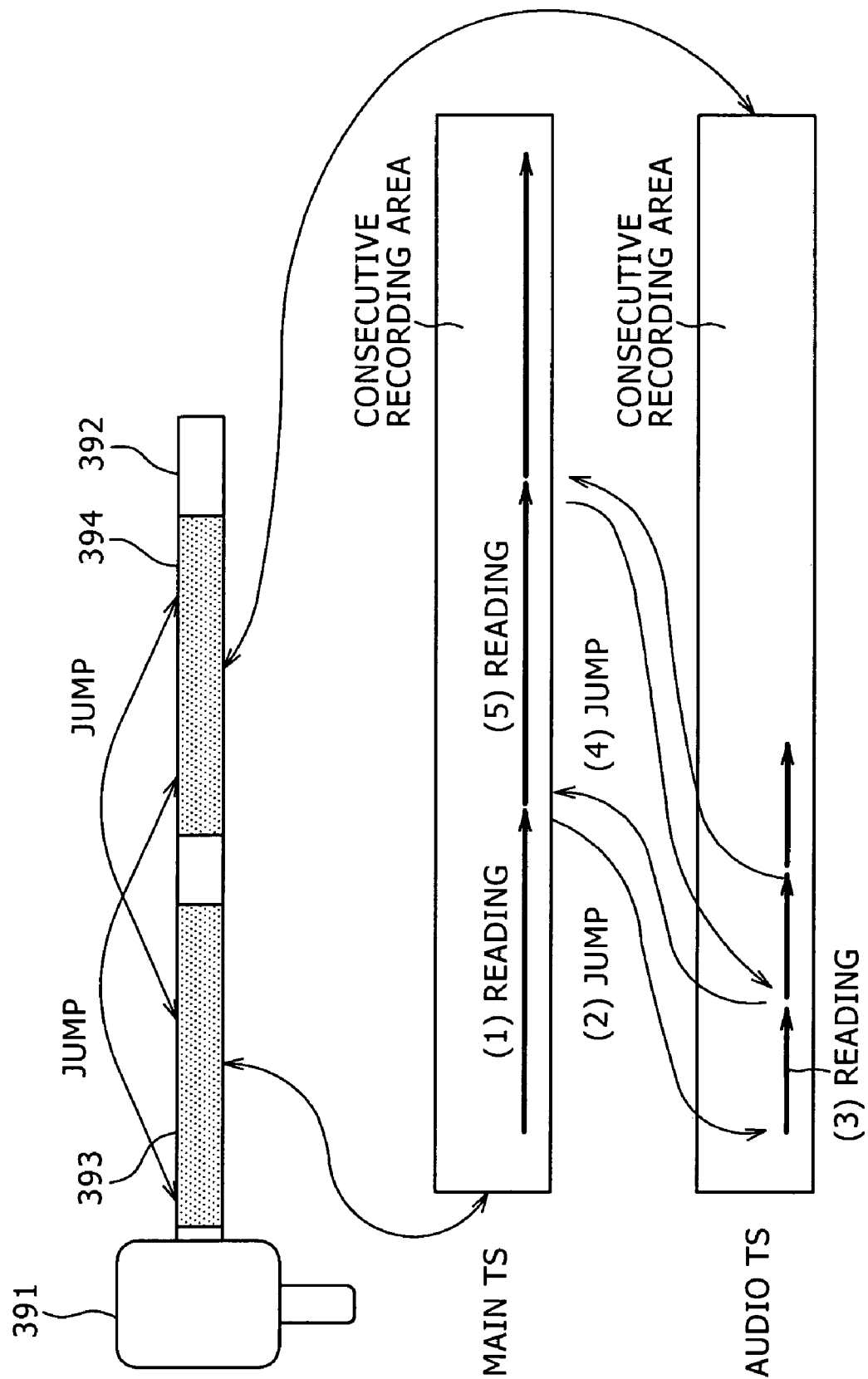

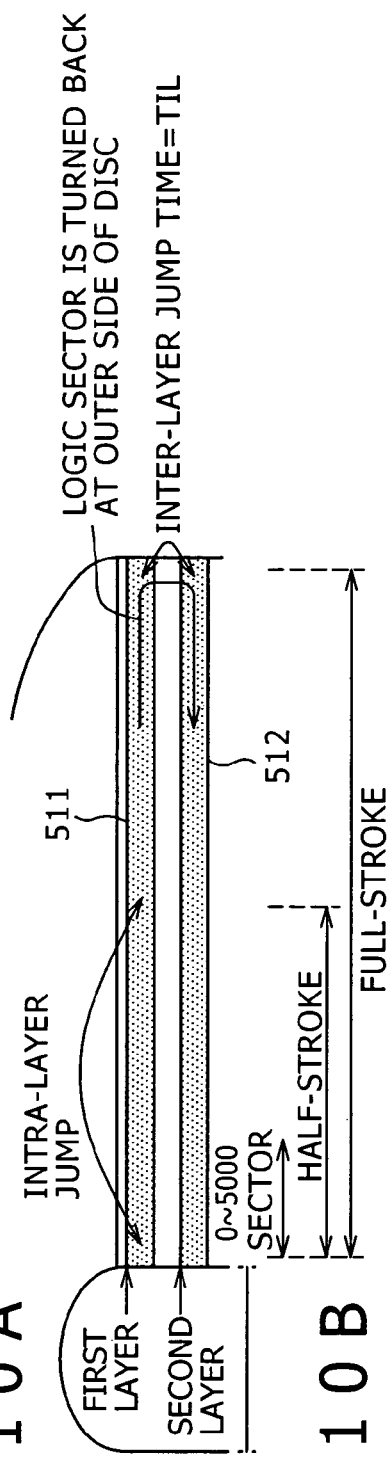

INTRA-LAYER JUMP TIME $T_{ACC}$

| JUMP DISTANCE | 0-5000 SECTOR | 5000-10000 SECTOR | 10000-20000 SECTOR | 20000-40000 SECTOR | 1/10 STROKE | 1/3 STROKE | HALF-STROKE | FULL-STROKE |
|---|---|---|---|---|---|---|---|---|
| JUMP DATA SIZE [×$2^{20}$byte] | 0~10 | 10~20 | 20~40 | 40~80 | 1278~ | 5078~ | 8491~ | 23300 |
| INTRA-LAYER JUMP TIME TACC [ms] | 179 | 210 | 270 | 330 | 650 | 880 | 990 | 1220 |

FIG. 10C INTER-LAYER JUMP TIME $T_{IL}$ =360[ms]

FIG. 10D OVERHEAD TIME CAUSED AT READING OF ECC BLOCK BOUNDARY $T_{OH}$=20[ms]

TIME DATA SUPPLY IS STOPPED IN OCCURRENCE OF INTER-LAYER JUMP
$T_{JUMP}$= $T_{ACC}$+ $T_{IL}$ + $T_{OH}$
IN CASE OF Full-stroke INVOLVING INTER-LAYER JUMP
$T_{JUMP}$= 1220m s+ 360ms+ 20ms = 1600ms

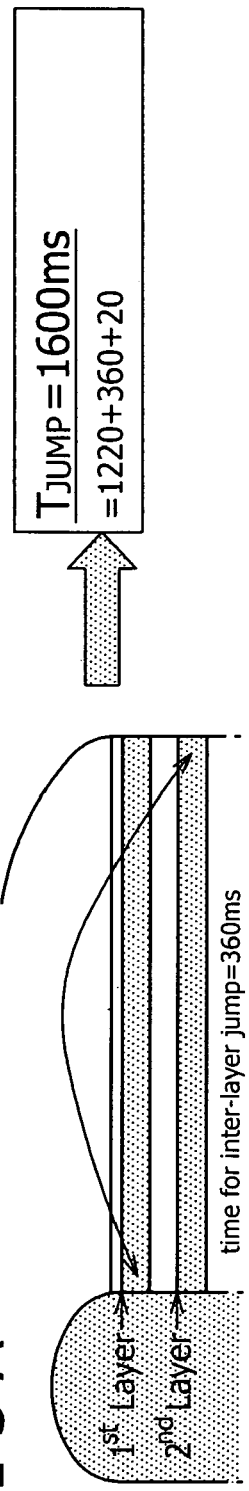

FIG. 13A FULL-STROKE INTER-LAYER JUMP $T_{JUMP}$=1600ms
=1220+360+20 time for inter-layer jump=360ms
time for ECC overhead=20ms

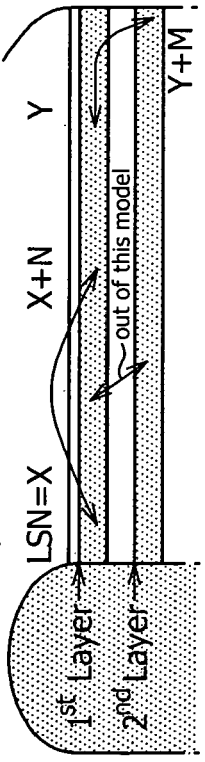

FIG. 13B HALF-STROKE IDENTICAL INTRA-LAYER JUMP, 1/10-STROKE INTER-LAYER JUMP

Max. Jump distance:
N logical sectors for intra-layer
M logical sectors for inter-layer $T_{JUMP}$=1030ms
intra: 990+20=1010ms
inter: 650+360+20=1030ms N=sector number for Half-stroke,inner area=about 8.2GB/2048
M=sector number for 1/10-stroke,outer area=about 3GB/2048

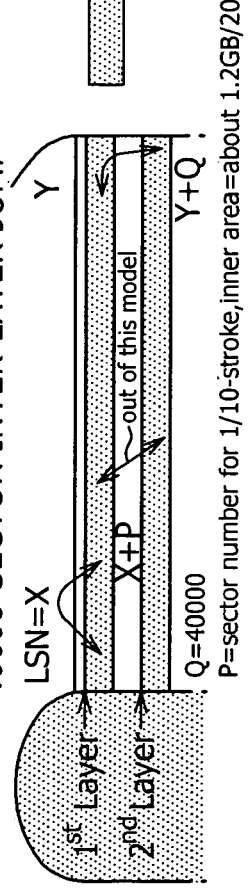

FIG. 13C 1/10-STROKE IDENTICAL INTRA-LAYER JUMP, 40000-SECTOR INTER-LAYER JUMP

Max. Jump distance:
P logical sectors for intra-layer
40000 logical sectors for inter-layer $T_{JUMP}$=710ms
intra: 650+20=670ms
inter: 330+360+20=710ms Q=40000
P=sector number for 1/10-stroke,inner area=about 1.2GB/2048

FIG. 15

| COMPARISON PARAMETERS | | CASE A | CASE B | CASE C |
|---|---|---|---|---|
| MAXIMUM JUMP TIME [$T_{JUMP}$] | | 1600ms | 1030ms | 710ms |
| BUFFER SIZE [$S_{RB}$] | | 9.36 MByte(*1) | 6.02 MByte | 4.15 Mbyte |
| MINIMUM DATA ARRANGEMENT SIZE REQUIRED TO GUARANTEE CONSECUTIVE SUPPLY OF DATA BEFORE AND BEHIND JUMP [Usize] | DATA RECORDING RATE (=TS_recording_rate × 192/188) | | | |
| | 5 × 192/188 Mbps | 1.1 MByte | 0.7 MByte | 0.5 Mbyte |
| | 10 × 192/188 Mbps | 2.5 MByte | 1.6 MByte | 1.1 Mbyte |
| | 20 × 192/188 Mbps | 6.3 MByte | 4.1 MByte | 2.8 Mbyte |
| | 30 × 192/188 Mbps | 13.6 MByte | 8.7 MByte | 6.0 Mbyte |
| | 40 × 192/188 Mbps | 32.0 MByte | 20.6 MByte | 14.2 Mbyte |
| | 48 × 192/188 Mbps | 101.5 MByte | 65.3 MByte | 45.1 MByte |

(*1) MByte = $2^{20}$ byte

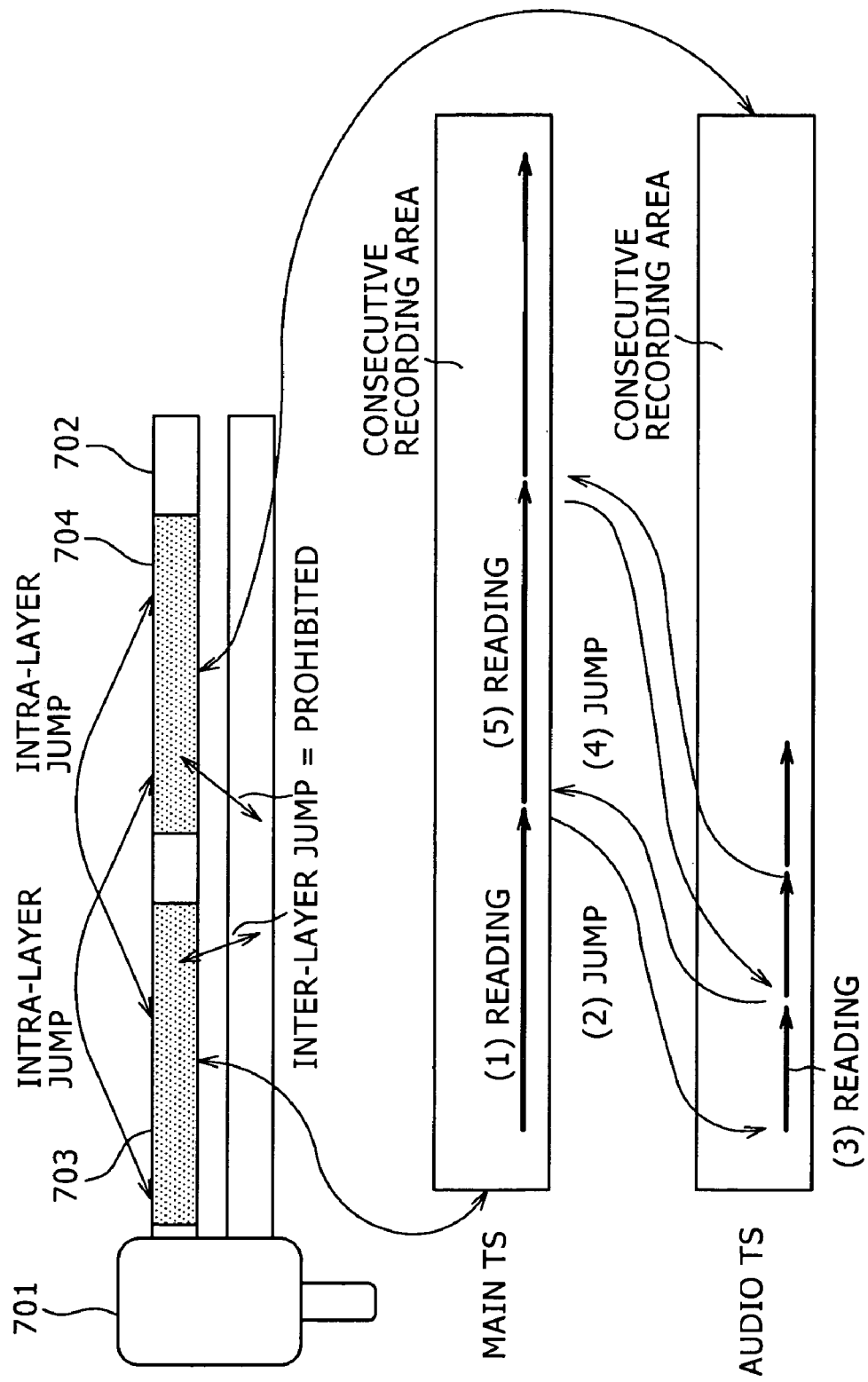

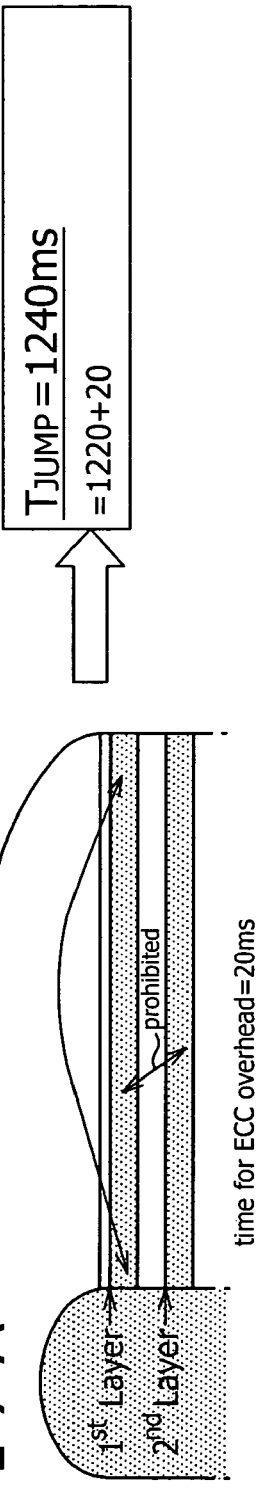
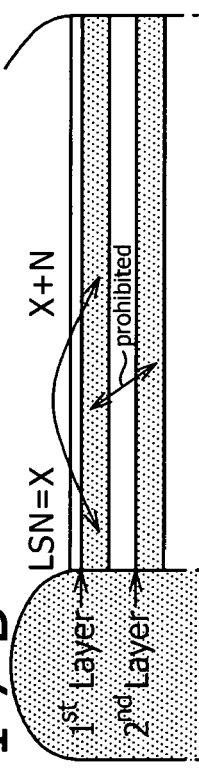
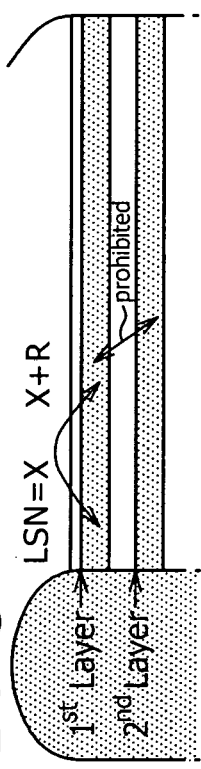

FIG. 17A FULL-STROKE INTRA-LAYER JUMP $T_{JUMP} = 1240\text{ms} = 1220+20$ time for ECC overhead=20ms

FIG. 17B HALF-STROKE INTRA-LAYER JUMP

Max. Jump distance: N logical sectors for intra-layer $T_{JUMP} = 1010\text{ms}$ intra: 990+20=1010ms N=sector number for Half-stroke, inner area=about 8.5GB/2048

FIG. 17C 1/3-STROKE INTRA-LAYER JUMP

Max. Jump distance: P logical sectors for intra-layer 40000 logical sectors for inter-layer $T_{JUMP} = 900\text{ms}$ intra: 880+20=900ms R=sector number for 1/3-stroke, inner area=about 5GB/2048

FIG. 18

COMPARISON OF BROWSABLE SLIDE SHOW BUFFER
SIZE FOR EACH JUMP MODEL $R_{MAX1} = (192/188) \times 15Mbps$ $R_{MAX2} = (192/188) \times 2Mbps$

| | CASE A | CASE D | CASE E | CASE F |
|---|---|---|---|---|
| TJUMP (ref. D.2) | 1600 ms | 1240ms | 1010ms | 900ms |
| Size of RB1(ref. D.5) | 6.17 Mbyte | 4.79 Mbyte | 3.90 Mbyte | 3.48 Mbyte |
| Size of RB2(ref. D.5) | 1105 Kbyte | 857 Kbyte | 698 Kbyte | 622 Kbyte |
| Size of RB1+RB2 | 7.28 Mbyte | 5.64 Mbyte | 4.60 Mbyte | 4.10 Mbyte |

Read buffer size is reduced in the case of D-F (*1)MByte = $2^{20}$byte
(*1)KByte = $2^{10}$byte

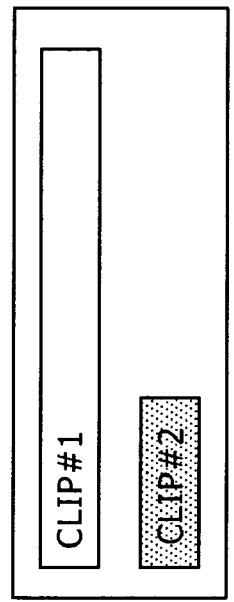
FIG. 19A
FIG. 19B
```
PlayList#1{
  PlayItem[0] : Clip#1
  SubPlayItem[0] : Clip#2 : SubPlayItem_type = 2
}
```
FIG. 19C
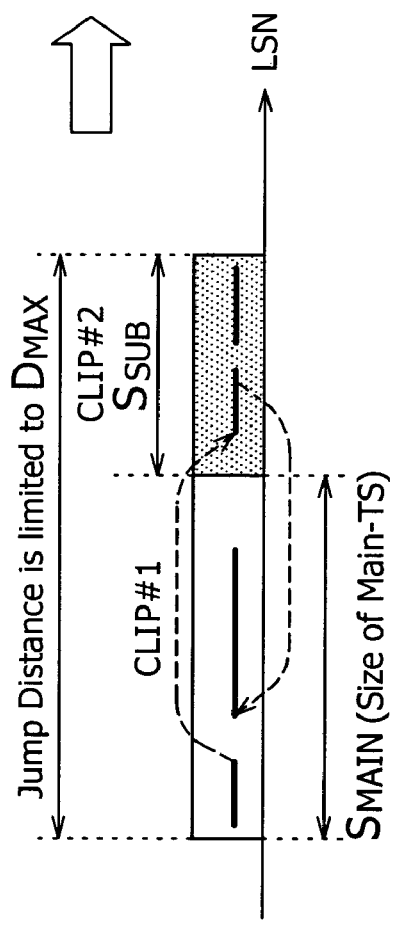

Buffer Size ($R_{TS1} + R_{TS2}$ = 17Mbps)

| Video(Mbps) | Audio(Mbps) | Total Buffer Siz(MB) | | |
|---|---|---|---|---|
| | | Full-Stroke | Half-Stroke | 1/3 stroke |
| 2 | 15 | 5.64 | 4.59 | 4.09 |
| 3 | 14 | 5.84 | 4.76 | 4.24 |
| 4 | 13 | 6.01 | 4.89 | 4.36 |
| 5 | 12 | 6.14 | 5.00 | 4.46 |
| 6 | 11 | 6.24 | 5.09 | 4.53 |
| 7 | 10 | 6.31 | 5.14 | 4.58 |
| 8 | 9 | 6.34 | 5.17 | 4.61 |
| 9 | 8 | 6.34 | 5.17 | 4.61 |
| 10 | 7 | 6.31 | 5.14 | 4.58 |
| 11 | 6 | 6.24 | 5.09 | 4.53 |
| 12 | 5 | 6.14 | 5.00 | 4.46 |
| 13 | 4 | 6.01 | 4.89 | 4.36 |
| 14 | 3 | 5.84 | 4.76 | 4.24 |
| 15 | 2 | 5.64 | 4.59 | 4.09 |

Audio Maximum Bitrate is 15Mbps

767

Buffer Size ($R_{TS1}$ + $R_{TS2}$ = 22Mbps) FIG. 27

| Video(Mbps) | Audio(Mbps) | Total Buffer Siz(MB) | | |
|---|---|---|---|---|
| | | Full-Stroke | Half-Stroke | 1/3 stroke |
| 2 | 20 | 7.42 | 6.05 | 5.39 |
| 4 | 18 | 8.05 | 6.56 | 5.84 |
| 6 | 16 | 8.52 | 6.94 | 6.18 |
| 8 | 14 | 8.83 | 7.19 | 6.41 |
| 10 | 12 | 8.99 | 7.32 | 6.52 |
| 11 | 11 | 9.01 | 7.34 | 6.54 |
| 12 | 10 | 8.99 | 7.32 | 6.52 |
| 14 | 8 | 8.83 | 7.19 | 6.41 |
| 16 | 6 | 8.52 | 6.94 | 6.18 |
| 18 | 4 | 8.05 | 6.56 | 5.84 |
| 20 | 2 | 7.42 | 6.05 | 5.39 |

Audio Maximum Bitrate is 20Mbps
(LPCM 96KHz/24bit/8ch Audio ES = 18.432Mbps can be multiplexed)

Buffer Size ($R_{TS1}$ + $R_{TS2}$ = 32Mbps) FIG. 28

| Video(Mbps) | Audio(Mbps) | Total Buffer Siz(MB) | | |
|---|---|---|---|---|
| | | Full-Stroke | Half-Stroke | 1/3 stroke |
| 2 | 30 | 11.40 | 9.28 | 8.27 |
| 4 | 28 | 12.90 | 10.51 | 9.36 |
| 6 | 26 | 14.17 | 11.55 | 10.29 |
| 8 | 24 | 15.22 | 12.39 | 11.04 |
| 10 | 22 | 16.03 | 13.05 | 11.63 |
| 12 | 20 | 16.60 | 13.52 | 12.05 |
| 14 | 18 | 16.95 | 13.81 | 12.30 |
| 16 | 16 | 17.07 | 13.90 | 12.39 |
| 18 | 14 | 16.95 | 13.81 | 12.30 |
| 20 | 12 | 16.60 | 13.52 | 12.05 |
| 22 | 10 | 16.03 | 13.05 | 11.63 |
| 24 | 8 | 15.22 | 12.39 | 11.04 |
| 26 | 6 | 14.17 | 11.55 | 10.29 |
| 28 | 4 | 12.90 | 10.51 | 9.36 |
| 30 | 2 | 11.40 | 9.28 | 8.27 |

"LPCM 192kHz/24bit/6ch = 27.648Mbps → 30Mbps" is avairable

| $R_{TS1}$ (Mbps) | $R_{TS2}$ (Mbps) |
|---|---|
| 2 | 20 |
| 3 | 18.5 |
| : | : |
| 18.5 | 3 |
| 20 | 2 |

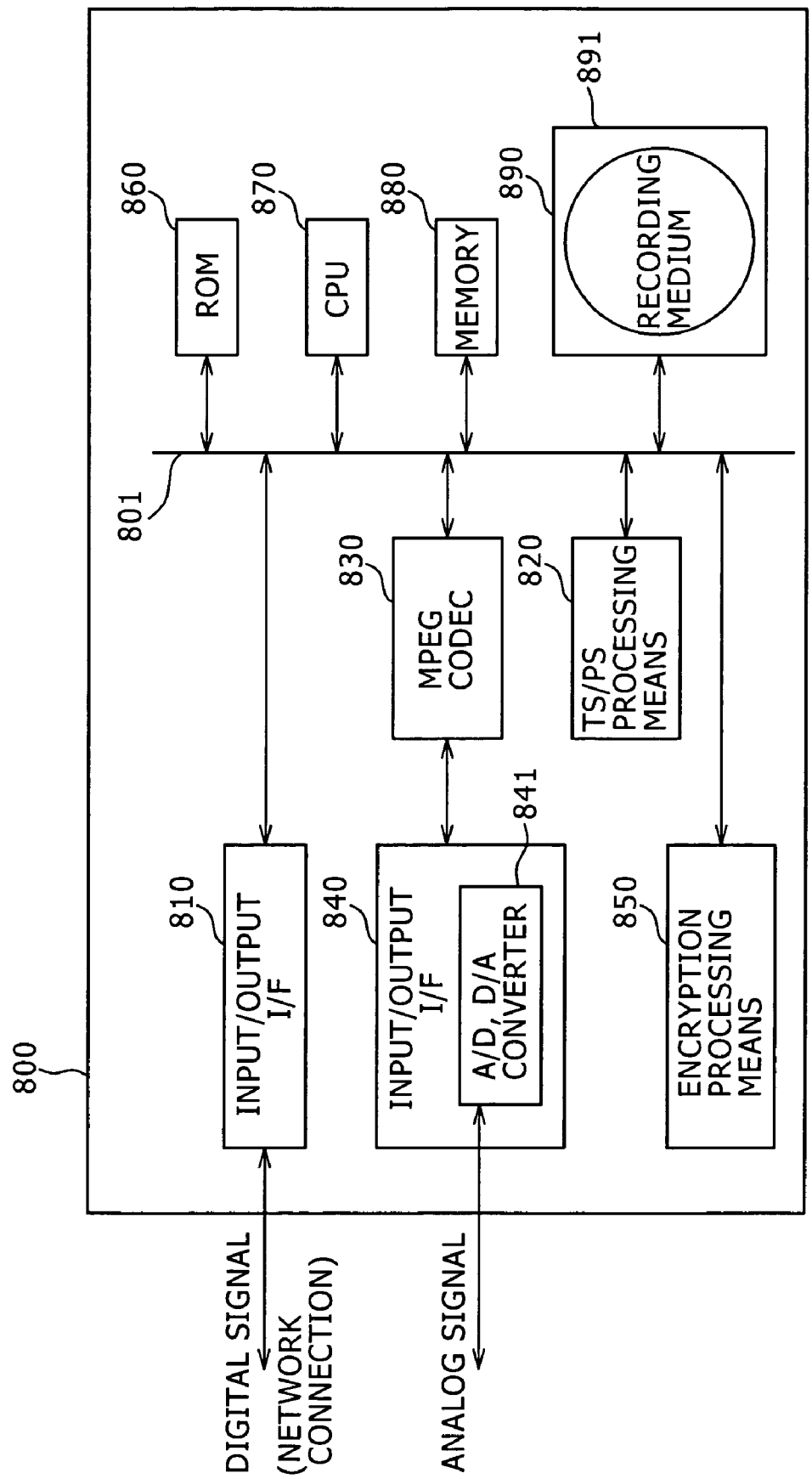

DATA PROCESSING METHOD, DATA PROCESSING APPARATUS, INFORMATION RECORDING MEDIUM AND COMPUTER PROGRAM CROSS REFERENCES TO RELATED APPLICATIONS

CROSS REFERENCES TO RELATED APPLICATIONS

The present document contains a subject matter related to Japanese Patent Applications JP 2004-094657 and JP 2004-323009 filed in the Japanese Patent Office on Mar. 29, 2004 and Nov. 5, 2004, respectively, the entire contents of which being incorporated herein by reference.

BACKGROUND OF THE INVENTION

1. Field of the Invention

The present invention relates to a data processing method, a data processing apparatus, an information recording medium, and a computer program. More specifically, the present invention relates to a data processing method, a data processing apparatus, an information recording medium, and a computer program that, in a content reproduction processing of performing a parallel reproduction of image data and audio data that are contained in different locations of a disc, enable a seamless content reproduction through a prevention of a discontinuity in reproduction caused by a jump processing that occurs in a processing of switching and reading each of the image data and the audio data.

2. Description of Related Art

A recording media including a disc such as a Blu-ray disc obtained by an application of a blue laser or a DVD (Digital Versatile Disc) may contain various software data such as audio data of music etc., image data of movies etc., game programs, and various application programs etc.

There is provided a prescription of data storage formats corresponding to these various data, allowing each data to be stored in conformity with the format of each data.

A consecutive reproduction (a so-called slide show) of a still image is available as one of data reproduction modes. Each still image signal is encoded into an intra-frame encoded image (I-picture) of a MPEG2 (Moving Picture Experts Group 2) video and is multiplexed with a MPEG2 transport stream. Further, a multiplexing of the I-picture, an audio and a sub picture with the MPEG2 transport stream makes it possible to reproduce the audio and the sub picture in synchronization with the slide show. The above slide show is supposed to provide, on the basis of a PTS (Presentation Time Stamp) set as attribute information corresponding to data as time information of a reproduction timing, a reproduction that conforms to a prescribed timing.

To reproduce the audio in parallel with the consecutive reproduction (a browsable slide show) of the still image in a configuration of allowing the image data and the audio data to be individually stored in the disc, it becomes necessary to perform a processing that conforms to a prescribed sequence that the image data and the audio data are alternately read from the disc, and the read data of each of the image data and the audio data is stored in a buffer and is then outputted through a processing of decoding the data.

The processing of reading and reproducing the content stored in the disc follows procedure steps of an acquisition of information from the disc, a temporary storing (buffering) of acquired information, a decoding of buffer data, and an output of decoded data.

The decoding of the buffer data involves a processing such as the decoding of MPEG data if the contents are in the form of the MPEG data, or the decoding of encrypted data if the encrypted data is given, for instance.

In a case where the image data and the audio data are stored individually in the disc, with each data located apart, seeking of a read head, that is, a jump processing is required. The jump processing, if occurs, requires a period of time between the processing of jumping to a position away from a certain data reproduction position of the disc and the processing of reading and reproducing the data from a next read position, in which case, an increase of the above period of time often leads to an occurrence of discontinuity in reproduction.

Thus, in a case of reading and reproducing the audio in parallel with an execution of the consecutive reproduction (the browsable slide show) of the still image as described above, a configuration of performing an alternate reading of the image data and the audio data along with the jump processing has a problem of causing the discontinuity of reproduced data if the time required for the jump processing is increased.

SUMMARY OF THE INVENTION

The present invention has been undertaken in view of the above problems and is intended to provide a data processing method, a data processing apparatus, an information recording medium, and a computer program that, by adopting a configuration of providing a prescription of recording formats of image data and audio data in an information recording medium (a disc) to perform a prescribed data recording and reproduction processing, enable a seamless reproduction that causes no discontinuity of reproduced data through a reduction of a time required for a jump processing that occurs at the time when performing a browsable slide show for a reproduction together with an audio.

Furthermore, the present invention provides a data processing method, a data processing apparatus, an information recording medium and a computer program enabling a plurality of combinations of readout rates of image data and audio data satisfying conditions for reproduction without data discontinuity and enabling recording/reproducing of data with a rate freely selected from the combinations.

A first aspect of the present invention is to provide a data processing method of determining an arrangement of, to an information recording medium, record data including an image data clip containing image data, and an audio data clip containing audio data for an application to a browsable slide show performing an audio reproduction processing in parallel with a consecutive reproduction of a still image, wherein the data processing method is characterized by including an allowable jump range determination step of determining an allowable jump range in a reproduction processing for the information recording medium, and a data arrangement determination step of determining a data arrangement so as to set, within the allowable jump range calculated in the allowable jump range determination step, the image data clip and the audio data clip that are stored in the information recording medium.

Further, according to an embodiment of carrying out the data processing method of the present invention, the data arrangement determination step is characterized by being a step of calculating a data size $S_{MAIN}$ of the image data clip, and a data size $S_{SUB}$ of the audio data clip for the application to the browsable slide show, thereby determining the data arrangement that conforms to a setting that, when the allowable jump range calculated in the allowable jump range determination step takes a value of $D_{MAX}$, satisfies the following conditions (a) and (b):

(a) $S_{MAIN}+S_{SUB} \leqq D_{MAX}$, and (b) The image data clip and the audio data clip should be respectively in a consecutive arrangement within the range of a size $D_{MAX}$.

Furthermore, according to an embodiment of carrying out the data processing method of the present invention, the data processing method is characterized by further including a required jump time calculation step of calculating, on the basis of the allowable jump range determined in the allowable jump range determination step, a time required for a jump, and a buffer size determination step of determining, on the basis of the required jump time calculated in the required jump time calculation step, a size of an image data buffer containing the image data read from the information recording medium, and a size of an audio data buffer containing the audio data.

Furthermore, according to an embodiment of carrying out the data processing method of the present invention, the required jump time calculation step is characterized by being a step of calculating, as to an identical intra-layer jump, a sum of a seek time of a pickup, and an overhead time involved in a processing for a read data unit block of the information recording medium, and of calculating, as to an inter-layer jump, a sum of the seek time of the pickup, a pickup adjustment time involved in an inter-layer seek, and the overhead time involved in the processing for the read data unit block of the information recording medium.

Furthermore, according to an embodiment of carrying out the data processing method of the present invention, the data processing method is characterized by further including a data recording step of performing a data recording to the information recording medium under the data arrangement determined in the data arrangement determination step.

A second aspect of the present invention is to provide a data processing apparatus for determining an arrangement of, to an information recording medium, record data including an image data clip containing image data, and an audio data clip containing audio data for an application to a browsable slide show of performing an audio reproduction processing in parallel with a consecutive reproduction of a still image, in which the data processing apparatus is characterized by including allowable jump range determining means of determining an allowable jump range in a reproduction processing for the information recording medium, and data arrangement determining means of determining a data arrangement so as to set, within the allowable jump range calculated with the allowable jump range determining means, the image data clip and the audio data clip that are stored in the information recording medium.

Further, according to one mode of embodying the data processing apparatus of the present invention, the data arrangement determining means is characterized by being in the form of means of calculating a data size $S_{MAIN}$ of the image data clip and a data size $S_{SUB}$ of the audio data clip for the application to the browsable slide show, thereby determining the data arrangement that conforms to a setting that, when the allowable jump range calculated by the allowable jump range determination means takes a value of $D_{MAX}$, satisfies the following conditions (a) and (b):

(a) $S_{MAIN}+S_{SUB} \leqq D_{MAX}$, and (b) The image data clip and the audio data clip should be respectively in a consecutive arrangement within the range of a size $D_{MAX}$.

Furthermore, according to an embodiment of embodying the data processing apparatus of the present invention, the data processing apparatus is characterized by further including required jump time calculating means of calculating, on the basis of the allowable jump range determined by the allowable jump range determining means, a time required for a jump, and buffer size determining means of determining, on the basis of the required jump time calculated with the required jump time calculating means, a size of an image data buffer containing the image data read from the information recording medium, and a size of an audio data buffer containing the audio data.

Furthermore, according to an embodiment of embodying the data processing apparatus of the present invention, the required jump time calculating means is characterized by being in the form of means of calculating, as to an identical intra-layer jump, a sum of a seek time of a pickup, and an overhead time involved in a processing for a read data unit block of the information recording medium, and of calculating, as to an inter-layer jump, a sum of the seek time of the pickup, a pickup adjustment time involved in an inter-layer seek, and the overhead time involved in the processing for the read data unit block of the information recording medium.

Furthermore, according to an embodiment of embodying the data processing apparatus of the present invention, the data processing apparatus is characterized by further including data recording means of performing a data recording to the information recording medium under the data arrangement determined by the data arrangement determination means.

A third aspect of the present invention is to provide an information recording medium, in which the information recording medium is characterized by including a data arrangement that allows an image data clip and an audio data clip containing audio data to be stored as record data in a condition where the image data clip and the audio data clip that are applied to a browsable slide show of performing an audio reproduction processing in parallel with a consecutive reproduction of a still image are contained together in an area within a prescribed allowable jump range.

Further, according to one mode of embodying the information recording medium of the present invention, the information recording medium is characterized by further including the data arrangement that, when a data size of the image data clip and a data size of the audio data clip for the application to the browsable slide show are respectively assumed to be $S_{MAIN}$ and $S_{SUB}$, and the allowable jump range takes a value of $D_{MAX}$, satisfies the following conditions (a) and (b):

(a) $S_{MAIN}+S_{SUB} \leqq D_{MAX}$, and (b) The image data clip and the audio data clip should be respectively in a consecutive arrangement within the range of a size $D_{MAX}$.

A fourth aspect of the present invention is to provide a computer program that implements a processing of determining an arrangement of, to an information recording medium, record data including an image data clip containing image data and an audio data clip containing audio data for an application to a browsable slide show of performing an audio reproduction processing in parallel with a consecutive reproduction of a still image, in which the computer program is characterized by including an allowable jump range determination step of determining an allowable jump range in a reproduction processing for the information recording medium, and a data arrangement determination step of determining a data arrangement so as to set, within the allowable jump range calculated in the allowable jump range determination step, the image data clip and the audio data clip that are stored in the information recording medium.

Furthermore, a fifth aspect of the present invention is to provide a data processing method for determining a record data configuration of image data and audio data to be applied to a browsable slide show performing an audio reproduction processing in parallel with a consecutive reproduction of a still image, comprising: a buffer size setting step of setting a total buffer size of image data and audio data in a reproducing apparatus performing the browsable slide show reproduction processing as a fixed value; a rate determining step of determining an image/audio data readout rate depending on each of the total buffer size of the reproducing apparatus, a maximum jump time permitted for data reproduction and a data readout rate in the reproducing apparatus.

Moreover, in an embodiment of the data processing method of the present invention, the data processing method may further have a recording step of recording the image data and the audio data having a data format matching the image/audio data readout rate determined in the rate determining step on an information recording medium or a master information recording medium.

Furthermore, in an embodiment of the data processing method of the present invention, the rate determining step may be a step of determining the image/audio data readout rate as a combination of an image data readout rate and an audio data readout rate satisfying the following equation:

$$2T(R_{MAX1} + T_{MAX2}) + \frac{4TR_{MAX1}R_{MAX2}}{R_{UD} - (R_{MAX1} + R_{MAX2})} \leq RB1 + RB2,$$

when the total buffer size of the reproducing apparatus is [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, in an embodiment of the data processing method of the present invention, the rate determining step is a step of determining the image/audio data readout rate on the basis of a table having listed therein correspondence between a combination of an image data readout rate and an audio data readout rate satisfying the following equation:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

and the total buffer size of the reproducing apparatus, when the total buffer size of the reproducing apparatus is set to [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, in an embodiment of the data processing method of the present invention, the table is a table generated on the basis of TS_Recording_Rate ($R_{TS}$).

Moreover, in an embodiment of the data processing method of the present invention, the rate determining step may be a step of determining the image/audio data readout rate on the basis of a table having listed therein correspondence between a combination of an image data readout rate $R_{TS1}$ and an audio data readout rate $R_{TS2}$ defined by the following relational expressions:

$$R_{MAX1} = R_{TS1} \times \alpha, \text{ and}$$

$$R_{MAX2} = R_{TS2} \times \beta,$$

where $\alpha$ and $\beta$ are coefficients, and the total buffer size of the reproducing apparatus.

Furthermore, a sixth aspect of the present invention is a data processing method for determining a record data configuration of image data and audio data to be applied to a browsable slide show performing an audio reproduction processing in parallel with a consecutive reproduction of a still image, in which the method comprises a rate total value setting step of setting a rate total value X as a sum of an image data readout rate and an audio data readout rate applied to the browsable slide show; and a rate determining step of determining an image data readout rate $R_{TS1}$ and an audio data readout rate $R_{TS2}$ satisfying the following equation:

$$R_{TS1} + R_{TS2} <= X$$

to which is adopted the image data readout rate $R_{TS1}$ and the audio data readout rate $R_{TS2}$ defined by the following relational expressions:

$$R_{MAX1} = R_{TS1} \times \alpha, \text{ and}$$

$$R_{MAX2} = R_{TS2} \times \beta,$$

where $\alpha$ and $\beta$ are coefficients, when a maximum readout rate of the image data contained in record data is $R_{MAX1}$, and a maximum readout rate of the audio data contained in the record data is $R_{MAX2}$.

Furthermore, in an embodiment of the data processing method of the present invention, the rate determining step may apply values (192/188) as the coefficients $\alpha$ and $\beta$ in the relational expressions:

$$R_{MAX1} = R_{TS1} \times \alpha, \text{ and}$$

$$R_{MAX2} = R_{TS2} \times \beta.$$

Moreover, in an embodiment of the data processing method of the present invention, the data processing method may further have a recording step of recording the image data and the audio data having a data format matching the image data readout rate and the audio data readout rate determined in the rate determining step on an information recording medium or a master information recording medium.

Moreover, in an embodiment of the data processing method of the present invention, the rate determining step may be a step of determining a combination of readout rates of the image data and the audio data on the basis of a table having listed therein correspondence between a combination of an image data readout rate and an audio data readout rate satisfying the following equations:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

and $$R_{TS1} + R_{TS2} <= X,$$

and the total buffer size of the reproducing apparatus, when the total buffer size of the reproducing apparatus is set to [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, a seventh aspect of the present invention is a data processing apparatus for determining a record data configuration of image data and audio data to be applied to a browsable slide show performing an audio reproduction processing in parallel with a consecutive reproduction of a still image, which comprises buffer size setting means which sets a total buffer size of the image data and the audio data in a reproducing apparatus performing a browsable slide show reproduction processing as a fixed value; and rate determining means which determines an image/audio data readout rate depending on each of the total buffer size of the reproducing apparatus, a maximum jump time permitted for data reproduction and a data readout rate in the reproducing apparatus.

Moreover, in an embodiment of the data processing apparatus of the present invention, the data processing apparatus may further have recording means which performs a processing of recording the image data and the audio data having a data format matching the image/audio data readout rate determined in the rate determining step on an information recording medium or a stamper.

Furthermore, in an embodiment of the data processing apparatus of the present invention, the rate determining means may be configured to determine the image/audio data readout rate as a combination of an image data readout rate and an audio data readout rate satisfying the following equation:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

when the total buffer size of the reproducing apparatus is [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, in an embodiment of the data processing apparatus of the present invention, the rate determining means is configured to determine the image/audio data readout rate on the basis of a table having listed therein correspondence between a combination of the image data readout rate and the audio data readout rate satisfying the following equation:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

and the total buffer size of the reproducing apparatus, when the total buffer size of the reproducing apparatus is set to [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Moreover, in an embodiment of the data processing apparatus of the present invention, the table may be a table generated on the basis of TS_Recording_Rate.

Moreover, in an embodiment of the data processing apparatus of the present invention, the rate determining means may be configured to determine the image/audio data readout rate on the basis of a table having listed therein correspondence between a combination of an image data readout rate $R_{TS1}$ and an audio data readout rate $R_{TS2}$ defined by the following relational expressions:

$$R_{MAX1} = R_{TS1} \times \alpha, \text{ and}$$

$$R_{MAX2} = R_{TS2} \times \beta,$$

where $\alpha$ and $\beta$ are coefficients, and the total buffer size of the reproducing apparatus.

Furthermore, an eighth aspect of the present invention is a data processing apparatus for determining a record data configuration of image data and audio data to be applied to a browsable slide show performing an audio reproduction processing in parallel with a consecutive reproduction of a still image, which comprises rate total value setting means which sets a rate total value X as a sum of an image data readout rate and an audio data readout rate applied to the browsable slide show; rate determining means which determines an image data readout rate $R_{TS1}$ and an audio data readout rate $R_{TS2}$ satisfying the following equation:

$$R_{TS1} + R_{TS2} <= X$$

to which is adopted the image data readout rate $R_{TS1}$ and the audio data readout rate $R_{TS2}$ defined by the following relational expressions:

$$R_{MAX1} = R_{TS1} \times \alpha, \text{ and}$$

$$R_{MAX2} = R_{TS2} \times \beta,$$

where $\alpha$ and $\beta$ are coefficients, when a maximum readout rate of image data contained in record data is $R_{MAX1}$, a maximum readout rate of audio data contained in record data is $R_{MAX2}$.

Furthermore, in an embodiment of the data processing apparatus of the present invention, the rate determining means is configured to perform a processing in which values (192/188) are applied as the coefficients $\alpha$ and $\beta$ in the relational expressions:

$$R_{MAX1} = R_{TS1} \times \alpha, \text{ and}$$

$$R_{MAX2} = R_{TS2} \times \beta.$$

Moreover, in an embodiment of the data processing apparatus of the present invention, the data processing apparatus may further have recording means which performs a processing of recording the image data and the audio data having a data format matching the readout rates of the image data and the audio data determined in the rate determining step on an information recording medium or a master information recording medium.

Furthermore, in an embodiment of the data processing apparatus of the present invention, the rate determining means may be configured to determine a combination of the image data readout rate and the audio data readout rate on the basis of a table having listed therein correspondence between a combination of an image data readout rate and an audio data readout rate satisfying the following equations:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

and $$R_{TS1} + R_{TS2} <= X,$$

and the total buffer size of the reproducing apparatus, when the total buffer size of the reproducing apparatus is set to

[RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, a ninth aspect of the present invention is an information recording medium manufacturing method, which comprises a buffer size setting step of setting a total buffer size of image data and audio data in a reproducing apparatus performing a browsable slide show reproduction processing as a fixed value; a rate determining step of determining an image/audio data readout rate depending on each of the total buffer size of the reproducing apparatus, a maximum jump time permitted for data reproduction and a data readout rate in the reproducing apparatus; and a recording step of recording the image data and the audio data having a data format matching the image/audio data readout rate determined in the rate determining step on an information recording medium or a master information recording medium.

Furthermore, in an embodiment of the information recording medium manufacturing method of the present invention, the rate determining step may be a step of determining the image/audio data readout rate as a combination of an image data readout rate and an audio data readout rate satisfying the following equation:

$$2T(R_{MAX1}+T_{MAX2})+\frac{4TR_{MAX1}R_{MAX2}}{R_{UD}-(R_{MAX1}+R_{MAX2})}<=RB1+RB2,$$

when the total buffer size of the reproducing apparatus is [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, in an embodiment of the information recording medium manufacturing method of the present invention, the rate determining step may be a step of determining the image/audio data readout rate on the basis of a table having listed therein correspondence between a combination of an image data readout rate and an audio data readout rate satisfying the following equation:

$$2T(R_{MAX1}+T_{MAX2})+\frac{4TR_{MAX1}R_{MAX2}}{R_{UD}-(R_{MAX1}+R_{MAX2})}<=RB1+RB2,$$

and the total buffer size of the reproducing apparatus, when the total buffer size of the reproducing apparatus is set to [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Moreover, in an embodiment of the information recording medium manufacturing method of the present invention, the rate determining step may be a step of determining the image/audio data readout rate on the basis of a table having listed therein correspondence between a combination of an image data readout rate $R_{TS1}$ and an audio data readout rate $R_{TS2}$ defined by the following relational expressions:

$$R_{MAX1}=R_{TS1}\times\alpha, \text{ and}$$

$$R_{MAX2}=R_{TS2}\times\beta,$$

where $\alpha$ and $\beta$ are coefficients, and the total buffer size of the reproducing apparatus.

Furthermore, a tenth aspect of the present invention is an information recording medium manufacturing method, which comprises a rate total value setting step of setting a rate total value X as a sum of an image data readout rate and an audio data readout rate applied to a browsable slide show; a rate determining step of determining an image data readout rate $R_{TS1}$ and an audio data readout rate $R_{TS2}$ satisfying the following equation:

$$R_{TS1}+R_{TS2}<=X$$

to which is adopted the image data readout rate $R_{TS1}$ and the audio data readout rate $R_{TS2}$ defined by the following relational expressions:

$$R_{MAX1}=R_{TS1}\times\alpha, \text{ and}$$

$$R_{MAX2}=R_{TS2}\times\beta,$$

where $\alpha$ and $\beta$ are coefficients, when a maximum readout rate of the image data contained in the record data is $R_{MAX1}$, and a maximum readout rate of the audio data contained in the record data is $R_{MAX2}$; and a recording step of recording the image data and the audio data having a data format matching the image data readout rate and the audio data readout rate determined in the rate determining step on an information recording medium or a master information recording medium.

Furthermore, in an embodiment of the information recording medium manufacturing method of the present invention, the rate determining step may apply values (192/188) as the coefficients $\alpha$ and $\beta$ in the relational expressions:

$$R_{MAX1}=R_{TS1}\times\alpha, \text{ and}$$

$$R_{MAX2}=R_{TS2}\times\beta.$$

Moreover, in an embodiment of the information recording medium manufacturing method of the present invention, the rate determining step may be a step of determining a combination of the image data readout rate and the audio data readout rate on the basis of a table having listed therein correspondence between a combination of the image data readout rate and the audio data readout rate satisfying the following equations:

$$2T(R_{MAX1}+T_{MAX2})+\frac{4TR_{MAX1}R_{MAX2}}{R_{UD}-(R_{MAX1}+R_{MAX2})}<=RB1+RB2,$$

and $$R_{TS1}+R_{TS2}<=X,$$

and the total buffer size of the reproducing apparatus, when the total buffer size of the reproducing apparatus is set to [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Moreover, an eleventh aspect of the present invention is an information recording medium, which comprises a data recording configuration having data arrangement in which image data and audio data corresponding to an image/audio data readout rate determined depending on each of a total buffer size of the image data and the audio data of a reproducing apparatus executing a browsable slide show reproduction processing, a maximum jump time allowed for data reproduction and a data readout rate in the reproducing apparatus have a jump distance in which a jump processing at reproduction is executable within the maximum jump time.

Furthermore, in an embodiment of the information recording medium of the present invention, the image/audio data readout rate may be a combination of an image data readout rate and an audio data readout rate satisfying the following expression:

$$2T(R_{MAX1} + T_{MAX2}) + \frac{4TR_{MAX1}R_{MAX2}}{R_{UD} - (R_{MAX1} + R_{MAX2})} <= RB1 + RB2,$$

when the total buffer size of the reproducing apparatus is [RB1+RB2], the maximum jump time allowed for data reproduction is $T_{JUMP}$, the data readout rate in the reproducing apparatus is $R_{UD}$, a maximum readout rate of the image data contained in the record data is $R_{MAX1}$, and a maximum readout rate of the audio data contained in the record data is $R_{MAX2}$.

Furthermore, a twelfth aspect of the present invention is a reproducing apparatus for executing a reproduction processing of an information recording medium in which record data including an image data clip containing image data and an audio data clip containing audio data applied to a browsable slide show performing an audio reproduction processing in parallel with a consecutive reproduction of a still image is recorded at a predetermined interval, which comprises: an image data buffer which stores the image data read from the information recording medium; an audio data buffer which stores the audio data read from the information recording medium; reproducing means which acquires data from the image data buffer and the audio data buffer to execute a reproduction processing; and a control unit which executes data read control to start a jump operation at an audio data recording position at the predetermined interval in the information recording medium in a case where the image data buffer holds image data at a maximum.

Furthermore, a thirteenth aspect of the present invention is a computer program causing a computer to execute a processing for determining a record data configuration of image data and audio data to be applied to a browsable slide show performing an audio reproduction processing in parallel with a consecutive reproduction of a still image, which comprises: a buffer size setting step of setting a total buffer size of the image data and the audio data in a reproducing apparatus performing a browsable slide show reproduction processing as a fixed value; and a rate determining step of determining an image/audio readout rate depending on each of the total buffer size of the reproducing apparatus, a maximum jump time permitted for data reproduction and a data readout rate in the reproducing apparatus.

Furthermore, a fourteenth aspect of the present invention is a computer program causing a computer to execute a processing for determining a record data configuration of image data and audio data to be applied to a browsable slide show performing an audio reproduction processing in parallel with a consecutive reproduction of a still image, which comprises: a rate total value setting step of setting a rate total value X as a sum of an image data readout rate and an audio data readout rate applied to the browsable slide show; and a rate determining step of determining an image data readout rate $R_{TS1}$ and an audio data readout rate $R_{TS2}$ satisfying the following equation:

$$R_{TS1}+R_{TS2}<=X$$

to which is adopted the image data readout rate $R_{TS1}$ and the audio data readout rate $R_{TS2}$ defined by the following relational expressions:

$$R_{MAX1}=R_{TS1}\times\alpha, \text{ and}$$

$$R_{MAX2}=R_{TS2}\times\beta,$$

where $\alpha$ and $\beta$ are coefficients, when a maximum readout rate of the image data contained in record data is $R_{MAX1}$ and a maximum readout rate of the audio data contained in the record data is $R_{MAX2}$.

It is noted that the computer program of the present invention is available as a computer program that is capable of being provided by a storage medium that provides various programs and codes in a computer-readable form for a computer system that allows various programs and codes to run, or via a communication medium, more specifically, a recording medium such as a CD, an FD, and an MO etc., or the communication medium such as a network etc. A processing suited to the program may be implemented on the computer system by providing the above program in the computer-readable form.

The foregoing and other objects, features and advantages of the present invention will be apparent from a detailed description with reference to the following embodiments and the accompanying drawings of the present invention. Incidentally, it is to be understood that the system stated in the present specification is in the form of a logical aggregate of more than one unit, and the units contained in the aggregate are not always incorporated in an identical casing.

According to the configuration of the present invention, the configuration of individually recording the image data clip and the audio data clip in the disc such as the Blu-ray disc and the DVD, for instance, adopts the configuration of determining the allowable range of the image data clip-to-audio data clip jump required at the time of data reading that takes place in the so-called browsable slide show performing the audio reproduction processing in parallel with the consecutive reproduction of the still image, thereby determining, on the basis of the determined allowable jump range (information), the arrangement conditions of the data stored in the information recording medium, so that the seamless reproduction is made possible without causing any discontinuity of the data at the time when performing the browsable slide show for a parallel reproduction of the still image and the audio.

Further, the present invention adopts the configuration of calculating, on the basis of the determined allowable jump range information, the time required for the jump, thereby determining, on the basis of the calculated required jump time, the size of the image data buffer containing the image data read from the information recording medium and the size of the audio data buffer containing the audio data, so that the configuration of performing the seamless reproduction in the browsable slide show may be realized with the small buffer that meets the minimum requirements.

In addition, according to the configuration of the present invention, in a processing of determining a record data configuration of image data and audio data applied to a browsable slide show performing an audio reproduction processing in parallel with a consecutive reproduction of a still image, a total buffer size of the image data and the audio data of a reproducing apparatus performing the browsable slide show is set to be a fixed value and an image/audio data readout rate is determined depending on each of the total buffer size of the reproducing apparatus, a maximum jump time permitted for data reproduction and a data readout rate in the reproducing apparatus. Accordingly, it becomes possible to record and reproduce data with a rate freely selected from a plurality of combinations of an image data readout rate and an audio data readout rate satisfying conditions for reproduction without data discontinuity, and thus, a configuration of recording/reproducing high quality data, such as 8-channel LPCM data, may be realized.

In addition, according to the configuration of the present invention, in a processing of determining a record data configuration of image data and audio data applied to a browsable slide show performing an audio reproduction processing in parallel with a consecutive reproduction of a still image, the total value of the image data readout rate and the audio data readout rate is set to be a fixed value [X] and the image/audio data readout rate is determined depending on the thus-set condition. Accordingly, it becomes possible to record and reproduce data with a rate freely selected from a plurality of combinations of the image data readout rate and the audio data readout rate satisfying conditions for reproduction without data discontinuity, and thus, a configuration of recording/reproducing high quality data, such as 8-channel LPCM data, may be realized.

BRIEF DESCRIPTION OF THE DRAWINGS

FIG. 5A is a view for explaining a structure of a main player 335 and FIG. 5B is that of an audio player 336, both included in the apparatus shown in FIG. 4;

FIG. 7A is a graph showing an example of a bit occupation rate of an elementary stream buffer EB (video code buffer) at the time of the browsable mode slide show, and FIG. 7B is a graph of that of an audio code buffer B4;

FIG. 8 is a schematic view showing a model of a reading method for simultaneously reading a main TS and an audio TS at the time of the browsable mode slide show;

FIG. 10A is a view showing a structure of a disc having a plurality of recording layers, FIG. 10B shows examples of an intra-layer jump time ($T_{ACC}$), FIG. 10C shows an example measured value of an inter-layer jump time ($T_{JL}$) and FIG. 10D shows an example measured value of an overhead time ($T_{OH}$), for explaining requirements for realizing seamless reproducing in a case of occurrence of an inter-layer jump in a disc having a plurality of recording layers;

FIG. 13A to FIG. 13C are view for explaining a setting that guarantees reproduction causing no data discontinuity to the inter-layer jump;

FIG. 15 is a table that lists, with reference to each of the jump models A to C having been described with reference to FIG. 13A to FIG. 13C, data arrangement conditions (the minimum of the consecutive data arrangement size) corresponding to values of a data recording rate ($R_{TS}$) and a buffer size ($S_{RB}$);

FIG. 16 is a view showing a model of a reading method for simultaneously reading the main TS and the audio TS at the time of the browsable mode slide show;

FIG. 17A to FIG. 17C are views showing a setting example of jump models that guarantees reproduction without any data discontinuity in the browsable mode slide show;

FIG. 18 is a table showing buffer sizes required for each of the jump models of FIG. 13A and FIGS. 17A-17C;

FIG. 19 is a view for explaining a data arrangement in a case where a plurality of clips are connected seamlessly in each of the jump models shown in FIGS. 17A-17C;

FIG. 27 is a view showing an example of a readout rate setting table showing data of correspondence between the combination of the audio data readout rate $R_{TS2}$ and the image data readout rate $R_{TS1}$ and the total buffer size [RB1+RB2];

FIG. 28 is a view showing an example of a readout rate setting table showing data of correspondence between the combination of the audio data readout rate $R_{TS2}$ and the image data readout rate $R_{TS1}$ and the total buffer size [RB1+RB2];

FIG. 35 is a view for explaining a structural example of a data processing apparatus performing a data recording processing on the information recording medium or a reproduction processing therefrom.

DESCRIPTION OF PREFERRED EMBODIMENTS

Figure 1:
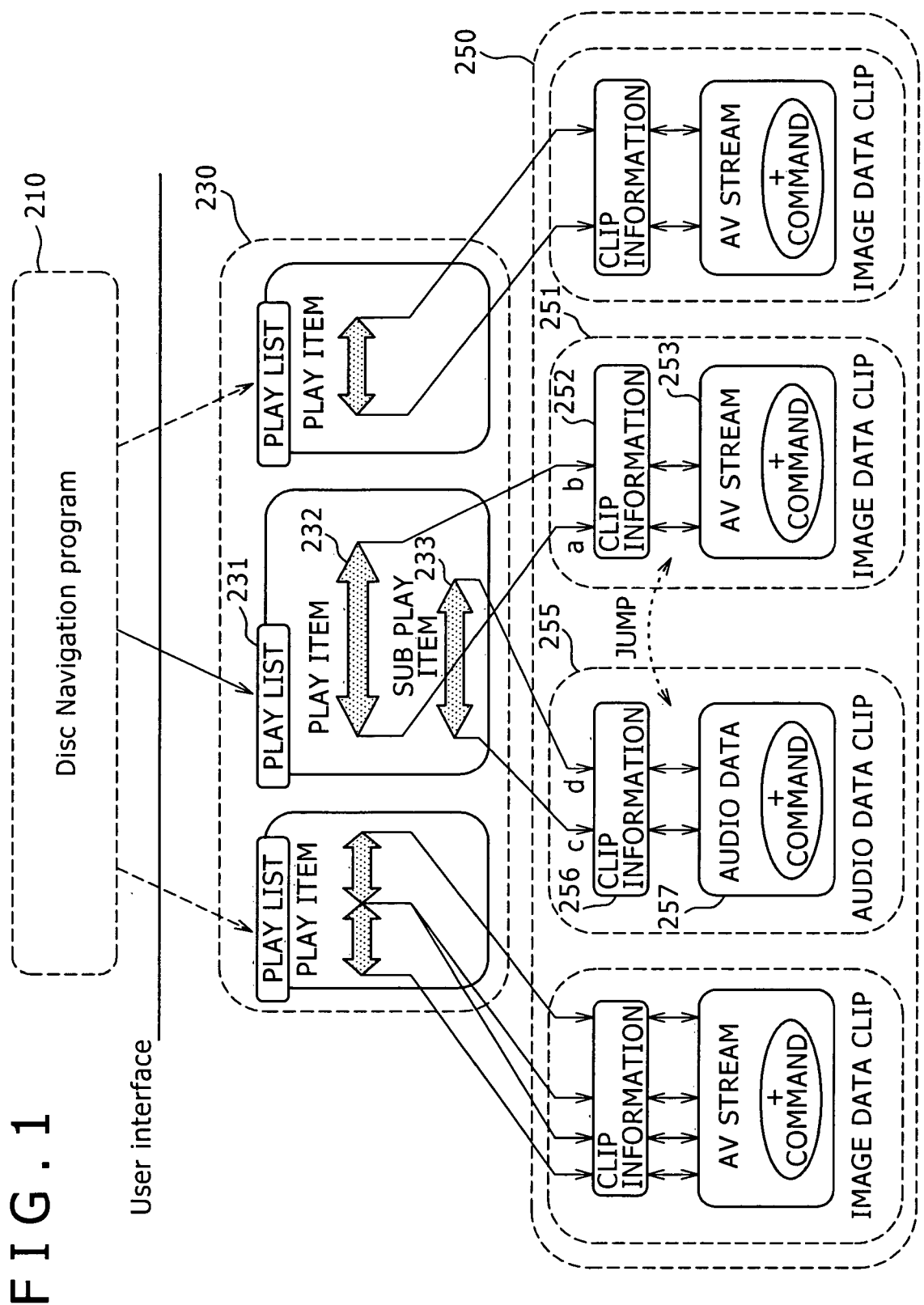
FIG. 1 is a view for explaining a storage format of content stored in a Blu-ray disc.

Details of a data processing method, a data processing apparatus, an information recording medium, and a computer program are now described with reference to the drawings. It is noted that a description is given in the following order of items:

1. Content stored in a disc
2. Browsable slide show
3. Jump processing and contents storage format
4. Content recording and reproduction processing
5. Configuration enabling a flexible setting of readout rate
6. Configuration of reproducing apparatus

[1. Content Stored in a Disc]

The present invention is to, by adopting a configuration of providing a prescription of recording formats of image data and audio data in the disc to perform a prescribed data recording and reproduction processing, enable a seamless reproduction that causes no discontinuity of reproduced data through a reduction of time required for a jump processing that occurs at the time when performing a browsable slide show for a reproduction of an audio in parallel with a still image.

It is noted that embodiments in the following give a consideration on an assumption that a Blu-ray disc specified as a disc available for a recording and a reproduction with a blue laser applied is taken as one instance of a disc-type information recording medium. A storage format of content stored in the Blu-ray disc is described with reference to FIG. 1.

The information recording medium is supposed to contain AV streams and audio data of moving image contents such as HD (High Definition) movie content specified as high definition moving image data, for instance.

As shown in FIG. 1, a hierarchy that conforms to a Blu-ray disc ROM standard format exists among the content stored in conformity with the Blu-ray disc ROM standard format. That is: (A) Disc navigation program 210, (B) Reproduction-section designation file (play list) 230, and (C) Clip (content data file) 250.

Paired individual AV stream and clip information specified as auxiliary information of the individual AV stream are assumed to be an individual object, which is referred to as the clip 250. An AV stream file is called a clip AV stream file, and auxiliary information of the AV stream file is called a clip information file.

While a data file for use in a computer etc. is generally treated as a byte string, the contents in the clip AV stream file are expanded on a time base, and the play list 230 allows access points in the clip 250 to be designated mainly by a time stamp. With the play list 230 designating the access points in the clip 250 by the time stamp, the clip information finds, on the basis of the time stamp, decoding start address information of the stream contained in the AV stream file.

The play list 230 is available in the form of an aggregate of reproduction section information contained in the clip 250. An individual reproduction section contained in a certain clip is called a play item, which is indicated by a pair of points IN and OUT on the time axis. That is, the play list is supposed to be in the form of an aggregate of play items.

The highest-order navigation program 210 provides a function of controlling a reproduction order of the play list 230 and an interactive reproduction of the play list 230, and is written in a programming language (navigation commands or Java etc.), for instance. Details of (A) the disc navigation program 210, (B) the reproduction-section designation file (the play list) 230, and (C) the clip (the contents data file) 250 are described in the following.

(A) The disc navigation program 210 contains index data specifiable by a user, and a reproduction program, and allows the user to give an input through a user interface for a selection of the reproduction program corresponding to the index data specified by the user, leading to an execution of a reproduction control in a condition where the related reproduction-section designation file (the play list) of the selected reproduction program has been specified.

(B) The reproduction-section designation file (the play list) 230 is composed of more than one reproduction-section designation file (the play list). The individual reproduction-section designation file (the play list) is supposed to be in the form of a file having more than one play item that selects either of more than one AV stream data file or audio data file contained in the clip (the contents data file) 250, and designates specific data portions of the selected data file as a reproduction start point and a reproduction end point, and a selection of the individual reproduction-section designation file (the play list) brings the reproduction into execution through a determination of a reproduction sequence according to the play item contained in the selected individual reproduction-section designation file (the play list).

An illustrated play list 231, for instance, is available as a play list that meets the execution of the browsable slide show of reading and reproducing the audio in parallel with a consecutive reproduction of the still image. The play list 231 is supposed to be in the form of a list having a play item 232 that designates the specific data portions of clip information 252 in an image data clip 251, and a sub play item 233 that designates the specific data portions of clip information 256 in an audio data clip 255 to be reproduced in parallel with the still image.

In the reproduction processing that completes the selection of the play list 231, the image data to be reproduced is read from the image data clip 251 through the play item 232, and the audio data to be reproduced is read from the audio data clip 255 through the sub play item 233, resulting in the execution of the reproduction of the image data and the audio data in parallel.

Incidentally, still image data to be displayed in the browsable slide show may be still image data generated on the basis of moving image data contained in the image data clip 251, or alternatively, the still image data contained in the image data clip 251 may be also used as it is.

(C) The clip (the contents data file) 250 is available as an individually segmented content data file, and is composed of the image data clip 251 containing the image data file, and the audio data clip etc. containing the audio data file.

The image data clip 251 has an AV (Audio-Visual) stream file 253 and the clip information file 252. The clip information file 252 is available as a data file containing attribute information relating to the AV (Audio-Visual) stream file 253. The AV (Audio-Visual) stream file 253 is available as MPEG-TS (Moving Picture Experts Group-Transport Stream) data, for instance, and is supposed to be of a data structure obtained by multiplexing each information piece such as the image (video) data and subtitle data etc. together. Further, there are instances where command information required for a control of a reproducing apparatus at the time of the reproduction is also multiplexed.

The audio data clip 255 has an audio data file 257 and the clip information file 256. The clip information file 256 is available as a data file containing attribute information relating to the audio data file 257, and there are instances where the command information required for the control of the reproducing apparatus at the time of the reproduction is also multiplexed.

The reproduction of the contents, when performed through the selection of the reproduction-section designation file (the play list) 231, for instance, causes the play item 232 made corresponding to the reproduction-section designation file (the play list) 231 to provide a reproduction start point a and a reproduction end point b for the clip information 252 in the image data clip 251, so that specific data areas a and b of the AV stream file 253 specified as the contents contained in the image data clip 251 are supposed to be reproduced. Further, the sub play item 233 provides a reproduction start point c and a reproduction end point d for the clip information 256 in the audio data clip 255, so that the audio data in specific data areas c and d of the audio data file 257 specified as the contents contained in the audio data clip 255 is supposed to be reproduced, resulting in the execution of the browsable slide show.

That is, the browsable slide show of reproducing the audio data acquired from the audio data file 257 in parallel with the consecutive reproduction of the still image acquired from the AV stream file 253 or generated is supposed to be brought into execution.

When the contents stored in the disc are contained for each data clip, the individual clip is stored in a consecutive sector area specified as a consecutive recording area of the disc, in which case, however, different clips are sometimes stored at locations prescribed sector apart without being in the consecutive sector area. In the data storage format described above, the reproduction of the contents, when performed through the selection of the above reproduction-section designation file (the play list) 232, brings about a necessity of a jump that takes place between the different clips at the time of the reproduction.

The different clips of the AV stream file 253 specified as the contents contained in the image data clip 251 and the audio data file 257 specified as the contents contained in the audio data clip 255 are required for the case of the browsable slide show, so that it becomes necessary to read the data in the respective data files through the jump of a read header between recording areas of the image data clip 251 and the audio data clip 255 on the disc.

Figure 2:
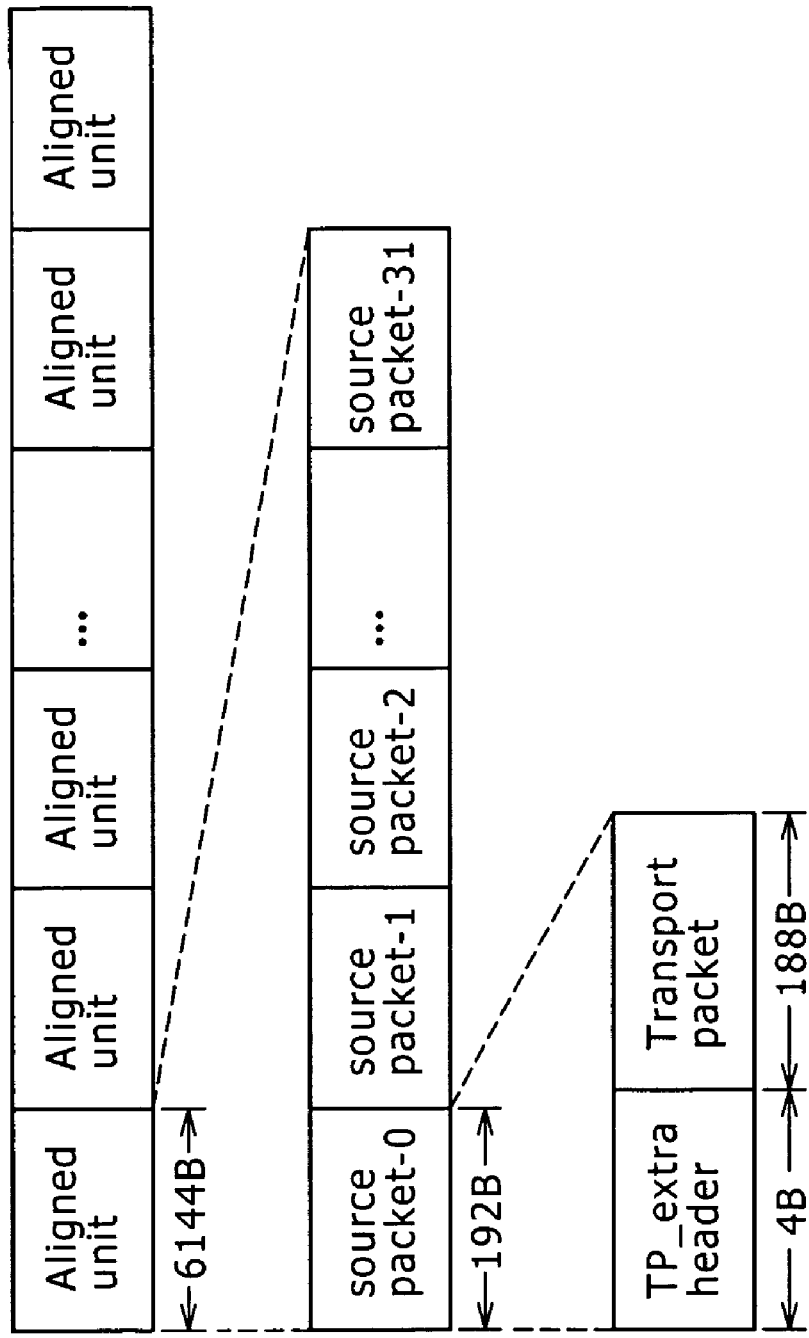
FIG. 2 is a view for explaining a structure of a BDAV MPEG2 transport stream as an AV stream on a recording medium.

The AV stream on the recording medium is of a BDAV MPEG2 transport stream structure as shown in FIG. 2. The BDAV means Blu-ray Disc Audio-Visual. The BDAV MPEG2 transport stream structure provides the following features:

(a) A BDAV MPEG2 transport stream is composed of an integer number of pieces of aligned units.

(b) The individual aligned unit is 6144 bytes long (2048 by 3 bytes).

(c) The individual aligned unit starts with a first byte of a source packet.

(d) The individual source packet is 192 bytes long, and is composed of a TP_extra_header and a transport packet. The TP_extra_header is 4 bytes long, and the transport packet is 188 bytes long.

(e) The individual aligned unit is composed of 32 pieces of source packets.

The data of the video stream and the audio stream is packetized into an MPEG2 PES packet, and the PES packet is packetized into the transport packet.

[2. Browsable Slide Show]

A still image recording and reproducing method called the browsable slide show is now described. The browsable slide show is available as the processing of reproducing the audio in parallel with the still image. The reproduction order of slides (still images) is predetermined, and a reproduction time of each slide is set to be finite or infinite. When the slide reproduction time involves the infinitely set reproduction time as described above, a transition to a next slide reproduction does not take place unless the user gives to the reproducing apparatus an instruction to make the transition to the next slide reproduction. Thus, no reproduction of the respective slides is performed at a predetermined time on the time axis.

Figure 3:
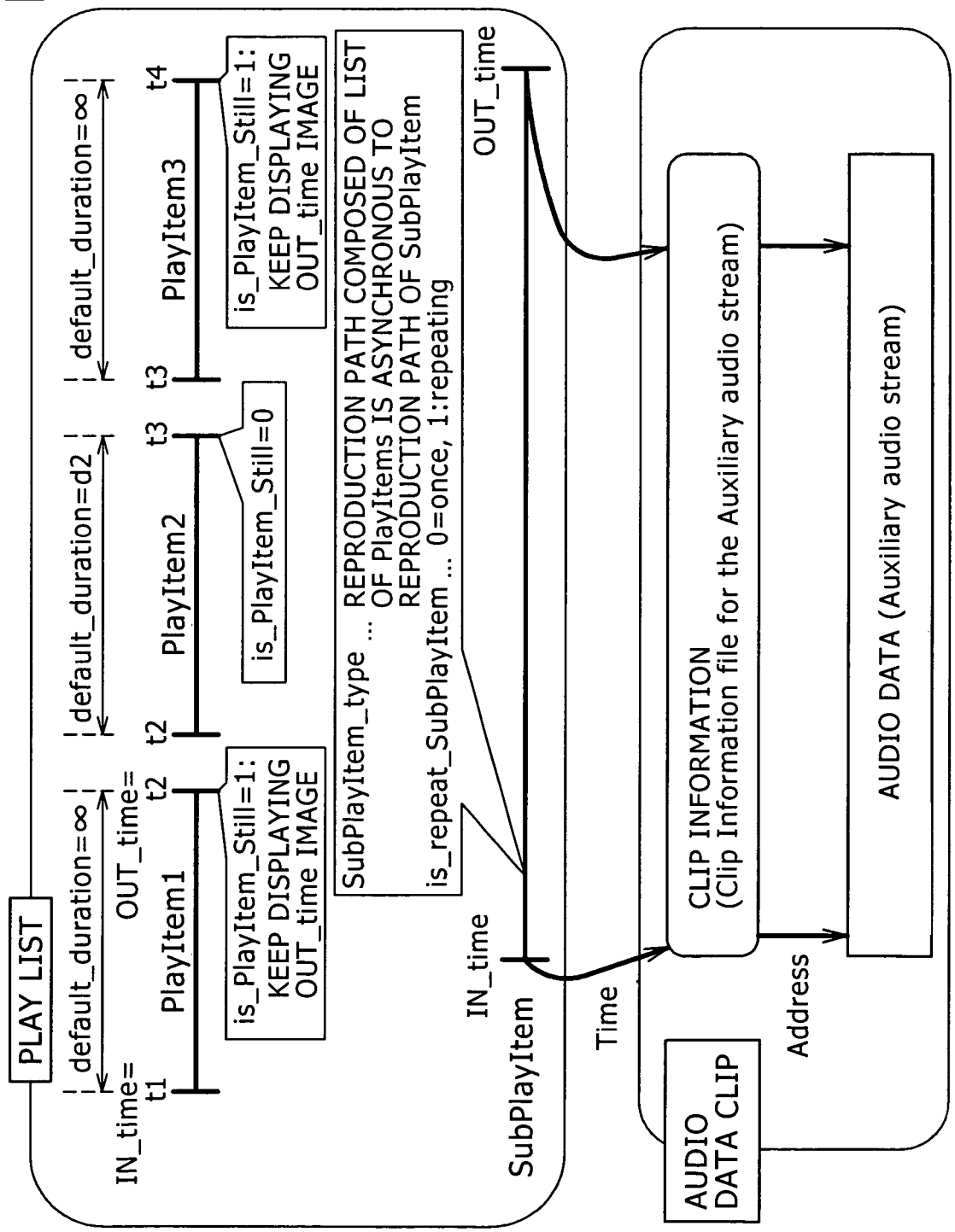
FIG. 3 is a view showing details of a correspondence between an audio data clip and a play list applied to perform a browsable slide show for reproducing audio asynchronously.

One embodiment of a processing applied to a case of an asynchronous reproduction of the image and the audio data through an application of the play item corresponding to the image data and the sub play item corresponding to the audio data in the format having been described with reference to FIG. 1 is now described. FIG. 3 is a view showing the details of a correspondence between the audio data clip and the play list applied to perform the browsable slide show of reproducing the audio asynchronously.

The play list is composed of more than one play item representing a reproduction path of the still image, and the sub play item representing a reproduction path of the audio. A reproduction start time (IN_time) and a reproduction end time (OUT_time) of the sub play item are indicated by the respective reproduction start and end time stamps contained in the audio stream.

The reproducing apparatus which performs the browsable slide show acquires, with reference to the clip information, data address information on the recording medium for the audio stream corresponding to the reproduction start time (IN_time) and the reproduction end time (OUT_time) of the sub play item, and reads and reproduces the audio using the address information.

Reproduction control information may be added to the play list contained in the play list that meets the browsable slide show. That is, a flag (is_repeat_Sub Play Item flag) representing whether the reproduction in the reproduction section designated by the reproduction start time IN_time and the reproduction end time OUT_time of the audio stream is repeated or for once only, and information (Sub Play Item-type) representing that the reproduction of the sub play item is asynchronous to the reproduction of the play item are supposed to be added as the reproduction control information.

In this case, the reproducing apparatus may perform the reproduction of the sub play item in three kinds of methods as follows. A first method is to read, alternately in a time sharing manner, a still image file referred to by the play item and an audio stream file referred to by the sub play item when reading the data in the two files from the recording medium. In this case, the reproducing apparatus reproduces the still image and the audio while reading alternately the data in the two files from the recording medium.

A second method is to firstly read all the data in the audio stream file referred to by the sub play item, and then to store the read data in a buffer memory incorporated in the reproducing apparatus. Then, the still image data referred to by the play item is read from the recording medium. The reproducing apparatus reproduces the still image and the audio while reading the still image data from the recording medium, and the audio data from the buffer memory.

A third method is to firstly read all the data in the still image file referred to by the play item, and then to store the read data in the buffer memory incorporated in the reproducing apparatus. Then, the audio stream referred to by the sub play item is read from the recording medium. The reproducing apparatus reproduces the still image and the audio while reading the audio stream from the recording medium, and the still image from the buffer memory.

Here, the above second method is effective in a case where the audio stream file referred to by the sub play item has a small byte size, and the above third method is effective in a case where the still image file referred to by the sub play item has a small byte size.

If the size as much as several megabytes (Mbyte), for instance, is given practically, all the file data may be read into the buffer memory prior to the reproduction. The above second method is supposed to be effective for reason that, in a case where the audio reproduction provides a BGM (Background Music) as an application of the browsable slide show and the reproduction of the sub play item is performed repeatedly, a data size of the audio stream at a bit rate of 256 kbps for about 65 seconds, for instance, is as much as about 2 megabytes (Mbyte).

Figure 4:
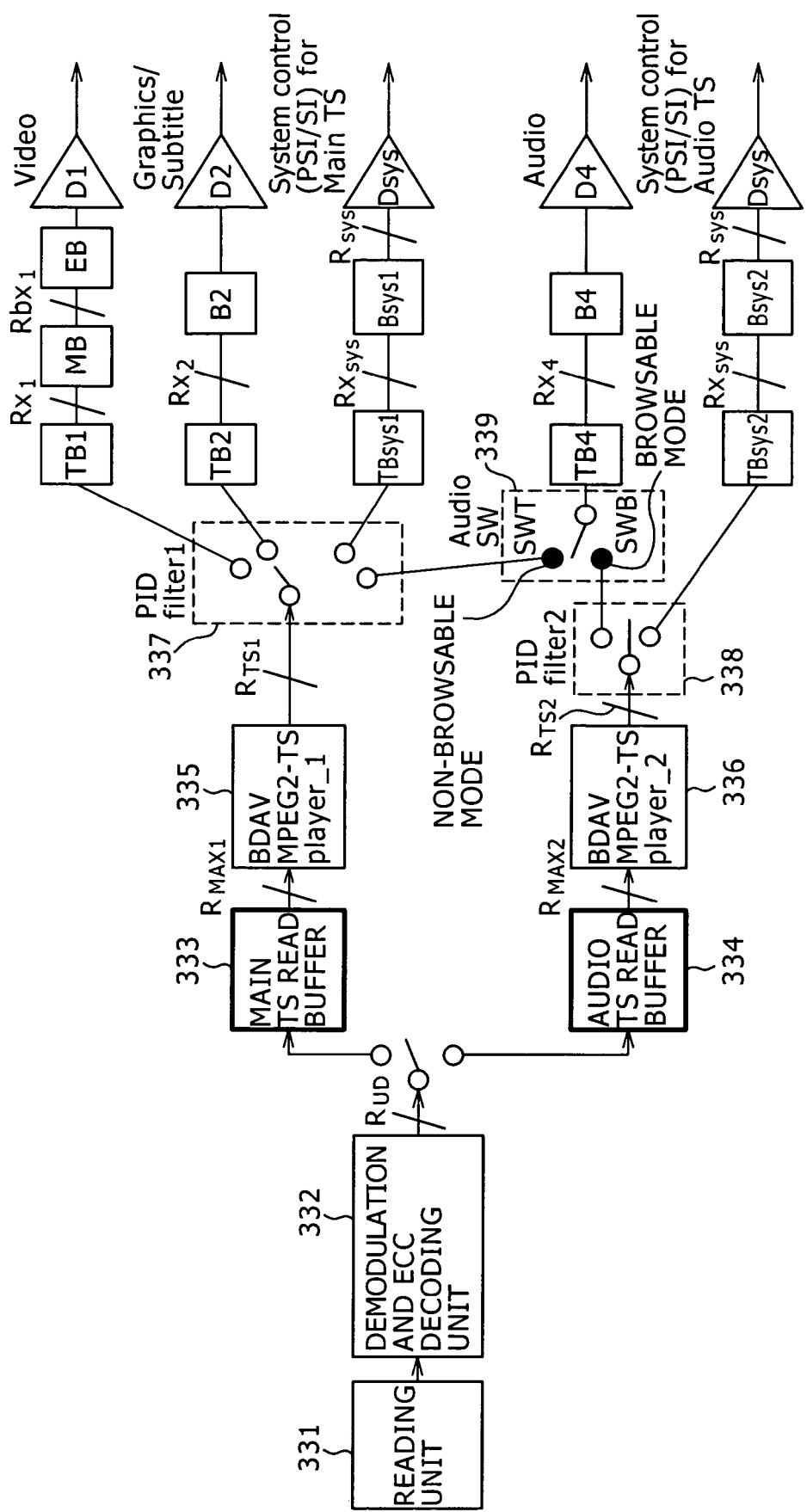
FIG. 4 is a view showing a structure of a reproducing apparatus for reading and reproducing image data and audio data, such as in the browsable slide show.

A configuration of the reproducing apparatus (a player model) for performing the reproduction processing is now described. FIG. 4 is a block diagram showing the reproducing apparatus for performing the reading and the reproduction according to the above first method. In the above first method, the reproducing apparatus reads, alternately in a time sharing manner, the file of a main transport stream (the still image file) (which is hereinafter referred to as a main TS) referred to by the play item, and the file of an audio transport stream (which is hereinafter referred to as an audio TS) referred to by the sub play item, when reading the data in the two files from a drive (the recording medium).

The reproducing apparatus reproduces the still image and the audio while reading alternately the two file (the main TS and the audio TS) data through a reading unit (a header) 331 that gains access to the recording medium. Each file data read through the reading unit 331 is demodulated by a demodulation and ECC decoding unit 332, where an error correction is applied to the demodulated multiplexed stream. Then, source packet data in the main TS file is buffered into a main TS read buffer 333 for buffering the main TS, and source packet data in the audio TS file is buffered into an audio TS read buffer 334 for buffering the audio TS.

The stream data read from the main TS read buffer 333 is supplied to a main player (BDAV MPEG2 TS Player Model_ 1) 335 described later. The main player 335 outputs, to a post-stage main PID (Packet ID) filter 337 at a prescribed timing (a transfer rate $R_{TS1}$), the stream data read from the main TS read buffer 333 at a transfer rate $R_{MAX1}$.

Further, the stream data read from the audio TS read buffer 334 is supplied to an audio player (BDAV MPEG2 TS Player Mode 1_2) 336 described later. The audio player 336 outputs, to a post-stage audio PID filter 338 at a prescribed timing (a transfer rate $R_{TS2}$), the stream data read from the audio TS read buffer 334 at a transfer rate $R_{MAX2}$.

The main PID filter 337 distributes and outputs the supplied main TS to post-stage elementary stream decoders in response to a PID (Packet ID). That is, the still image (video), the auxiliary image information (graphics and the subtitle etc.), and system information such as PSI (Program Specific Information) and SI (Service Information) for the main TS are respectively distributed to transport buffers TB1, TB2, and $TB_{sys1}$. It is noted that the SI is in the form of a table that lists additional information of the TS, and represents information other than MPEG2 standard information. The SI is also packetized into the transport packet. A SI includes SIT (Selection Information Table) and the like.

The transport packet of the still image is transferred from the transport buffer TB1 to a multi-buffer MB at a fixed rate $Rx_1$, and further, to an elementary stream EB at a fixed rate $Rbx_1$, and is outputted after being decoded with a decoder D1. Further, the transport packet of the auxiliary image information is transferred from the transport stream buffer TB2 to a buffer B2 at a fixed rate $Rx_2$, and is outputted after being decoded with a decoder D2. Furthermore, the transport packet of the system information is transferred from the transport buffer $TB_{sys1}$ to a buffer $B_{sys1}$ at a fixed rate $Rx_{sys}$, and is outputted after being decoded with a decoder $D_{sys1}$.

Likewise, the audio PID filter 338 distributes and outputs the supplied audio transport stream to post-stage elementary stream decoders in response to the PID (Packet ID). That is, the transport packet of the audio is transferred from a transport buffer TB4 to a main buffer B4 at a fixed rate $Rx_4$, and is outputted after being decoded with a decoder D4. Further, the transport packet of the system information for the audio TS is transferred from a transport buffer $TB_{sys2}$ to a buffer $B_{sys2}$ at a fixed rate $Rx_{sys}$, and is outputted after being further transferred at a fixed rate $R_{sys}$ to and decoded with a decoder $D_{sys2}$.

Further, there is provided an audio switch (Audio SW) 339 between the audio PID filter 338 and the transport stream buffers TB4 and $TB_{sys}$. The audio switch 339 is controlled through a switching between the case of the reproduction of the slide show in a non-browsable mode (which is also called a time based mode) of reproducing the image data and the audio data synchronously based on the data obtained by integrating the audio data with the image data file, that is, the data file obtained by multiplexing the audio stream with the main TS, for instance, and the case of the reproduction of the slide show in the browsable mode of reproducing the image data and the audio data asynchronously through the application of the play item corresponding to the image data file, and the sub play item corresponding to the audio data file as having been described with reference to FIG. 2.

That is, the audio switch 339 has a non-browsable mode switch SWT connected to the main PID filter 337 given the data from the main TS read buffer 333, and a browsable mode switch SWB connected to the audio PID filter 338 given the data from the audio read buffer 334, and is supposed to supply the audio stream to the transport buffer TB4 through the switching of the audio switch.

In the case of the browsable slide show, for instance, the audio switch 339 is in a browsable mode switch SWB position, thus, in which case, the audio stream is supplied from the audio TS read buffer 334 to the audio decoder D4 through the audio PID filter 338. In the case of the slide show in the non-browsable mode, specifically, when the audio stream multiplexed with the main TS is given, for instance, the audio switch 339 is in a non-browsable mode switch SWT position, in which case, the audio stream multiplexed with the main TS is supplied from the main TS read buffer 333 to the transport buffer TB4 or TB$_{sys2}$ through the main PID filter 337.

The elementary stream decoders are now described. A notation of TB$_n$, MB, EB, TB$_{sys}$, B$_{sys}$, Rx$_n$, Rbx$_n$, Rx$_{sys}$, D$_n$, and D$_{sys}$ is the same as that defined in a T-STD (System Target Decoder) of ISO/IEC13818-1 (MPEG2 Systems standards).

That is, the notation is given as follows:
TB$_n$ (n=1 to 5): Transport buffer for an elementary stream n
MB: Multiple buffer for the video stream
EB: Elementary stream buffer for the video stream
TB$_{sys}$: Input buffer for the system information of a program in the process of being decoded
B$_{sys}$: Main buffer in a system target decoder for the system information of the program in the process of being decoded
Rx$_n$: Transfer rate at which the data is removed from the TB$_n$
Rbx$_n$: Transfer rate (which is available only for the video stream) at which a PES packet payload is removed from an MB$_n$
Rx$_{sys}$: Transfer rate at which the data is removed from the TB$_{sys}$
D$_n$: Decoder for the elementary stream n
D$_{sys}$: Decoder relating to the system information of the program in the process of being decoded The main player (BDAV, MPEG2 TS Player_1) 335 and the audio player (BDAV MPEG2 TS Player_2) 336 that are contained in the player model shown in FIG. 4 are now described. FIGS. 5A and 5B are block diagrams respectively showing the main player 335 and the audio player 336.

As shown in FIG. 5A, the main player 335 is set to supply, to a source depacketizer unit 371 at the bit rate R$_{MAX1}$, source packet data read from the pre-stage main TS read buffer 333. The R$_{MAX1}$ denotes the bit rate of the source packet stream in the main TS file.

An arrival time clock counter 372 is available as a binary counter that counts pulses of a frequency of 27 MHz outputted from a pulse oscillator (27 MHz X-tal) 373. Then, the arrival time clock counter outputs a count value arrival_time_clock (i) obtained at a time t(i).

The main TS and the audio TS are in the form of a data string in units of the source packets having the transport packets and their arrival time stamps, and the individual source packet has the single transport packet and its arrival_time_stamp (ATS). The arrival_time_stamp denotes the time stamp that indicates the time the corresponding transport packet in the main TS or the audio TS arrives at the decoder. The time base created on the basis of the arrival_time_stamp of each source packet contained in each stream is referred to as an arrival time base, and its clock is called an ATC (Arrival Time Clock).

Then, when the arrival_time_stamp of the present source packet read from the main TS is equal to a LSB (Least Significant Bit) 30 bit-value in the count value arrival_time_clock (i) from the arrival time clock counter 372, the transport packet of the present source packet is outputted from the source depacketizer unit 371. The R$_{TS1}$ denotes the bit rate of the main TS.

Further, as shown in FIG. 5B, the audio player 336 is set to supply, to a source depacketizer 374 at the bit rate R$_{MAX2}$, the source packet data read from the pre-stage audio TS read buffer 334. The bit rate R$_{MAX2}$ denotes the bit rate of the source packet stream in the audio TS file.

An arrival time clock counter 375 and a pulse oscillator 376 provide the same actions as in the case of the main player 335. Further, the source depacketizer unit 374 provides the same action as in the case of the main player 335. That is, when the arrival_time_stamp of the present source packet is equal to the LSB 30-bit value in the count value arrival_time_clock (i) from the arrival time clock counter 375, the transport packet of the present source packet is outputted from the source depacketizer unit 374. The R$_{TS2}$ denotes the bit rate of the audio TS.

Relationship between R$_{MAX1}$, R$_{MAX2}$ and R$_{TS1}$, R$_{TS2}$ will be precisely described. R$_{MAX1}$ is a maximum readout rate of image data contained in record data, R$_{MAX2}$ is a maximum readout rate of audio data contained in the record data, R$_{TS1}$ is a transmission rate of a transport stream based on the image data contained in the recorded data, and R$_{TS2}$ is a transmission rate of a transport stream based on the audio data contained in the recorded data.

As described with reference to FIG. 3 and FIG. 5, the main player (for image data) (BDAV MPEG2 TS player_1) 335 input source packet data read out from the main TS read buffer 333 at the bit rate R$_{MAX1}$. R$_{MAX1}$ is a bit rate of a source packet stream of a main TS file (a maximum reading rate of the image data contained in the record data).

The source depacketizer unit 371 for the main player (for the image data) 335 (see FIG. 5) receives data at the bit rate R$_{MAX1}$, performs a depacketizing processing on the source packet depending on a count value of the arrival time clock counter 372 to output the processed data at the bit rate R$_{TS1}$ from the source depacketizer unit 371.

In other words, the source packet stream of the main TS file is input to the main player (BDAV MPEG2 Player_1) 335 at the bit rate R$_{MAX1}$ from the main TS read buffer 333 shown in FIG. 4, and is subject to the depacketizing processing to be output at the bit rate R$_{TS1}$ from the main player 335 shown in FIG. 4 as data of 188-byte base.

This also applies to the audio TS file constituting the audio data. The source packet stream is input at the bit rate R$_{MAX2}$ from the audio TS read buffer 334 shown in FIG. 4 as data of 192-byte base, and is subject to the depacketizing processing to be output at the bit rate R$_{TS2}$ as data of 188-byte base. Therefore, the relationship between R$_{MAX1}$, R$_{MAX2}$ and R$_{TS1}$, R$_{TS2}$ will be as follows:

$$R_{MAX1} = R_{TS1} \times (192/188), \text{ and}$$

$$R_{MAX2} = R_{TS2} \times (192/188).$$

Figure 6:
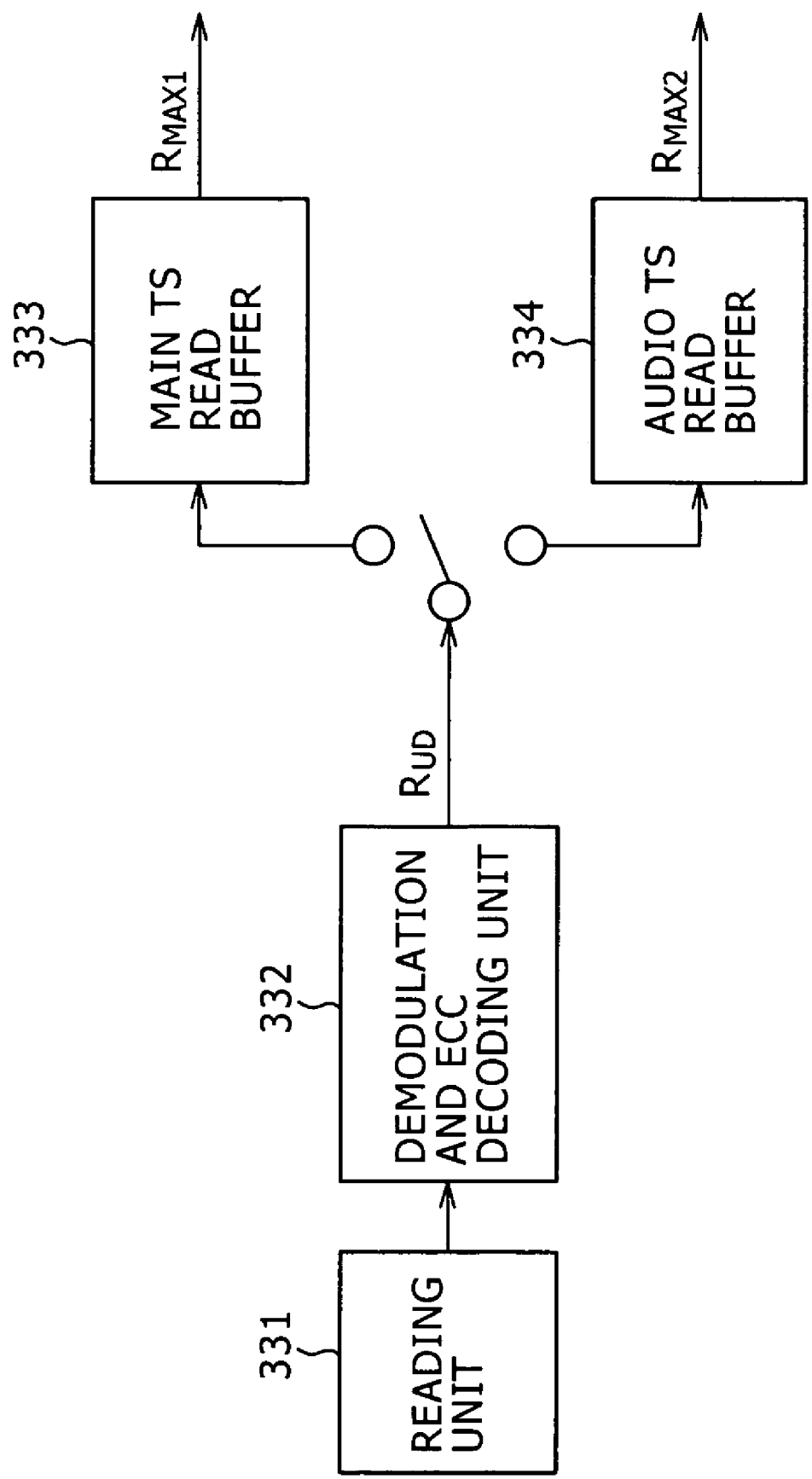
FIG. 6 is a view for showing a concept of a buffer model of a slide show of a browsable mode.

FIG. 6 is a view showing a concept of a buffer model of the slide show in the browsable mode. It is necessary for the browsable mode to guarantee the bit rate R$_{MAX1}$ of the source packet stream for the main TS, and the bit rate R$_{MAX2}$ of the source packet stream for the audio TS, when reading, alternately in a time sharing manner from the drive at a rate R$_{UD}$, the main TS file specified as the still image file referred to by the play item, and the audio TS file referred to by the sub play item.

FIGS. 7A and 7B are graphs showing instances of how much bits are occupied by the elementary stream buffer EB (the video code buffer) and how much bits are occupied by the audio code buffer B4 at the time of the slide show in the browsable mode shown in FIG. 4. In FIGS. 7A and 7B, a vertical axis shows a buffer occupation rate of the video code buffer and that of the audio code buffer, and a horizontal axis shows a system time clock STC of the main TS and that of the audio TS.

As shown in FIG. 7A, a start up delay denotes a period between a time t$_V$ the input of the first video packet is given and a time (DTS: Decoding Time Stamp) the I-picture is buffered in the elementary stream buffer EB. In the browsable mode, a skip to the next slide by the user causes the input of the first video packet to be started. In FIGS. 7A and 7B, a gradient $k_{EB}$ shows a rate of the input to the video buffer EB, and a gradient $k_{B4}$ shows a rate of the input to the audio buffer B4. It is noted that, in FIG. 7A, a period of time when the video code occupation rate is kept constant with the gradient $k_{EB}$ at zero shows a period of time when the auxiliary image information etc. such as the graphics and the subtitle is being read.

If there may be a guarantee that the source packet stream for the main TS is read at the bit rate $R_{MAX1}$, the video decoder D1 shown in FIG. 4 makes it possible to decode the still image in time for a prescribed decoding timing. Also, if there may be a guarantee that the source packet stream for the audio TS is read at the bit rate $R_{MAX2}$, the audio decoder D4 shown in FIG. 4 makes it possible to decode the audio data in time for the prescribed decoding timing.

FIG. 8 is a schematic view showing a model of a method of reading the main TS and the audio TS simultaneously on the occasion of the slide show in the browsable mode.

Each of the main TS and the audio TS is assumed to be in the consecutive arrangement on the disc. In this place, the reading of the main TS and the audio TS is performed alternately as follows.
(1) The data of the prescribed size x is read from the main TS.
(2) The jump to the prescribed data position of the audio Ts is performed.
(3) The data of the prescribed size y is read from the audio TS.
(4) The jump to a prescribed data position of the main TS is performed.
Then, the data of the prescribed size x is read from the main TS.

The size x of the data read from the above main TS per read action is assumed to be a minimum of a required size RB1 for the main TS read buffer 333. Further, the size y of the data read from the audio TS per read action is assumed to be a minimum of a required size RB2 for the audio TS read buffer 334. Equation 1 applied to calculate the size required for each of the main TS read buffer 333 and the audio TS read buffer 334 is given as follows:

$$RB1 >= R_{MAX1} \times \left(2T_{JUMP} + \frac{RB2}{R_{UD} - R_{MAX2}}\right), \text{ and} \quad [\text{Eq. 1}]$$

$$RB2 >= R_{MAX2} \times \left(2T_{JUMP} + \frac{RB1}{R_{UD} - R_{MAX1}}\right),$$

where:
B1: Size required for the main TS read buffer 333>=Size of the data read from the main TS per read action
RB2: Size required for the audio TS read buffer 334>=Size of the data read from the audio TS per read action
$T_{JUMP}$: Jump time
$R_{UD}$: Bit rate of the reading from the drive
$R_{MAX1}$: Bit rate of the source packet stream for the main TS (maximum read bit rate)
$R_{MAX2}$: Bit rate of the source packet stream for the audio TS (maximum read bit rate)

For instance, under the following conditions, that is, on an assumption that the rate $R_{UD}$ of the reading from the drive is 54 Mbps, the jump time $T_{JUMP}$ is 1.01 sec., the bit rate $R_{MAX1}$ of the source packet stream for the main TS is 15 Mbps, and the bit rate $R_{MAX2}$ of the source packet stream for the audio TS is 2.0 Mbps, the size required for the main TS read buffer 333 results in x=3.90 Mbytes, and the size required for the audio TS read buffer 34 results in y=0.698 MBytes.

Among the above parameters, the bit rate $R_{UD}$ of the reading from the drive, the bit rate $R_{MAX1}$ of the source packet stream for the main TS, and the bit rate $R_{MAX2}$ of the source packet stream for the audio TS are available as the values basically determined depending on the drive apparatus, the processing capability of the reproduction processing, and the packet data size, whereas the jump time $T_{JUMP}$ is supposed to be given as the value that varies with the distance etc. of the jump performed on the disc. The above embodiment gives the instance on the assumption that the jump time $T_{JUMP}$ is 1.01 sec., in which case, however, this value is restrictive to the temporarily set value of the certain jump processing, and the jump time $T_{JUMP}$ is supposed to vary depending on the distance etc. of the jump performed on the disc.

The buffer data size based on the above calculation becomes insufficient to meet the case where the jump time $T_{JUMP}$ increases with increasing distance etc. of the jump performed on the disc, leading to a possibility of the reproduction discontinuity of the data. Thus, it is necessary to prescribe a data arrangement so as to limit the jump time $T_{JUMP}$ to a certain time or below, thereby performing a data recording that conforms to a prescribed format of the data arrangement. Then, the data recording in conformity with the above format enables the seamless reproduction that causes no data discontinuity.

Details of the jump time $T_{JUMP}$ in the above expression and a data recording configuration required to perform, seamlessly without causing any data discontinuity, the browsable slide show specified as the processing of reproducing the audio and the still image in parallel is now described.

[3. Jump Processing and Content Storage Format]

To perform surely the seamless reproduction processing in the occurrence of the jump processing in the course of the reproduction for the disc-type information recording medium containing the content, it is necessary to prescribe the content storage location and to set a maximum jump distance as a distance that allows the occurrence of the jump, thereby performing a storage of the content in conformity with the setting of the distance.

In a DVD (Digital Versatile Disc) specified as the disc-type recording medium, standards of the drive that performs the disc reproduction involve drive standards established such that a period between a termination of the reproduction at a jump start point and a start of the reproduction at a jump destination is limited to a prescribed period of time or below in order to permit the seamless reproduction in a case of the occurrence of the jump within an individual recording layer.

Figure 9:
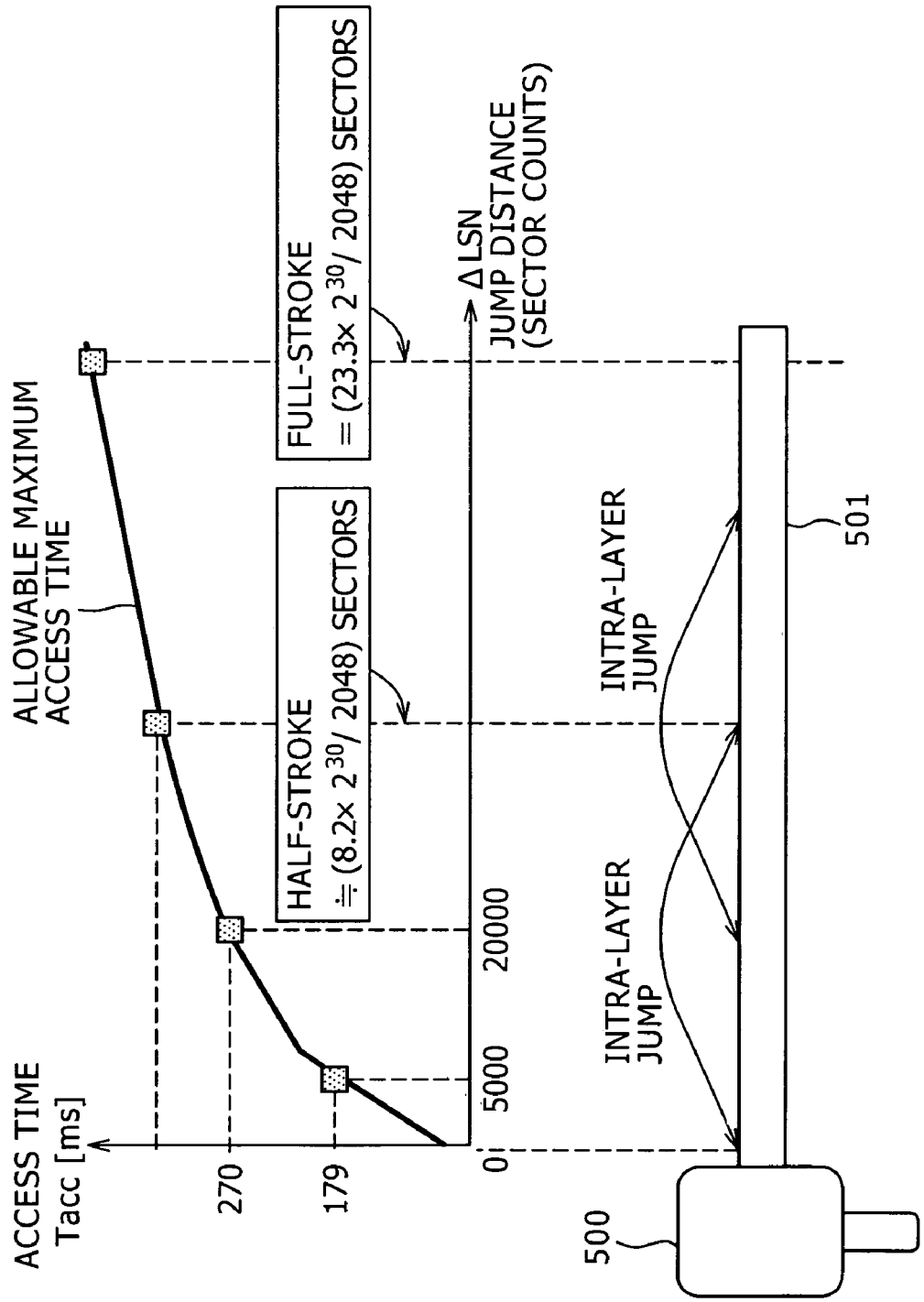
FIG. 9 is a view for explaining a drive standard specifying a jump processing at the time of disc reproduction and a time period between a termination of the reproduction at a jump start point and a start of the reproduction at a jump destination.

The drive standards are now described with reference to FIG. 9. In FIG. 9, a disc 501 mounted to a spindle motor 500 is turned, allowing the reproduction and the recording of the data to be performed with a non-illustrated pickup. The content stored in the disc are contained in sector units corresponding to the prescribed data size.

In a graph shown in FIG. 9, a horizontal axis shows the jump distance indicated by sector numbers, and a vertical axis shows an access time [ms]. As shown in the graph of FIG. 9, the drive standards in the DVD prescribe an allowable maximum access time at the time of the occurrence of the jump corresponding to the prescribed sector numbers.

If the drive apparatus capable of gaining the access involving the jump processing at the allowable maximum access time shown in FIG. 9 or below is given, the content would be stored in the DVD that conforms to the standards so as to guarantee the seamless reproduction even if the jump occurs within the identical layer at the time of the reproduction of the content. That is, the recording of the content is supposed to be performed in a condition where the content stored in the disc are arranged so as to cause no jump processing at a location exceeding the allowable maximum access time as shown in the graph of FIG. 9.

However, there is not provided yet any prescription of the image data and the audio data recording formats suitable to perform the browsable slide show of reading and reproducing the audio in parallel with the consecutive reproduction of the still image. The present invention is to provide a configuration of making it possible to perform the browsable slide show seamlessly without causing any data discontinuity, and the details thereof are described in the following.

An outline of the data recording and reproduction processing involving the jump processing is firstly described. With reference to FIG. 10, the consideration is given about conditions required to realize the seamless reproduction in the disc having more than one recording layer in view of both the jump in an intra-disc of the identical layer (an intra-layer jump) and the jump between the discs of different layers (an inter-layer jump).

FIG. 10A shows a disc configuration of a two-layer structure. The data is recorded in a first layer 511 and a second layer 512 in sector units specified as content data recording units. The record data is supposed to include the image data clip and the audio data clip having been described with reference to FIG. 1.

The jump processing suited to the reproduction mode of the content occurs at the time of the reproduction of the disc containing the content. There may be instances such as the processing of reproducing different AV streams or the reproduction in the browsable slide show that is performed while alternately reading the image data clip and the audio data clip.

It is noted that the jump processing involved in the reproduction of the disc of the structure having more than one recording layer is available in two modes, that is, one jump processing between the recording areas in the identical layer and the other between the recording areas in the different layers. The present invention is to realize the configuration of enabling the seamless reproduction in the occurrence of the inter-layer jump, and the calculation of a total time required at the time of the inter-layer jump is performed.

FIG. 10B is a table showing one embodiment of an intra-layer jump time ($T_{ACC}$) suited to the jump distance in the disc configuration having one layer whose recording capacity is 23.3 Gbytes. The table lists, from the top, [Jump distance (sectors or strokes)], [Data size (MB) corresponding to the jump distance], and [Intra-layer jump time (ms)]. The [Intra-layer jump time (ms)] corresponds to a time required for the seek of the pickup of the drive apparatus that performs the reproduction of the Blu-ray disc, that is, a seek time.

In the table of FIG. 10B, the [Jump distance (sectors or strokes)] is set to give the jump distance of 40000 sectors or below in a sector representation, and the jump distance of a ⅒-stroke or above in a stroke representation. A full-stroke corresponds to a stroke in a range of the disc from an innermost side to an outermost side as shown in FIG. 10A.

It is noted that a relation of 40000 sectors<⅒-stroke exists between the jump distance of the 40000 sectors and the jump distance of the ⅒-stroke, that is, with left-to-right entries in the table, the jump distance increases. A reason why the entries of a large jump distance are given in the sector representation is that there is a large difference in the sector number between an inner and an outer sides of the disc so that a use of the sector representation for the large jump distance causes a range of the sector numbers to be increased too much.

Further, with regard to the jump distances of the ⅒-stroke, a ⅓-stroke and a half-stroke, a data size is given in a lower limit representation. This is because there is a difference in the corresponding data size between the inner and the outer sides of the disc even in the same case of the ⅒-stroke, so that the lower limit representation is given using a calculated value obtained at the inner side where the data size is minimized. It is noted that the lower limit of the data size corresponding to the specific jump distance, if being given, is supposed to be sufficient to determine data arrangement conditions described later, resulting in no description on an upper limit of the corresponding data size.

The jump distance of the full-stroke corresponds to the stroke in the range of the disc from the innermost side to the outermost side, for instance, and the jump data size at the time of the full-stroke reaches 23.3 Gbytes. The time required for the intra-layer full-stroke jump, that is, the intra-layer jump time [$T_{ACC}$] is 1220 ms.

In a case of the jump distance in the range of 0 to 5000 sectors, the jump data size is in the range of 0 to $10 \times 2^{20}$ Bytes, and the time required for the intra-layer jump, that is, the intra-layer jump time [$T_{ACC}$] is 179 ms.

FIG. 10C shows a measured value of an inter-layer jump time ($T_{IL}$) in a certain drive apparatus. That is, Inter-layer jump time [$T_{IL}$]=360 ms. This value corresponds to a time required for an adjustment such as a focus control of the pickup in the case of a change of a reproduction position to different layers of the first and the second layers 511 and 512 in FIG. 10A in the drive apparatus that performs the reproduction of the Blu-ray disc.

FIG. 10D shows a measured value of an overhead time [$T_{OH}$] that is caused at the time when reading an ECC block boundary in the certain drive apparatus. That is, [$T_{OH}$]=20 ms For the reading of the contents stored in the Blu-ray disc, there is provided a setting of a prescribed data read unit. The data read unit is called an ECC block. The ECC block is in the form of a block composed of user data formed with AV stream data, for instance, specified as actual contents data, user control data (UCD) containing various control data, and parity data etc. for the error correction.

The reproduction of the contents, when being performed, requires that the data should be read in ECC block units to perform the data processing such as the error correction based on a parity in the ECC block units.

The execution of the jump in the course of the data reproduction brings about a need for the processing for two different ECC blocks, that is, one ECC block at a jump source and the other at a jump destination. The overhead time involved in the processing for the ECC blocks is assumed to be the overhead time [$T_{OH}$] that is caused at the time when reading the ECC block boundary shown in FIG. 10D.

As described above, the execution of the inter-layer jump causes the intra-layer jump time [$T_{ACC}$] shown in FIG. 10B, the inter-layer jump time [$T_{IL}$] shown in FIG. 10C, and the ECC block read overhead time [$T_{OH}$] shown in FIG. 10D, and as a result, a total inter-layer jump time [$T_{JUMP}$] specified as a time the discontinuity of the reading of the data from the disc is caused in the execution of the inter-layer jump is calculated as follows:

$$T_{JUMP}=T_{ACC}+T_{IL}+T_{OH}$$

Details of the overhead time involved in the ECC block processing that occurs in the jump processing are described with reference to FIG. 11.

Figure 11A:
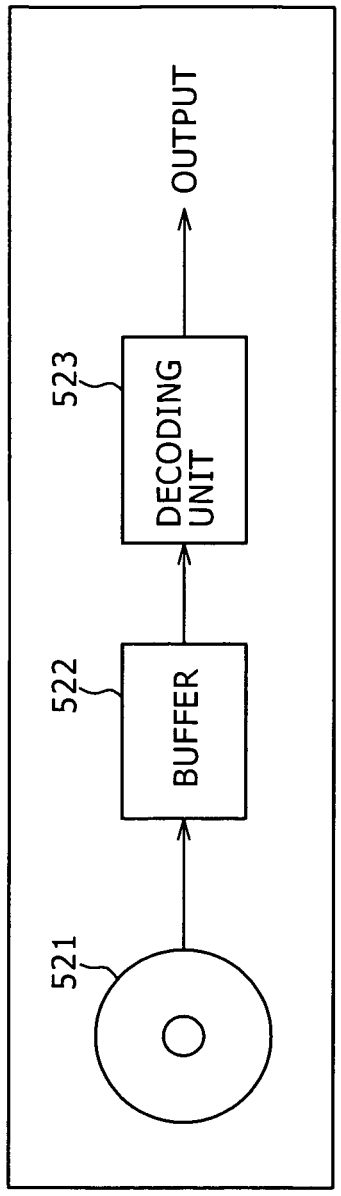
FIG. 11A shows a processing of reading and reproducing data from a disc.

As shown in FIG. 11A, the processing of reading and reproducing the data from the disc firstly allows the data to be read from a disc 521 in the ECC block units into a buffer 522. Further, a decoding is applied in a decoding unit 523 to the data outputted from the buffer. It is noted that the processing such as the error correction is performed prior to the decoding, although not shown in the drawing. The decoding unit 523 performs the decoding in a condition where the adjustment of the reproduction order and the reproduction time is done according to the time stamp information set in the transport stream (TS) contained in the AV stream data within the ECC block, and decoded data is outputted as reproduced content.

Figure 11B:
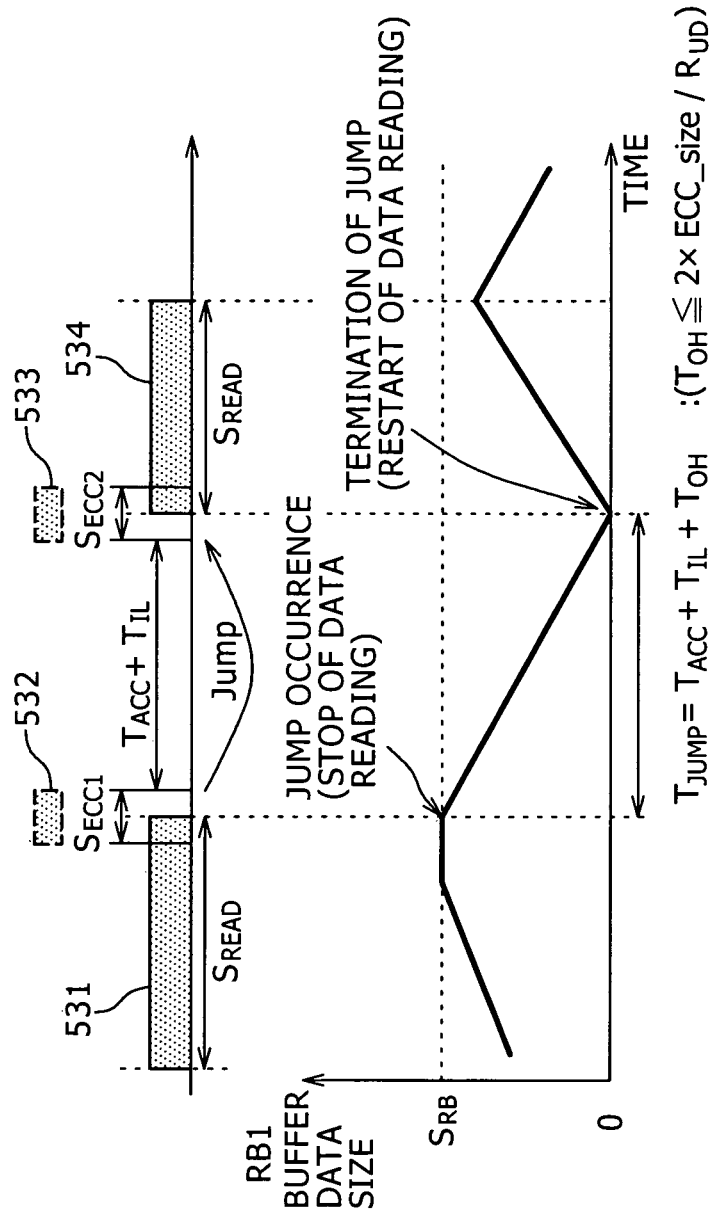
FIG. 11B shows a lapse of a reproduction time and a transition of the size of data stored in a buffer shown in FIG. 11A.

The decoding unit 523 is capable of performing the reproduction continuously as far as the ECC blocks stored in the buffer 522 exist. A graph in FIG. 11B shows a lapse of the reproduction time and a transition of the size of data stored in the buffer 522.

It is appreciated from the buffer data size scaled at the vertical axis that the stop of the reading of the data from the disc with the occurrence of the jump leads to the start of the reduction in the data size, and the restart of the reading of the data from the disc due to the termination of the jump leads to the start of the increase in the buffer data size. If, with the buffer data size reaching zero, the output of the data from the decoding unit 523 is brought into a completion, the reproduction causes the discontinuity. Thus, it becomes necessary to set the buffer size required to prevent the buffer data size from reaching zero.

In one embodiment shown in FIG. 11, when the inter-layer jump occurs in the course of the processing for an ECC block [$S_{ECC1}$] 532 contained in the data 531 read from the disc, an acquisition of the data from the disc is stopped, in which case, after the pickup control that follows the seek to an ECC block position of an ECC block [$S_{ECC2}$] 533 at the read start position in the read data 534 specified as jump destination data, the ECC block [$S_{ECC2}$] 533 is acquired, leading to the execution of the data reproduction through the processing of storing in the buffer and decoding.

In this case, the error correction and the decoding of the final ECC block [$S_{ECC1}$] 532 specified as jump source data and the error correction and the decoding of the first ECC block [$S_{ECC2}$] 533 specified as the jump destination data are required, in which case, however, all the data generated through these processing is not always outputted as the reproduced data.

In the worst case, an ineffective data processing time in which most of the processed data of these two ECC blocks is unavailable as the reproduced data is caused. The time required for the ineffective data processing is defined as the ECC block read overhead time [$T_{OH}$] shown in FIG. 10D.

The overhead time [$T_{OH}$] in the worst case where most of the stored data composed of the ECC block data specified as the jump source data and the ECC block data specified as the jump destination data is unavailable for the reproduction is expressed as follows:

$$T_{OH} = (2 \times ECC\_size)/R_{UD}$$

In the above expression, ECC_size denotes the data size of the individual ECC block, and $R_{UD}$ denotes the reading rate, which corresponds to the transfer rate of the data outputted from the buffer 522 to the decoding unit 523.

Assuming that the ECC block size is 64 KB, and the data transfer rate $R_{UD}$ is 54 Mbps, for instance, the overhead time [$T_{OH}$] is calculated as follows:

$$T_{OH} \leq (2 \times 64 \times 1024 \times 8)/54/10^6 = 20 \text{ ms}$$

That is, a maximum of the ECC block read overhead time [$T_{OH}$] is determined as 20 ms.

A reduction speed of the buffer data size is dependent on the data recording rate $R_{TS}$. The data recording rate $R_{TS}$ is applied to a rate that corresponds to data consumption involved in the data processing in the decoding unit 523.

The size of the reproduced data contained in the individual ECC block is not fixed because of a difference in compression rate, so that the size of the reproduced data, that is, the reproduction data time varies for each ECC block.

Thus, the reduction speed of the buffer data size in the occurrence of the inter-layer jump does not always reach a fixed speed. The reduction in the buffer data size in the occurrence of the inter-layer jump is now described with reference to FIG. 12.

Figures 12A, 12B:
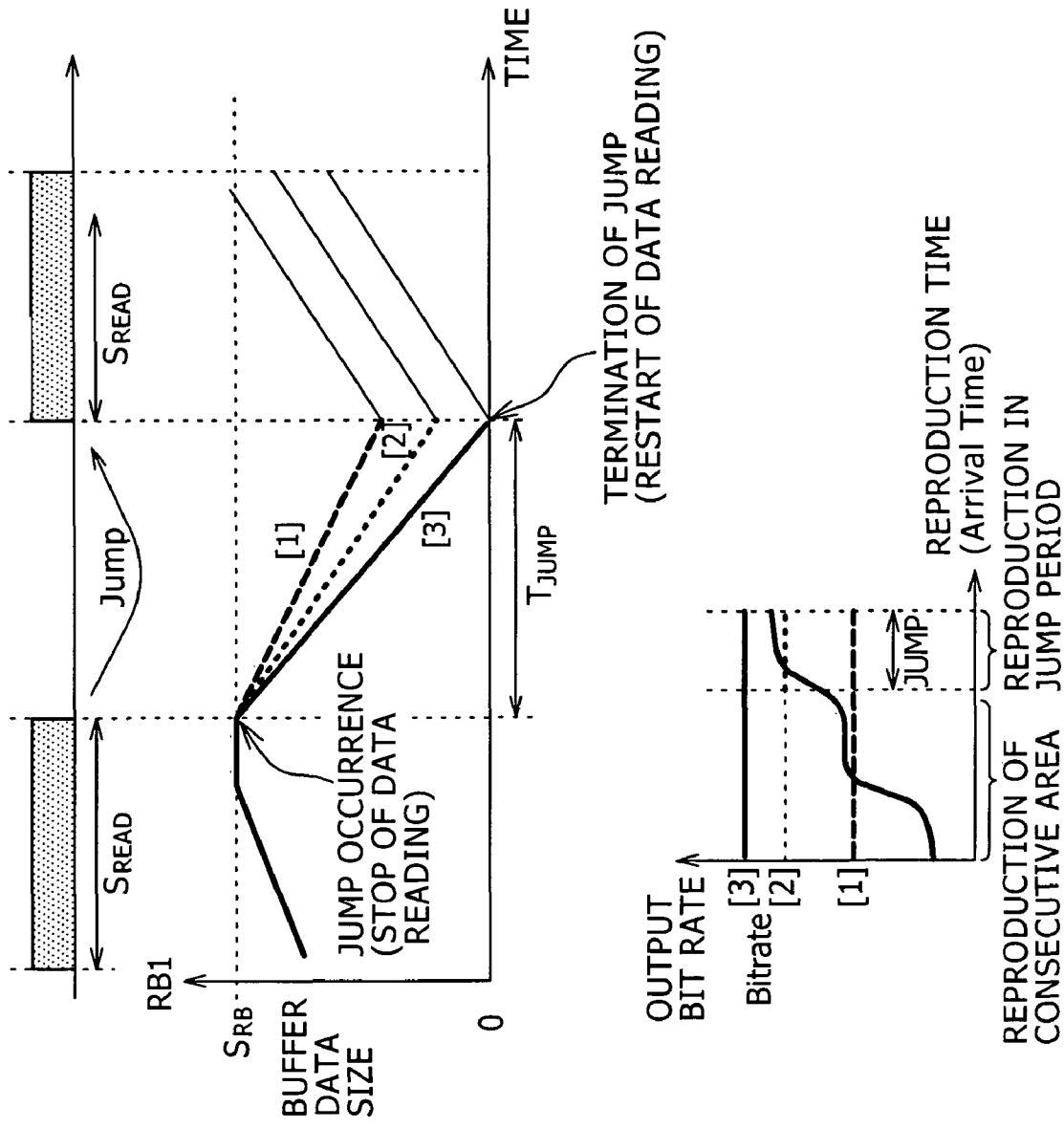
FIG. 12A shows a lapse of the reproduction time and a transition of the size of data stored in the buffer.
FIG. 12B is a graph showing an assumed rate value of lines shown in FIG. 12A.

FIG. 12A is a graph showing the lapse of the reproduction time and the transition of the size of the data stored in the buffer, like the graph shown in FIG. 11.

It is appreciated from the buffer data size scaled at the vertical axis that the stop of the reading of the data from the disc with the occurrence of the jump leads to the start of the reduction in the data size, and the restart of the reading of the data from the disc due to the termination of the jump leads to the start of the increase in the buffer data size. If, with the buffer data size reaching zero, the output of the data from the decoding unit is brought into the completion, the reproduction causes the discontinuity. Thus, it becomes necessary to set the buffer size required to prevent the buffer data size from reaching zero.

To prescribe a maximum buffer size $S_{RB}$, it becomes necessary to assume the reproduction speed of the buffer data size in a jump period. However, the reduction speed of the buffer data size does not always reach the fixed speed as described above.

Thus, provided that some assumption is established to estimate the reduction speed of the buffer data size in the jump period, the buffer size $S_{RB}$ is determined on the above assumption.

A line [1] in the graph shown in FIG. 12A is assumed to be a line obtained by setting the reduction speed of the buffer data size in the jump period on the basis of an average rate available for the reading and the reproduction of the consecutive record data area contained in the disc. A line [2] in the graph is assumed to be a line obtained by setting the reduction speed of the buffer data size in the jump period on the basis of an average rate that is obtained, after an extraction of the data actually involving the jump, instead of the consecutive record data contained in the disc, through the calculation based on the reproduction rate of the extracted data. A line [3] in the graph is assumed to be a line obtained by being set on the basis of a maximum recording rate of the record data that is set as the attribute information corresponding to the contents recorded on the disc.

FIG. 12B is a graph showing an assumed rate value on each line [1], [2], and [3] shown in FIG. 12A. A vertical axis shows a data output bit rate at the time of the reproduction, and a horizontal axis shows the reproduction time.

As shown in the FIG. 12B, the output bit rate has a relation of [1]<[2]<[3], and at the time of the reproduction of the consecutive record data area in the disc, the reproduction is performed at the output bit rate approximately in alignment with the line [1], while at the time of the occurrence of the jump, the reproduction is performed at the output bit rate approximately in alignment with the line [2].

The application of the line [1], that is, the average reproduction rate of the consecutive recording area contained in the disc to the reduction speed of the buffer data size in the jump period causes the buffer data size to be reduced at a speed equal to or more than the assumed bit rate obtained by the application of the line [1], as shown in FIG. 12B, and in the worst case, a loss of the buffer data is caused, leading to the possibility of the reproduction discontinuity. The application of the line [2], that is, the average rate obtained by the calculation based on the reproduction rate in the jump period provides an exact coincidence between the applied assumed bit rate and the actual reduction speed of the buffer data. Thus, the line [2] may be considered to be a theoretically optimum assumed bit rate, in which case, however, it is very difficult to practically specify the data positions corresponding to a beginning and an end points of the jump period, leading to difficulty in calculating the assumed bit rate used for the line [2].

Conversely, according to the assumption based on the line [3] shown in FIG. 12A, that is, one based on the maximum recording rate set as the attribute information corresponding to the contents recorded in the disc, there is the guarantee that the reproduction bit rate of the record data in the disc does not exceed the bit rate of the line [3] shown in FIG. 12B, and even at the time of the occurrence of the jump, the reproduction processing at the bit rate exceeding the bit rate of the line [3] does not take place. Further, the bit rate of the line [3] is assumed to be a set value obtained as the attribute information at the time of a creation of the content, so that the acquisition of the bit rate value may be attained easily with reference to the attribute information.

Thus, provided that the reduction in the buffer data size takes place at the time of the jump on the assumption that the reproduction at the bit rate corresponding to the maximum recording rate of the line [3] is performed, the maximum buffer size $S_{RB}$ is calculated on the above assumption.

The Blu-ray Disc standards prescribe that the data is recorded in the disc as a 192-byte packet obtained by appending a 4-byte header to a 188-byte transport stream (TS) packet (TS packet recording rate is denoted as TS_recording_rate). In a case where the data is assumed to be the 192-byte packet, the maximum recording rate $R_{MAX}$ is expressed as follows:

$$R_{MAX}=(TS\_recording\_rate) \times 192/188.$$

In the reproduction of the disc that completes the data recording in conformity with the Blu-ray Disc standards, the reproduction at the rate equal to or lower than the maximum recording rate $R_{MAX}$ calculated based on the above TS packet size is supposed to be performed. Thus, the buffer size $S_{RB}$ required to prevent the buffer data from reaching zero in the course of the jump at the time when performing the reproduction involving the inter-layer jump is calculated as follows:

$$S_{RB}=R_{MAX} \times T_{JUMP}.$$

One embodiment of a setting that guarantees the reproduction causing no data discontinuity to the inter-layer jump is now described with reference to FIG. 13. When establishing the prescription of the data recording to the disc, it becomes necessary to determine an allowable inter-layer jump mode, that is, the jump range effective in preventing the occurrence of the data discontinuity, thereby performing the content recording in the mode that permits the jump to occur only within the determined range.

FIG. 13A to FIG. 13C show embodiments of the setting of the allowable inter-layer jump and one embodiment of the calculation of the total jump time $T_{JUMP}$ in the inter-layer jump processing. As described above, the total jump time is obtained as a sum of the time $T_{ACC}$ corresponding to the seek time of the pickup, the adjustment time $T_{IL}$ of the pickup, and the overhead time $T_{OH}$ attributed to the ECC block processing, that is, $T_{JUMP}=T_{ACC}+T_{IL}+T_{OH}$.

FIG. 13A shows one model applied to a case where a full-stroke inter-layer jump in the range from the innermost side of the first layer to the outermost side of the second layer is allowed, and the total jump time [$T_{JUMP}$] in this case is given as follows:

$$T_{JUMP}=1220(T_{ACC})+360(T_{IL})+20(T_{OH})=1600 \text{ ms}.$$

It is noted that each of the time [$T_{ACC}$] corresponding to the seek time of the pickup, the adjustment time [$T_{IL}$] of the pickup, and the overhead time [$T_{OH}$] attributed to the ECC block processing is supposed to be based on the embodiment having been described with reference to FIG. 10A to FIG. 10D.

The determination of the arrangement conditions of the record data to the disc based on this case makes it possible to guarantee the consecutive supply of the data, even if the jump takes place between the arbitrary addresses within the recording medium. However, conversely, the jump time is supposed to be set larger than that of models in FIG. 13B and FIG. 13C described later, leading to the increase in the buffer size required to guarantee the consecutive supply of the data as described later with reference to FIG. 14.

FIG. 13B (Case B) shows one model applied to the case where the half-stroke identical intra-layer jump and the ¹⁄₁₀-stroke inter-layer jump are established as the allowable maximum jump distance, and the total jump time $T_{JUMP}$ in this case is given as follows:

(1) Half-Stroke Identical Intra-Layer Jump $$T_{JUMP}=990(T_{ACC})+0(T_{IL})+20(T_{OH})=1010 \text{ ms}$$

(2) ¹⁄₁₀-Stroke Inter-Layer Jump $$T_{JUMP}=650(T_{ACC})+360(T_{IL})+20(T_{OH})=1030 \text{ ms}.$$

The maximum jump time is determined as 1030 ms.

This model is required to determine the data arrangement conditions, provided that the jump distance is limited to the range of about [$8.2 \times 2^{30}/2048$] sectors as to the intra-layer jump, and the range of about [$3 \times 2^{30}/2048$] sectors as to the inter-layer jump, in which case, however, the buffer size required to guarantee the consecutive supply of the data is made smaller than that of the model of FIG. 13A, as described with reference to FIG. 14.

FIG. 13C (Case C) shows one model applied to the case where the ¹⁄₁₀-stroke identical intra-layer jump and the 40000-sector inter-layer jump are established as the allowable maximum jump distance, and the total jump time $T_{JUMP}$ in this case is given as follows:

(1) ¹⁄₁₀-Stroke Identical Intra-Layer Jump $$T_{JUMP}=650(T_{ACC})+0(T_{IL})+20(T_{OH})=670 \text{ ms}$$

(2) 40000-Sector Inter-Layer Jump $$T_{JUMP}=330(T_{ACC})+360(T_{IL})+20(T_{OH})=710 \text{ ms}.$$

The maximum jump time is determined as 710 ms.

This model is required to determine the data arrangement conditions, provided that the jump distance is limited to the range of about [$1.2 \times 2^{30}/2048$] sectors as to the intra-layer jump, and the range of 40000 sectors as to the inter-layer jump, in which case, however, the buffer size required to guarantee the consecutive supply of the data is made smaller than that of the models of FIG. 13A and FIG. 13B, as described with reference to FIG. 14.

Figure 14:
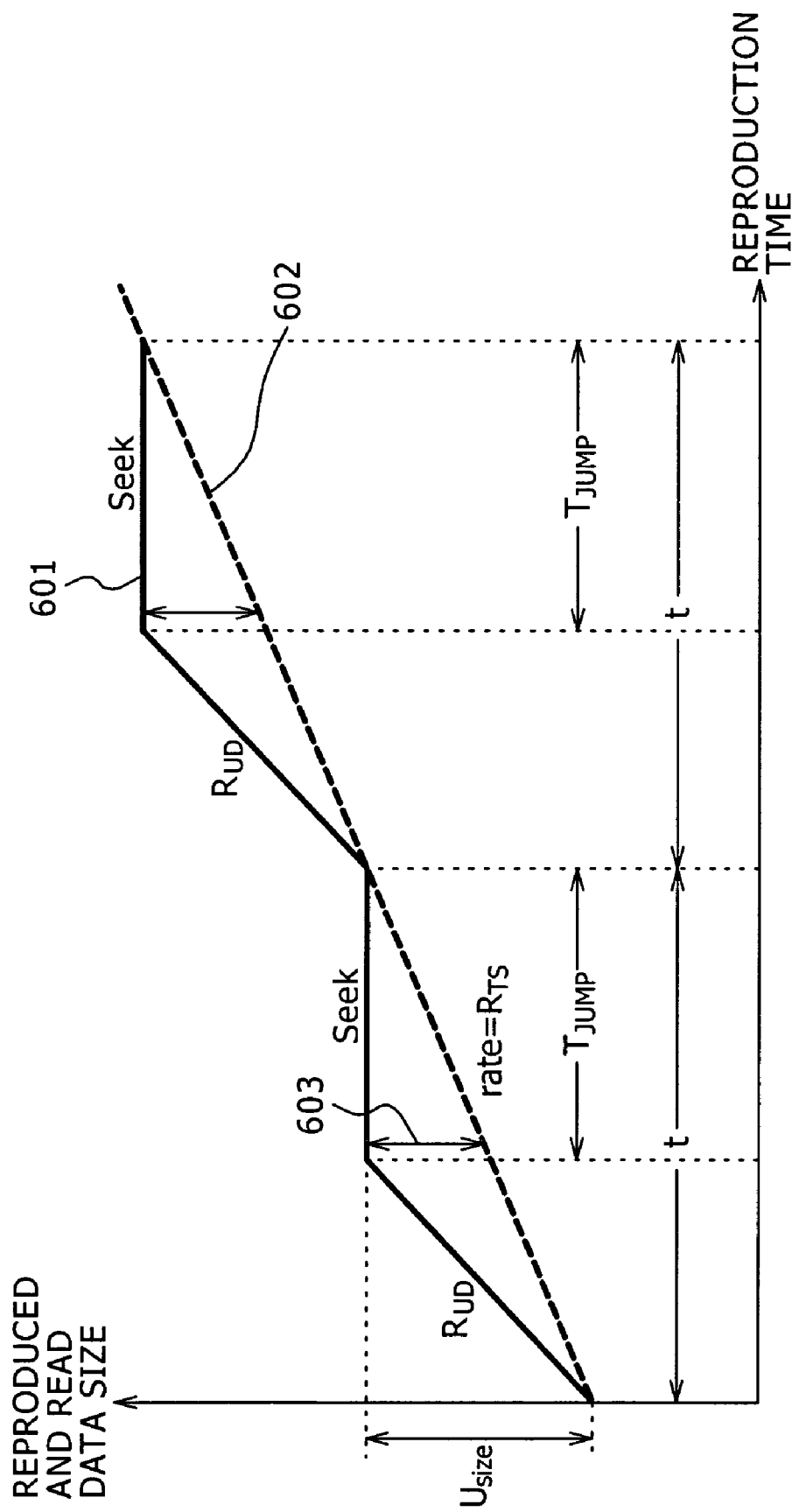
FIG. 14 is a view for illustrating a method of determining consecutive data arrangement conditions suited to a value of a data recording rate with respect to the jump time.

FIG. 14 is a view for illustrating a method of determining the consecutive data arrangement conditions suited to the value of the data recording rate with respect to the jump time. An allowable minimum reproduction time (t) corresponding to a minimum data unit to be arranged consecutively in the disc is calculated based on the total jump time $T_{JUMP}$, the rate $R_{UD}$ of the reading of the data from the disc in the drive, and the maximum recording rate $R_{MAX}$. A value calculated by multiplying the data readout rate $R_{UD}$ by the allowable minimum reproduction time [t] of the data to be arranged consecutively is obtained as a consecutive data arrangement size $U_{size}$. That is, $U_{size}=R_{UD}\times t$. Details of the processing of calculating the consecutive data arrangement size $U_{size}$ are described.

In FIG. 14, a horizontal axis shows the reproduction time, and a vertical axis shows a size of the data read from the disc and a size of the reproduced data. A solid line indicates the transition of a size 601 of the data read from the disc with the lapse of the reproduction time, and a dotted line indicates the transition of a size 602 of the reproduced data with the lapse of the reproduction time.

A difference between the read data size 601 and the reproduced data size 602 corresponds to a buffer data size 603. The reproduced data size 602 is supposed to allow the reproduction of the data of a fixed size with the lapse of the reproduction time, specifically, the reproduced data size 602 increases in proportion to the time as shown in FIG. 14.

Conversely, with regard to the read data size 601, when the jump occurs, the reading of the data from the disc is stopped, so that the increase of the read data size 601 is stopped, while for the processing of reading the consecutive data storage area without involving the jump, the reading of the data is performed at the fixed readout rate, that is, at the rate of 54 Mbps, for instance.

The difference between the read data size 601 and the reproduced data size 602 shown in FIG. 14 is assumed to be the buffer data size 603, in which case, however, if there is provided the setting that guarantees that the buffer data size 603 does not reach zero or below even in the occurrence of the jump processing, the seamless reproduction is made possible without causing any reproduction discontinuity in the jump reproduction.

When the read data size 601 and the reproduced data size 602 are fixed, the buffer data size 603 specified as the difference between the read data size 601 and the reproduced data size 602 may be increased only by increasing the value of $U_{size}$ shown in FIG. 14.

The $U_{size}$ shown in FIG. 14 corresponds to the size of the data applied to the consecutive reading in the disc without involving the jump processing. This data size is called the consecutive data arrangement size $U_{size}$.

The allowable minimum reproduction time [t] of the consecutively arranged data in the disc is calculated depending on the total jump time $T_{JUMP}$, the rate $R_{UD}$ of the reading of the data from the disc in the drive, and the maximum recording rate $R_{MAX}$ according to the following expression. That is, $t=T_{JUMP}\times R_{UD}/(R_{UD}-R_{MAX})$ If the data has been recorded on the disc as the data block corresponding to the allowable minimum reproduction time [t] or above of the consecutive data, the buffer data would not reach 0 or below at the time of the occurrence of the jump, resulting in the guarantee of the consecutive reproduction.

The value calculated by multiplying the maximum recording rate $R_{MAX}$ by the allowable minimum reproduction time [t] of the consecutive data as having been calculated according to the above expression is obtained as the consecutive data arrangement size $U_{size}$. That is, $U_{size}=R_{MAX}\times t$.

If the data has been recorded in the disc as the data block corresponding to the consecutive data arrangement size $U_{size}$ or above, the buffer data would not reach 0 or below at the time of the occurrence of the jump, resulting in the guarantee of the consecutive reproduction.

One embodiment of the calculation of the consecutive data arrangement size $U_{size}$ is specifically described. The total jump time $T_{JUMP}$, the rate $R_{UD}$ of the reading of the data from the disc in the drive, and the maximum recording rate $R_{MAX}$ are assumed to take the following values:

$T_{JUMP}$ [msec]: Intra-layer access time $T_{ACC}$+Inter-layer jump time $T_{IL}$+Overhead $T_{OH}$ attributed to the ECC block boundary $R_{UD}$ [×10$^6$ bps]: Readout rate=54 Mbps $R_{MAX}$ [×10$^6$ bps]: Maximum recording rate (TS_recording_rate×192/188)

Then, the calculation of t[msec] specified as the allowable minimum reproduction time of the consecutive data and $U_{size}$ [×2$^{20}$ Bytes] specified as the consecutive data arrangement size is performed.

The allowable minimum reproduction time [t] of the consecutive data and the consecutive data arrangement size $U_{size}$ are calculated as follows:

$t$ (msec)=$T_{JUMP}\times R_{UD}/(R_{UD}-R_{MAX})$, and $U_{size}$ (Byte)=$t/1000\times R_{MAX}/8$.

The calculation of the consecutive data arrangement size $U_{size}$ through the application of the above expression to the model shown in FIG. 13B, that is, the case where $T_{JUMP}$=1030 ms, results in as follows:

$U_{size}$ (Byte)=20.6 Mbytes, provided that $R_{MAX}$=(TS_recording_rate×192/188)=40 Mbps.

That is, in the case of the model shown in FIG. 13B, that is, when $T_{JUMP}$=1030 ms is determined as the maximum jump time, the recording of the data to the disc needs to satisfy the following condition. Consecutive data arrangement size $U_{size}$=20.6 Mbytes. That is, the data recording through the setting of the consecutive data arrangement area of 20.6 Mbytes or above is required.

As described above, the allowable minimum reproduction time [t] of the consecutive data and the consecutive data arrangement size $U_{size}$ are calculated as follows:

$t$ (msec)=$T_{JUMP}\times R_{UD}/(R_{UD}-R_{MAX})$, and $U_{size}$ (Byte)=$t/1000\times R_{MAX}/8$.

Thus, when the maximum jump time $T_{JUMP}$ is set largely, both the allowable minimum reproduction time [t] and the consecutive data arrangement size $U_{size}$ need to be set largely, resulting in the need to largely set the buffer size.

FIG. 15 is a table that lists, with reference to each of the jump models A to C having been described with reference to FIG. 13A to FIG. 13C, the data arrangement conditions (the minimum of the consecutive data arrangement size) corresponding to values of the maximum recording rate $R_{MAX}$ and the buffer size $S_{RB}$ required to guarantee the consecutive supply of the data using the calculation method having been described with reference to FIG. 14.

As described with reference to FIG. 13A to FIG. 13C, FIG. 13A (Case A) shows one model applied to the case where the full-stroke inter-layer jump in the range from the innermost side of the first layer to the outermost side of the second layer is allowed, and the total jump time $T_{JUMP}$ in this case is given as follows:

$T_{JUMP}$=1220($T_{ACC}$)+360($T_{IL}$)+20($T_{OH}$)=1600 ms

In this case, the required buffer size $S_{RB}$ is assumed to be 9.36 Mbytes, and the data arrangement conditions (the minimum of the consecutive data arrangement size) corresponding to each value of the maximum recording rate $R_{MAX}$ are given as follows:

$R_{MAX}$=5×192/188 Mbps→Consecutive data arrangement size $U_{size}$=1.1 Mbytes $R_{MAX}$=10×192/188 Mbps→Consecutive data arrangement size $U_{size}$=2.4 Mbytes $R_{MAX}$=20×192/188 Mbps→Consecutive data arrangement size $U_{size}$=6.3 Mbytes $R_{MAX}$=30×192/188 Mbps→Consecutive data arrangement size $U_{size}$=13.6 Mbytes $R_{MAX}$=40×192/188 Mbps→Consecutive data arrangement size $U_{size}$=32.0 Mbytes $R_{MAX}$=48×192/188 Mbps→Consecutive data arrangement size $U_{size}$=101.5 Mbytes.

FIG. 13B (Case B) shows one model applied to the case where the half-stroke identical intra-layer jump and the 1/10-stroke inter-layer jump are established as the allowable maximum jump distance, and the total jump time $T_{JUMP}$ in this case is given as follows:

(1) Half-Stroke Identical Intra-Layer Jump $T_{JUMP}$=990($T_{ACC}$)+0($T_{IL}$)+20($T_{OH}$)=1010 ms;

(2) 1/10-Stroke Inter-Layer Jump $T_{JUMP}$=650($T_{ACC}$)+360($T_{IL}$)+20($T_{OH}$)=1030 ms.

Thus, the maximum jump time is determined as 1030 ms.

In this case, the required buffer size $S_{RB}$ is assumed to be 6.02 Mbytes, and the data arrangement conditions (the minimum of the consecutive data arrangement size) corresponding to each value of the maximum recording rate $R_{MAX}$ are given as follows:

$R_{MAX}$=5×192/188 Mbps→Consecutive data arrangement size $U_{size}$=0.7 Mbytes $R_{MAX}$=10×192/188 Mbps→Consecutive data arrangement size $U_{size}$=1.6 Mbytes $R_{MAX}$=20×192/188 Mbps→Consecutive data arrangement size $U_{size}$=4.1 Mbytes $R_{MAX}$=30×192/188 Mbps→Consecutive data arrangement size $U_{size}$=8.7 Mbytes $R_{MAX}$=40×192/188 Mbps→Consecutive data arrangement size $U_{size}$=20.6 Mbytes $R_{MAX}$=48×192/188 Mbps→Consecutive data arrangement size $U_{size}$=65.3 Mbytes.

FIG. 13C (Case C) shows one model applied to the case where the 1/10-stroke identical intra-layer jump and the 40000-sector inter-layer jump are established as the allowable maximum jump distance, and the total jump time $T_{JUMP}$ in this case is given as follows:

(1) 1/10-Stroke Identical Intra-Layer Jump $T_{JUMP}$=650($T_{ACC}$)+0($T_{IL}$)+20($T_{OH}$)=670 ms;

(2) 40000-Sector Inter-Layer Jump $T_{JUMP}$=330($T_{ACC}$)+360($T_{IL}$)+20($T_{OH}$)=710 ms.

Thus, the maximum jump time is determined as 710 ms.

In this case, the required buffer size $S_{RB}$ is assumed to be 4.15 Mbytes, and the data arrangement conditions (the minimum of the consecutive data arrangement size) corresponding to each value of the maximum recording rate $R_{MAX}$ are given as follows:

$R_{MAX}$=5×192/188 Mbps→Consecutive data arrangement size $U_{size}$=0.5 Mbytes $R_{MAX}$=10×192/188 Mbps→Consecutive data arrangement size $U_{size}$=1.1 Mbytes $R_{MAX}$=20×192/188 Mbps→Consecutive data arrangement size $U_{size}$=2.8 Mbytes $R_{MAX}$=30×192/188 Mbps→Consecutive data arrangement size $U_{size}$=6.0 Mbytes $R_{MAX}$=40×192/188 Mbps→Consecutive data arrangement size $U_{size}$=14.2 Mbytes $R_{MAX}$=48×192/188 Mbps→Consecutive data arrangement size $U_{size}$=45.1 Mbytes.

As described above, both the buffer size and the minimum of the consecutive data arrangement size may be reduced as the jump time reduces in the order of Case A→Case B→Case C. The advantage of reducing the buffer size leads to the effect on the cost reduction of the reproducing apparatus. An advantage of reducing the minimum value of the consecutive data arrangement size enables a seamless connection in small arrangement units and small reproduction units even when the AV streams of the same rate are given, leading to the effect of increasing the degree of an editing freedom.

The data arrangement in the browsable slide show of switching and outputting the still image successively and further reproducing and outputting the audio data is now described. The browsable slide show is required to reproduce the data through the alternate jump between the clip data in the image data clip containing the image data and the clip data in the audio data clip containing the audio data as having been described with reference to FIG. 1.

A reproduction operation of the browsable slide show is performed through the following processing (a) and (b), for instance:

(a) When no user operation is given, the processing of reproducing the audio data is performed continuously with the slide being displayed, and (b) In a case where the user gives the operation required to display the next slide, a return to a continuous reading state of the Audio TS is made, after the reading of the data for one sheet of the slide of the Main TS. Then, the next slide is displayed on the display, leading to the continuation of the processing of reproducing the Audio.

In the configuration having a disc 702 mounted to a spindle motor 701 as shown in FIG. 16, for instance, in a case where a main TS 703 containing the image data available for the generation of the slide and an audio TS 704 containing the audio data are contained, the data reproduction, that is, the browsable slide show is performed with the alternate jump between the storage areas for the main TS 703 and for the audio TS 704.

That is, it is necessary to pre-store the audio data of a sufficient size in the buffer available for the storage of the audio data so as to permit the reproduction of the audio data to be continued during the processing of [Jump→Reading of data for one sheet of the slide→Jump].

FIG. 16 shows one embodiment applied to the case where each of the main TS and the audio TS is contained in the disc of the identical layer in the form of a configuration capable of performing the alternate reading on the occasion of the intra-layer jump. As described above, the alternate reading of the main TS and the audio TS contained apart in the disc of the identical layer is performed as follows.

(1) The data of the prescribed size x is read from the main TS.
(2) The jump to the prescribed data position of the audio Ts is performed.
(3) The data of the prescribed size y is read from the audio TS.
(4) The jump to a prescribed data position of the main TS is performed.

Then, the data of the prescribed size x is read from the main TS.

As described above, the size x of the data read from the above main TS per read action is assumed to be the minimum of the size RB1 of the main TS read buffer 333 (See FIGS. 4 and 6). Further, the size y of the data read from the above audio TS per read action is assumed to be the minimum of the size RB2 of the audio TS read buffer 334. Expression applied to calculate the size required for each of the main TS read buffer 333 and the audio TS read buffer 334 is given as follows:

$$RB1 >= R_{MAX1} \times \left(2T_{JUMP} + \frac{RB2}{R_{UD} - R_{MAX2}}\right) \quad [\text{Eq. 1}]$$

$$RB2 >= R_{MAX2} \times \left(2T_{JUMP} + \frac{RB1}{R_{UD} - R_{MAX1}}\right),$$

where:
RB1: Size required for the main TS read buffer 333>=Size of the data read from the main TS per read action
RB2: Size required for the audio TS read buffer 334>=Size of the data read from the audio TS per read action
$T_{JUMP}$: Jump time
$R_{UD}$: Bit rate of the reading from the drive
$R_{MAX1}$: Bit rate of the source packet stream for the main TS (maximum read bit rate)
$R_{MAX2}$: Bit rate of the source packet stream for the audio TS (maximum read bit rate)

For instance, under the following conditions, that is:
Rate of the reading from the drive $R_{UD}$=54 Mbps,
Jump time $T_{JUMP}$=1.01 sec.,
Bit rate of the source packet stream for the main TS $R_{MAX1}$ (maximum read bit rate)=15 Mbps, and
Bit rate of the source packet stream for the audio TS $R_{MAX2}$ (maximum read bit rate)=2.0 Mbps,
the size required for the main TS read buffer 333 results in x=3.90 Mbytes, and the size required for the audio TS read buffer 334 results in y=0.698 Mbytes.

Among the above parameters, the bit rate $R_{UD}$ of the reading from the drive, the bit rate $R_{MAX}$ of the source packet stream for the main TS, and the bit rate $R_{MAX2}$ of the source packet stream for the audio TS are available as the values basically determined depending on the drive apparatus, the processing capability of the reproduction processing, and the packet data size, whereas the jump time $T_{JUMP}$ is supposed to be given as the value that varies with the distance etc. of the jump performed on the disc. The above embodiment gives the instance on the assumption that the jump time $T_{JUMP}$ is 1.01 sec., in which case, however, this value is restrictive to the temporarily set value of the certain jump processing, and the jump time $T_{JUMP}$ is supposed to vary depending on the distance etc. of the jump performed on the disc.

The buffer data size based on the above calculation becomes insufficient to meet a case where the jump time $T_{JUMP}$ is increased with increasing distance etc. of the jump performed on the disc, leading to the possibility of the reproduction discontinuity of the data. Thus, it is necessary to prescribe the data arrangement to limit the jump time $T_{JUMP}$ to the certain time or below, thereby performing the data recording in conformity with the prescribed format of the data arrangement. Then, the data recording in the above format enables the seamless reproduction that causes no data discontinuity.

One embodiment of the setting that guarantees the browsable slide show reproduction causing no data discontinuity is now described with reference to FIG. 17. When establishing the prescription of the data recording to the disc, it becomes necessary to determine the allowable jump mode, that is, the jump range effective in preventing the occurrence of the data discontinuity, thereby performing the contents recording in the mode that permits the jump to occur only within the determined range.

FIG. 17 shows one embodiment of the setting of the allowable jump mode and one embodiment of the calculation of the total jump time $T_{JUMP}$ involved in the jump processing. As described above, the total jump time is obtained as the sum of the time $T_{ACC}$ corresponding to the seek time of the pickup, the adjustment time $T_{IL}$ of the pickup at the time of the execution of the inter-layer jump, and the overhead time $T_{OH}$ attributed to the ECC block processing, that is, $T_{JUMP}=T_{ACC}+T_{IL}++T_{OH}$.

The embodiments shown in FIG. 17A to FIG. 17C are applied to cases where the main TS specified as the image data and the audio TS specified as the audio data are contained in the disc of the identical layer in the form of the configuration capable of performing the alternate reading on the occasion of the intra-layer jump, provided that the inter-layer jump in the browsable slide show is prohibited.

FIG. 17A shows one model (Case D) applied to a case where the full-stroke inter-layer jump in the range from the innermost side to the outermost side is allowed, and the total jump time $T_{JUMP}$ in this case is given as follows:

$$T_{JUMP}=1220(T_{ACC})+0(T_{IL})+20(T_{OH})=1240 \text{ ms}.$$

It is noted that each of the time $T_{ACC}$ corresponding to the seek time of the pickup, the adjustment time $T_{IL}$ of the pickup, and the overhead time $T_{OH}$ attributed to the ECC block processing is supposed to be based on the embodiment having been described with reference to FIG. 10A to FIG. 10D.

The determination of the arrangement conditions of the record data to the disc based on this case makes it possible to guarantee the consecutive supply of the data, even if the jump takes place between the arbitrary addresses within the recording medium. However, conversely, the jump time is supposed to be set larger than that of the models of FIG. 17B and FIG. 17C described later, leading to the increase in the buffer size required to guarantee the consecutive supply of the data, as described with reference to FIG. 18.

FIG. 17B shows one model (Case E) applied to the case where the half-stroke identical intra-layer jump is established as the allowable maximum jump distance, and the total jump time $T_{JUMP}$ in this case is given as follows:

$$T_{JUMP}=990(T_{ACC})+0(T_{IL})+20(T_{OH})=1010 \text{ ms}.$$

Thus, the maximum jump time is determined as 1010 ms.

This model is required to determine the data arrangement conditions, provided that the jump distance is limited such that the maximum jump time in the intra-layer jump reaches 1010 ms or below, in which case, however, the buffer size required to guarantee the consecutive supply of the data is made smaller than that of the model of FIG. 17A, as described with reference to FIG. 18.

FIG. 17C shows one model (Case F) applied to the case where the ⅓-stroke identical intra-layer jump is established as the allowable maximum jump distance, and the total jump time $T_{JUMP}$ in this case is given as follows:

$$T_{JUMP}=880(T_{ACC})+0(T_{IL})+20(T_{OH})=900 \text{ ms}.$$

Thus, the maximum jump time is determined as 900 ms.

This model is required to determine the data arrangement conditions, provided that the jump distance is limited such that the maximum jump time in the intra-layer jump reaches 900 ms or below, in which case, however, the buffer size required to guarantee the consecutive supply of the data is made smaller than that of the models of FIG. 17A and FIG. 17B as described with reference to FIG. 18.

FIG. 18 is a table that lists the buffer sizes obtained by calculating the required buffer sizes, that RB1: Size required for the main TS read buffer 333>=Size of the data read from the main TS per read action, and RB2: Size required for the audio TS read buffer 334>=Size of the data read from the audio TS per read action, in accordance with the above-described mathematical expression (Equation 1) in each of the cases of the jump models of Cases D-F having been described with reference to FIG. 17A to FIG. 17C and the case where the allowance of the full-stroke inter-layer jump (See Case A) having been described with reference to FIG. 13A is given.

The above calculation is supposed to be performed, provided that the bit rate $R_{MAX1}$ of the source packet stream for the main TS is assumed to be $R_{MAX1}$=(192/188)×15 Mbps, and the bit rate $R_{MAX2}$ of the source packet stream for the audio TS is assumed to be $R_{MAX2}$=(192/188)×2.0 Mbps.

It is to be noted that (192/188) in the above expression is assumed to be a value obtained in consideration of a header information size in each TS.

The Case A shows the model applied to the case where the full-stroke inter-layer jump in the range from the innermost side of the first layer to the outermost side of the second layer is allowed, and as described with reference to FIG. 13A, the total jump time $T_{JUMP}$ in this case is given as follows:

$$T_{JUMP}=1220(T_{ACC})+360(T_{IL})+20(T_{OH})=1600 \text{ ms.}$$

In this case, each buffer size required is given as follows:
Minimum size (RB1) required for the main TS read buffer 333: X=6.17 Mbytes, and
Minimum size (RB2) required for the audio TS read buffer 334: y=1105 Kbytes.
Thus, this gives the total buffer size [RB1+RB2]=7.28 Mbytes.

The Case D shows one model applied to the case where the full-stroke identical intra-layer jump is established as the allowable maximum jump distance, and the total jump time [$T_{JUMP}$] in this case is given as follows:

$$T_{JUMP}=1220(T_{ACC})+0(T_{IL})+20(T_{OH})=1240 \text{ ms.}$$

Thus, the maximum jump time is determined as 1240 ms.
In this case, each buffer size required is given as follows:
Minimum size (RB1) required for the main TS read buffer 333: x=4.79 Mbytes, and
Minimum size (RB2) required for the audio TS read buffer 334: y=857 Kbytes.
Thus, this gives the total buffer size [RB1+RB2]=5.64 Mbytes.

The Case E shows one model applied to the case where the half-stroke identical intra-layer jump is established as the allowable maximum jump distance, and the total jump time $T_{JUMP}$ in this case is given as follows:

$$T_{JUMP}=990(T_{ACC})+0(T_{IL})+20(T_{OH})=1010 \text{ ms.}$$

Thus, the maximum jump time is determined as 1010 ms.
In this case, each buffer size required is given as follows:
Minimum size (RB1) required for the main TS read buffer 333: x=3.90 Mbytes, and
Minimum size (RB2) required for the audio TS read buffer 334: y=698 Kbytes.
Thus, this gives the total buffer size [RB1+RB2]=4.60 Mbytes.

The Case F shows one model applied to the case where the ⅓-stroke identical intra-layer jump is established as the allowable maximum jump distance, and the total jump time $T_{JUMP}$ in this case is given as follows:

$$T_{JUMP}=880(T_{ACC})+0(T_{IL})+20(T_{OH})=900 \text{ ms.}$$

Thus, the maximum jump time is determined as 900 ms.
In this case, each buffer size required is given as follows:
Minimum size (RB1) required for the main TS read buffer 333: x=3.48 Mbytes, and
Minimum size (RB2) required for the audio TS read buffer 334: y=622 Kbytes.
Thus, this gives the total buffer size [RB1+RB2]=4.10 Mbytes As described above, the minimum of the buffer size may be reduced as the jump time reduces in the order of (Case A→Case D→Case E→Case F. The advantage of reducing the buffer size leads to the effect on the cost reduction of the reproducing apparatus.

It may be appreciated from FIGS. 15 and 18 showing the buffer size required for each pattern of the inter-layer jump and the intra-layer jump that the use of the different jump models for each of an inter-clip seamless connection (connection_condition=5) and the browsable slide show respectively prescribed as the reproduction applications of the BD-ROM enables the reduction of the buffer size required as that in a BD-ROM reproduction system.

For instance, the application of the model shown as the Case C in FIG. 15 to the inter-clip seamless connection and the application of the model shown as the Case E in FIG. 18 to the browsable slide show (TS_recording_rate for the Audio TS=2.0 Mbps, and TS_recording_rate for the Main TS=15 Mbps) make it possible to reduce the buffer size required as that in the BD-ROM reproduction system to 4.60 Mbytes.

FIG. 19A to FIG. 19C are views for illustrating the data arrangement conditions of a clip #1 adapted to the main TS (the image data) and a clip #2 adapted to the audio TS (the audio data) for performing the browsable slide show required for the application of the cases of the jump models of the Case D to the Case F having been described with reference to FIG. 18.

As described with reference to the reproduction models of the browsable slide show, the processing of [Jump→Reading of data for one sheet of the slide→Jump] occurs from the arbitrary location in the course of the reproduction of the Audio TS. Thus, each of the Main TS and the Audio Ts should be arranged in the consecutive area, and the whole area containing the Main TS and the Audio TS should fall in the range of the maximum jump distance ($D_{MAX}$ in the drawing) suited to the Case D to the Case F.

The clip #1 shown in FIGS. 19A and C corresponds to the image data clip contained in the clip of the contents data file having been described with reference to FIG. 1, and the clip #2 corresponds to the audio data clip. The browsable slide show is supposed to perform the reproduction processing through the alternate reading of the clips #1 and #2.

A play list #1 has a program configuration shown in FIG. 19B, for instance, and is in the form of a list in which a prescribed sequence of the clips to be reproduced is established. Thus, in the case of the execution of the reproduction based on the play list #1 shown in FIG. 19B, for instance, the reproduction of the clip #2 is supposed to follow the reproduction of the contents in the clip #1. In this case, when the clips in the range of the clip #1 to the clip #2 are not contained in the consecutive area of the disc, the jump processing occurs.

In a case where the jump processing is performed, it is necessary to perform the data recording through a segmentation of each clip data such that the jump distance is limited to less than the allowable maximum jump distance.

In each of the jump models of the Case D to the Case F having been described with reference to FIG. 18, the data arrangement conditions that guarantee the seamless reproduction in the case of the occurrence of the jump between the clips in the browsable slide show performed through the application of the clips #1 and #2 shown in FIG. 19A are set as shown in FIG. 19C.

To guarantee the seamless reproduction in the reproduction of the browsable slide show, the whole area containing the Main TS and the Audio TS should fall in the range of the maximum jump distance ($D_{MAX}$ in the drawing) suited to the cases of the Case D to the Case F. Thus, the data arrangement conditions for the seamless reproduction in the browsable slide show need to satisfy the following two conditions:

(1) Main TS size ($S_{MAIN}$)+(Audio TS size) ($S_{SUB}$)$\leq D_{MAX}$, and (2) All the data for the Main TS and the Audio Ts should be arranged consecutively within the range of the maximum jump distance $D_{MAX}$.

[4. Content Recording and Reproduction Processing]

Figure 20:
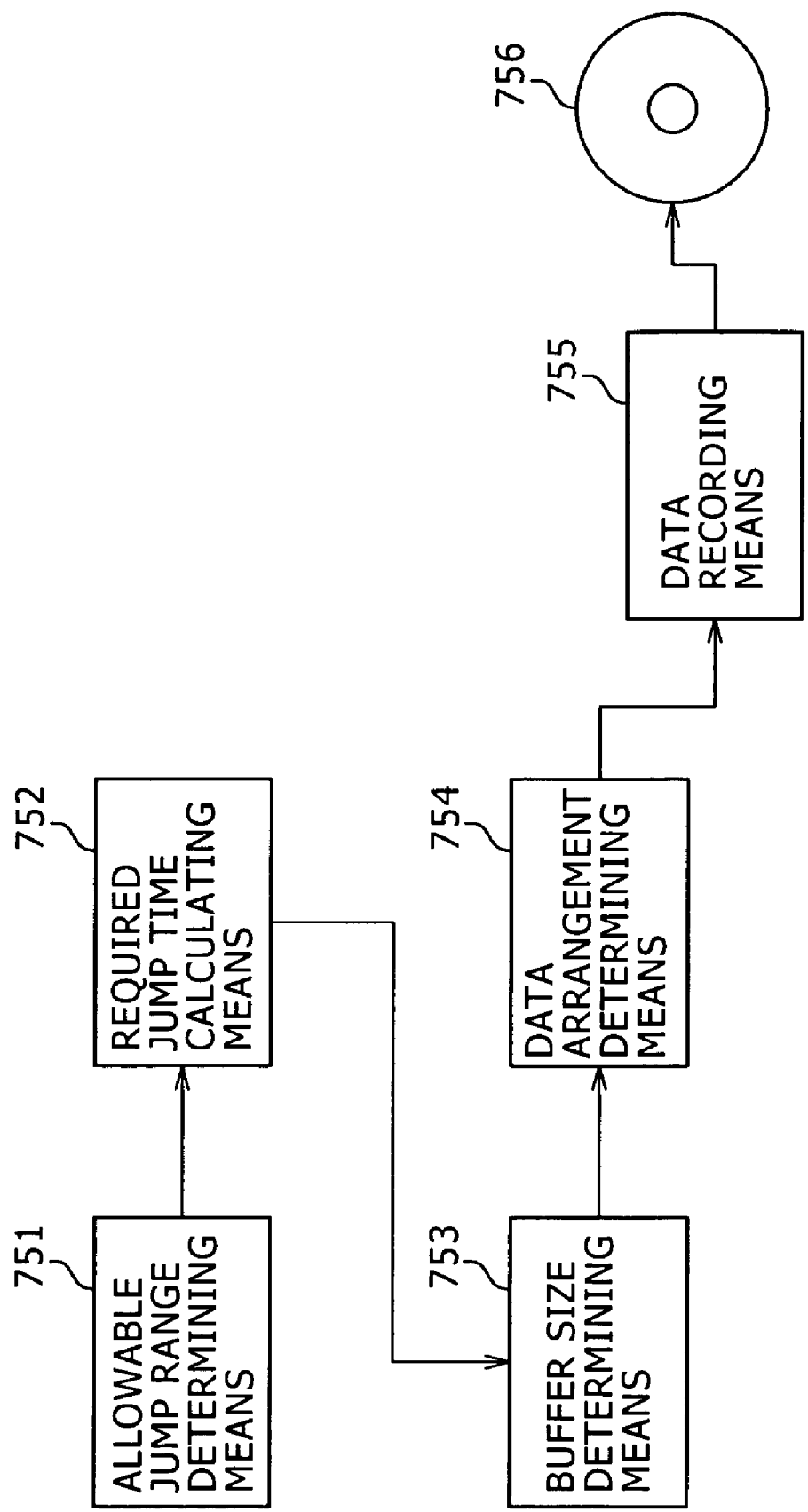
FIG. 20 is a view for explaining a structural example of a data processing apparatus generating record data for an information recording medium.

A configuration of a data processing apparatus that performs the above data processing is now described with reference to FIG. 20. The data processing apparatus of the present invention is available as a data processing apparatus that determines the form of the arrangement of, to the information recording medium, the record data including the image data clip containing the image data and the audio data clip containing the audio data for the application to the browsable slide show of performing the audio reproduction processing in parallel with the consecutive reproduction of the still image. The data processing apparatus includes allowable jump range determining means 751, required jump time calculating means 752, buffer size determining means 753, data arrangement determining means 754, and data recording means 755, and performs writing of the data to an information recording medium 756.

The allowable jump range determining means 751 performs the processing of determining the allowable range of each of the identical intra-layer jump and the inter-layer jump that are performed in the reproduction processing for the information recording medium. The processing of setting one of the jump models having been described with reference to FIGS. 13 and 17, for instance, is involved.

The required jump time determining means 752 calculates the time required for each of the identical intra-layer jump and the inter-layer jump on the basis of allowable jump range information determined with the allowable jump range determining means 751.

The required jump time calculating means 752 calculates, as the required jump time for the identical intra-layer jump, the sum of the seek time of the pickup, and the overhead time involved in the processing for the read data unit block of the information recording medium, and as the required jump time for the inter-layer jump, the sum of the seek time of the pickup, the pickup adjustment time involved in the inter-layer seek, and the overhead time involved in the processing for the read data unit block of the information recording medium.

The buffer size determining means 753 determines, on the basis of the required jump time calculated with the required jump time calculating means 752, the size of the image data buffer containing the image data read from the information recording medium and the size of the audio data buffer containing the audio data. The calculation performed through the application of the above-described expression [Eq. 1] is involved in the determination step.

The data arrangement determining means 754 determines the data arrangement so that the image data clip and the audio data clip applied to the browsable slide show are recorded within the allowable jump range calculated with the allowable jump range determining means 751. Specifically, as described with reference to FIG. 19, the data size $S_{MAIN}$ of the image data clip and the data size $S_{SUB}$ of the audio data clip for the application to the browsable slide show are calculated, and when the jump allowable range calculated by the allowable jump range determination means 751 takes the value of $D_{MAIN}$, the form of the data arrangement that conforms to the setting that satisfies the following conditions (a) and (b) are determined:

(a) $S_{MAIN}+S_{SUB} \leq D_{MAX}$, and (b) The image data clip and the audio data clip should be in the consecutive arrangement within the range of the size $D_{MAX}$.

The data recording means 755 performs the data recording to the information recording medium 756 in conformity with the form of the data arrangement determined with the above data arrangement determining means 754.

Figure 21:
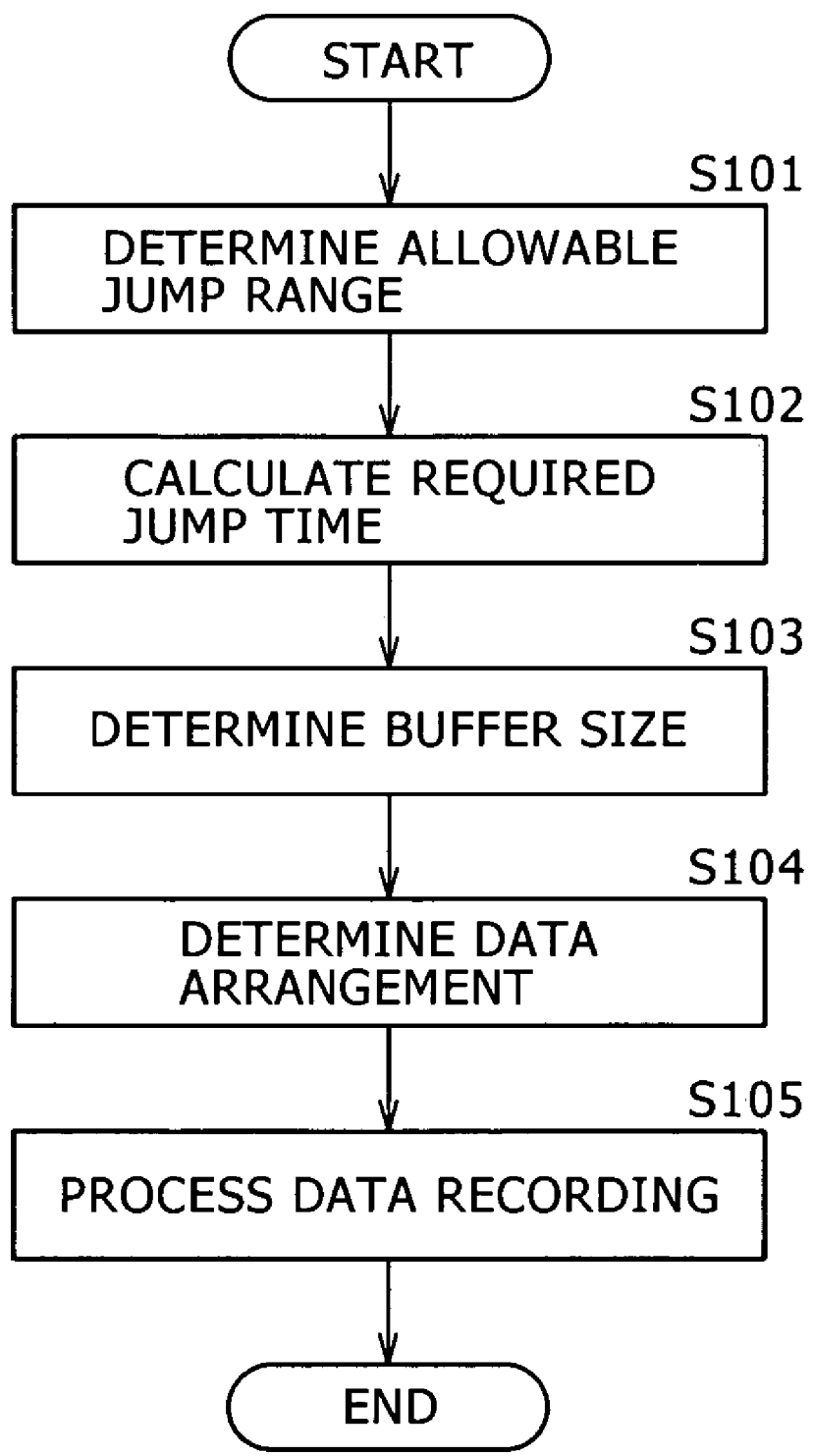
FIG. 21 is a flowchart for explaining a data processing sequence for generating the record data for the information recording medium.

A sequence of the data processing method of the present invention is now described with reference to FIG. 21. The data processing of the present invention is available as a data processing that determines the form of the arrangement of, to the information recording medium, the record data including the image data clip containing the image data and the audio data clip containing the audio data for the application to the browsable slide show of performing the audio reproduction processing in parallel with the consecutive reproduction of the still image.

Firstly, in Step S101, the allowable range of the jump performed in the reproduction processing for the information recording medium is determined. The processing of setting one of the jump models having been described with reference to FIG. 13 or 17, for instance, is involved.

Then, in Step S102, the required jump time is calculated. The time required for each of the identical intra-layer jump and the inter-layer jump is calculated on the basis of the allowable jump range information determined in the Step S101.

Specifically, the sum of the seek time of the pickup and the overhead time involved in the processing for the read data unit block of the information recording medium is calculated as the required jump time for the identical intra-layer jump, and the sum of the seek time of the pickup, the pickup adjustment time involved in the inter-layer seek, and the overhead time involved in the processing for the read data unit block of the information recording medium is calculated as the required jump time for the inter-layer jump.

In Step S103, the size of the image data buffer containing the image data read from the information recording medium and the size of the audio data buffer containing the audio data are determined on the basis of the required jump time calculated in the Step S102. The calculation performed through the application of the above-described expression (the mathematical expression 1) is involved in the determination step.

In Step S104, the data arrangement is determined so that the image data clip and the audio data clip contained in the information recording medium for the application to the browsable slide show are set within the allowable jump range calculated in the allowable jump range determination step in the Step S101.

Specifically, as described with reference to FIG. 19, the data size $S_{MAIN}$ of the image data clip and the data size $S_{SUB}$ of the audio data clip for the application to the browsable slide show are calculated, and when the allowable jump range calculated in the allowable jump range determination step takes the value of $D_{MAX}$, the form of the data arrangement that conforms to the setting that satisfies the following condition is determined:

$$S_{MAIN} + S_{SUB} < D_{MAX}.$$

In Step S105, the data recording to the information recording medium is performed in conformity with the form of the data arrangement determined in the Step S104 specified as the data arrangement determination step.

The above processing enables the seamlessly consecutive reproduction without causing any data discontinuity even when the jump occurs in the course of the reproduction of the content contained in the information recording medium. In particular, in the jump processing that occurs at the time of the reproduction of the browsable slide show of performing the audio reproduction processing in parallel with the consecutive reproduction of the still image, the seamlessly consecutive reproduction is made possible without causing any data discontinuity.

[5. Configuration Enabling a Flexible Setting of Readout Rate]

In the above description regarding [2. Browsable slide show], [3. Jump processing and content storage format], and [4. Content recording and reproduction processing], in the browsable slide show for reproducing a still image together with audio, a configuration for surely executing a reproduction processing without data discontinuity in a case of occurring of a jump processing has been explained. In the above-described processing example, an example in which the audio TS read (reproduction) rate $R_{TS2}$ and the main (image) TS read (reproduction) rate $R_{TS1}$ are basically set to be a combination of fixed values has been described. In the following, a configuration in which these readout rates $R_{TS1}$ and $R_{TS2}$ can be set flexibly.

The browsable slide show is required to reproduce the data through the alternate jump between the clip data in the image data clip containing the image data and the clip data in the audio data clip containing the audio data as having been described above.

A reproduction operation of the browsable slide show is performed through the following processing (a) and (b), for instance:

(a) When no user operation is given, the processing of reproducing the audio data is performed continuously with the slide being displayed, and (b) In a case where the user gives the operation required to display the next slide, a return to a continuous reading state of the audio TS is made, after the reading of the data for one sheet of the slide of the main TS. Then, the next slide is displayed on the display, leading to the continuation of the processing of reproducing the audio.

In the configuration having a disc 702 mounted to a spindle motor 701 as described with reference to FIG. 16 above, for instance, in a case where a main TS 703 containing the image data available for the generation of the slide and an audio TS 704 containing the audio data are contained, the data reproduction, that is, the browsable slide show is performed with the alternate jump between the storage areas for the main TS 703 and for the audio TS 704.

That is, it is necessary to pre-store the audio data of a sufficient size in the buffer available for the storage of the audio data so as to permit the reproduction of the audio data to be continued during the processing of [Jump→Reading of data for one sheet of the slide→Jump]. A processing sequence in the browsable slide show is as follows:

(1) The data of the prescribed size x is read from the main TS.
(2) The jump to the prescribed data position of the audio Ts is performed.

(3) The data of the prescribed size y is read from the audio TS.
(4) The jump to a prescribed data position of the main TS is performed. Then, the data of the prescribed size x is read from the main TS.

As described above, the size x of the data read from the above main TS per read action is assumed to be the minimum of the size RB1 of the main TS read buffer 333 (See FIGS. 4 and 6). Further, the size y of the data read from the above audio TS per read action is assumed to be the minimum of the size RB2 of the audio TS read buffer 334. In the embodiment described above, an expression applied to calculate the size required for each of the main TS read buffer 333 and the audio TS read buffer 334 is Equation 1:

$$RB1 >= R_{MAX1} \times \left(2T_{JUMP} + \frac{RB2}{R_{UD} - R_{MAX2}}\right) \quad [\text{Eq. 1}]$$

$$RB2 >= R_{MAX2} \times \left(2T_{JUMP} + \frac{RB1}{R_{UD} - R_{MAX1}}\right),$$

where:

RB1: Size required for the main TS read buffer 333>=Size of the data read from the main TS per read action,
RB2: Size required for the audio TS read buffer 334>=Size of the data read from the audio TS per read action,
$T_{JUMP}$: Jump time,
$R_{UD}$: Bit rate of the reading from the drive,
$R_{MAX1}$: Bit rate (maximum read bit rate) of the source packet stream for the main TS, and
$R_{MAX2}$: Bit rate (maximum read bit rate) of the source packet stream for the audio TS.

The expression [Eq. 1] is identical to the above-mentioned Equation 1.

It is noted that the relationship between $R_{MAX1}$, $R_{MAX2}$ and $R_{TS1}$, $R_{TS2}$ will be as follows:

$$R_{MAX1} = R_{TS1} \times (192/188), \text{ and}$$

$$R_{MAX2} = R_{TS2} \times (192/188).$$

Relationship between $R_{MAX1}$, $R_{MAX2}$ and $R_{TS1}$, $R_{TS2}$ will be precisely described. As described above with reference to FIG. 3 and FIG. 5, the main player (for image data) (BDAV MPEG2 TS player_1) 335 input source packet data read out from the main TS read buffer 333 at the bit rate $R_{MAX1}$. $R_{MAX1}$ denotes the bit rate of the source packet stream in the main TS file.

The source depacketizer unit 371 for the main player (for the image data) 335 (see FIG. 5) receives data at the bit rate $R_{MAX1}$, performs a depacketizing processing on the source packet depending on a count value of the arrival time clock counter 372 to output the processed data at the bit rate $R_{TS1}$ from the source depacketizer unit 371.

In other words, the source packet stream of the main TS file is input to the main player (for image data) (BDAV MPEG2 Player_1) 335 at the bit rate $R_{MAX1}$ from the main TS read buffer 333 shown in FIG. 4, and is subject to the depacketizing processing to be output at the bit rate $R_{TS1}$ from the main player (for image data) 335 shown in FIG. 4 as data of 188-byte base.

This also applies to the audio TS file constituting the audio data. The source packet stream is input at the bit rate $R_{MAX2}$ from the audio TS read buffer 334 shown in FIG. 4 as data of 192-byte base, and is subject to the depacketizing processing to be output at the bit rate $R_{TS2}$ as data of 188-byte base.

Therefore, the relationship between $R_{MAX1}$, $R_{MAX2}$ and $R_{TS1}$, $R_{TS2}$ will be as follows:

$$R_{MAX1} = R_{TS1} \times (192/188), \text{ and}$$

$$R_{MAX2} = R_{TS2} \times (192/188).$$

In a case where various conditions are set in Equation 1, that is, on an assumption that the readout rate $R_{UD}$ of reading from the drive is 54 Mbps, the jump time $T_{JUMP}$ is 1.01 sec., the bit rate $R_{TS1}$ of the source packet stream for the main TS is 15 Mbps, and the bit rate $R_{TS2}$ of the source packet stream for the audio TS is 2.0 Mbps, there are obtained the size required for the main TS read buffer 333 being x=3.90 Mbytes, and the size required for the audio TS read buffer 334 being y=0.698 Mbytes so that a buffer size required for the reproducing apparatus can be determined. It is noted that, in determining of the above buffer size, the relational expressions, $R_{MAX1} = R_{TS1} \times (192/188)$ and $R_{MAX2} = R_{TS2} \times (192/188)$, are on the assumption.

Although Equation 1 uses $R_{MAX1}$ and $R_{MAX2}$ in the expression, it is possible to determine the buffer size depending on either one of the setting of $R_{TS1}$ and $R_{TS2}$ or the setting of $R_{MAX1}$ and $R_{MAX2}$ because $R_{MAX1}$, $R_{MAX2}$ and $R_{TS1}$, $R_{TS2}$ are in relation that one can be determined depending on the other one.

As thus described, in a process of determining the buffer size using Equation 1, a process is performed on an assumption of the fixed readout rate of the image and audio data, that is, the bit rate of the source packet stream of the main TS: $R_{TS1}$=15 Mbps and the bit rate of the source packet stream of the audio TS: $R_{TS2}$=2.0 Mbps.

However, some content stored in an information recording medium may require reproduction of higher quality audio data. In a case of reproducing high quality audio data such as multi-channel surround data requiring 6-channels or 8-channels or LPCM data as uncompressed data, the above-mentioned $R_{TS2}$=2.0 Mbps is insufficient for the audio TS read (reproduction) rate and it is required to reproduce data at the readout rate of 10-30 Mbps.

In the above-mentioned process example, although a calculating process in which the buffer size required for reproduction without data discontinuity in the browsable slide show performing a jump processing with fixed readout rates of the image data and audio data has been described, in the following, a configuration in which the total buffer size [RB1+RB2] of the reproducing apparatus is made fixed and the readout rate of the audio data is made changeable so as to enable high quality audio data reproduction will be described. It is noted that the configuration described below is a configuration in which not only the readout rate of the audio data but also the readout rate of the main TS, that is, the image data are made changeable.

Rewriting of Equation 1 by adopting the total buffer size [RB1+RB2] results in the following expression [Equation 2]:

$$2T(R_{MAX1} + T_{MAX2}) + \frac{4TR_{MAX1}R_{MAX2}}{R_{UD} - (R_{MAX1} + R_{MAX2})} \leq RB1 + RB2. \quad [\text{Eq. 2}]$$

As can be seen from the above Equation 2, even in a case where the total buffer size [RB1+RB2] is made fixed, there exist a large number of combinations of the maximum readout rate $R_{MAX1}$ of the image data contained in the record data and the maximum readout rate $R_{MAX2}$ of the audio data contained in the record data, both satisfying Equation 2.

Although Equation 2 uses $R_{MAX1}$ and $R_{MAX2}$ in the expression, as described above, $R_{MAX1}$, $R_{MAX2}$ and $R_{TS1}$, $R_{TS2}$ are in relation that one can be determined depending on the other one using the relational expressions, that is, $R_{MAX1}=R_{TS1} \times (192/188)$ and $R_{MAX2}=R_{TS2} \times (192/188)$, as can be seen from Equation 2, even in a case where the total buffer size [RB1+RB2] is made fixed, there exist a large number of combinations of $R_{MAX1}$ and $R_{MAX2}$, both satisfying Equation 2. Therefore, this results in a large number of combinations of the audio TS read (reproduction) rate $R_{TS2}$ and the main (image) TS read (reproduction) rate $R_{TS1}$, both satisfying Equation 2.

Application of a combination of the audio TS read (reproduction) rate $R_{TS2}$ and the main TS read (reproduction) rate $R_{TS1}$ satisfying Equation 2 makes the browsable slide show without data discontinuity executable in the reproducing apparatus.

In the following, a specific example of setting the audio data readout rate $R_{TS2}$ and the image data readout rate $R_{TS1}$. In the following, two processing examples (A) and (B) will be sequentially described.

(1) Processing Example A

Figure 22A:
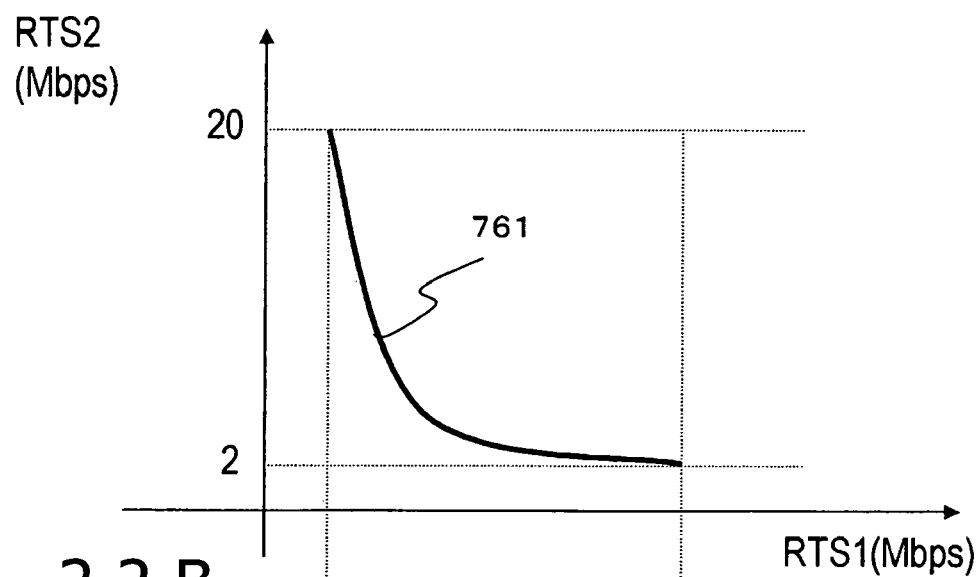
FIG. 22 is a view for explaining a processing example (processing example A) for calculating a combination of the image data readout rate $R_{TS1}$ and the audio data readout rate $R_{TS2}$.

Referring to FIG. 22, the processing example A is described. The processing example A is a processing calculating a combination of the image data readout rate $R_{TS1}$ and the audio data readout rate $R_{TS2}$ satisfying the Equation 3 by directly adopting Equation 2. FIG. 22A shows a graph of relation between the rates satisfying Equation 2. In the graph, the horizontal axis shows the image data readout rate $R_{TS1}$ Mbps, and the vertical axis shows the audio data readout rate $R_{TS2}$ Mbps. A combination of $R_{TS1}$ and $R_{TS2}$ is determined so as to satisfy Equation 1.

Figure 22B:
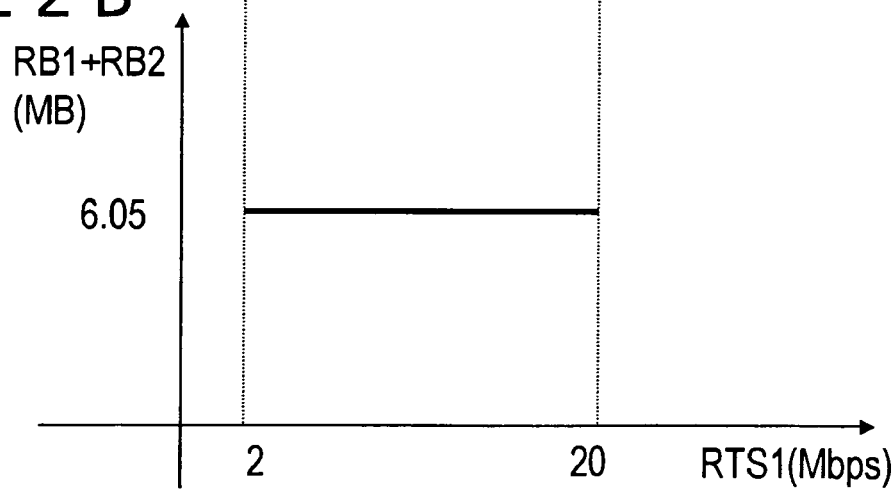

In FIG. 22B, the horizontal axis shows the image data readout rate $R_{TS1}$ Mbps and the vertical axis shows the total buffer size [RB1+RB2] MB. In the processing example, the total buffer size [RB1+RB2] MB is set to be a fixed value of 6.05 MB.

In the case of the total buffer size [RB1+RB2]=6.05 MB, the combination of the image data readout rate $R_{TS1}$ Mbps and the audio data readout rate $R_{TS2}$ Mbps satisfying Equation 2 is any point on a curve 761 in the graph of FIG. 22A and there exist a lot of combinations.

An example case of selecting a specific combination from these many combinations will be described. An assumption is made on, for example, a case of performing an 8-channel LPCM reproduction as a multi-channel surround reproduction. It is assumed that each channel comprises 96 kHz/24 bit data. In this case, the data amount required for reproduction, that is, the readout rate is 96 kHz×24 bit×8 ch=18.432 Mbps so that if the audio data readout rate $R_{TS2}$ is set to around 20 Mbps, the 8-channel LPCM reproduction is made possible.

Figure 23:
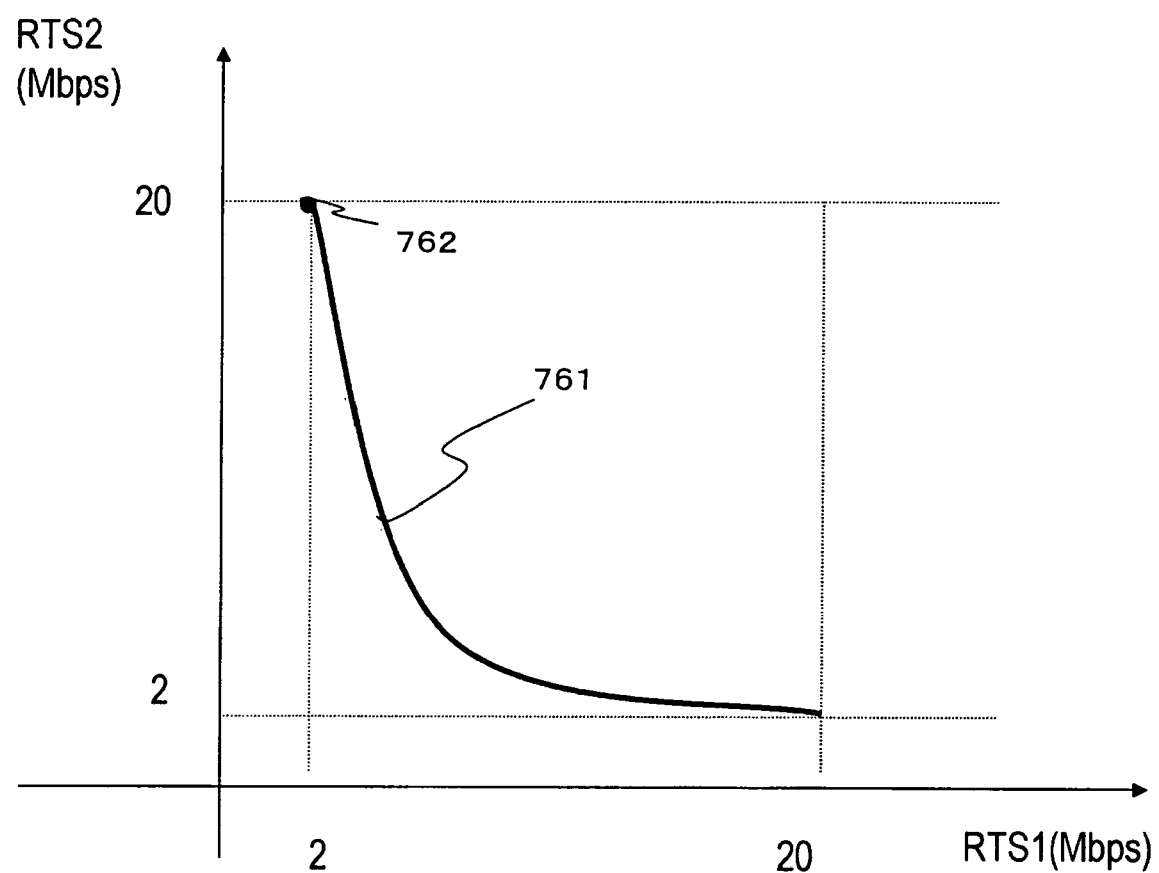
FIG. 23 is a view for explaining a specific example of a rate determining processing in the processing example (processing example A) for calculating the combination of the image data readout rate $R_{TS1}$ and the audio data readout rate $R_{TS2}$.

In this way, first, the required audio data readout rate $R_{TS2}$ of about 20 Mbps is obtained and assigned to Equation 2 to calculate the image data readout rate $R_{TS1}$ satisfying Equation 2. This is equivalent to a processing for obtaining the audio data readout rate $R_{TS2}$ and the image data readout rate $R_{TS1}$ corresponding to a point 762 of the curve 761 of the graph in FIG. 23. As can be seen from the figure, in a case where the required audio data readout rate $R_{TS2}$ is smaller than 20 Mbps, it is possible to shorten the reading time of the image data at the time of browsable slide show reproduction by selecting a combination in which the image data readout rate $R_{TS1}$ is large from combinations corresponding to a point on the curve 761 of the graph in FIG. 23.

Each data in Equation 2 is set on the following assumption, that is, the total buffer size [RB1+RB2] MB=6.05 Mb, the readout rate from the drive: $R_{UD}$=54 Mbps, and jump time $(T_{JUMP})$=1.01 sec.

These values, namely, the total buffer size [RB1+RB2] and the readout rate from the drive $R_{UD}$ are determined due to the function of the reproducing apparatus and the jump time is determined in accordance with the function of the reproducing apparatus and an interval between the image data and the audio data recorded in the information recording medium. Allowable jump distance differ depending on the recording format of the content recorded in the information recording medium and the jump time to be applied depends on the recording format.

In addition, an assumption is made on a case of performing a 6-channel LPCM reproduction as a multi-channel surround reproduction. It is assumed that each channel comprises 192 kHz/24 bit data. In this case, the data amount required for reproduction, that is, the readout rate is 192 kHz×24 bit×6 ch=27.648 Mbps so that if the audio data readout rate $R_{TS2}$ is set to around 30 Mbps, the 6-channel LPCM reproduction, in which each channel comprises 192 kHz/24 bit data, is made possible.

In this way, first the required audio data readout rate $R_{TS2}$ is calculated and each data of the total buffer size [RB1+RB2] and the readout rate from the drive $R_{UD}$ is obtained, and further, time required for jumps of full-stroke, half-stroke, and ⅓-stroke is obtained as the jump time $T_{JUMP}$. It becomes possible to calculate the audio data readout rate $R_{TS2}$ and the image data readout rate $R_{TS1}$ satisfying Equation 2 on the basis of each of these obtained values and the browsable slide show reproduction without discontinuity can be guaranteed by recording the data satisfying the above conditions in the information recording medium.

(2) Processing Example B

Referring to FIG. 24, the processing example B is described. The processing example B is not a processing directly applying Equation 2 but a processing in which a conditional expression, that is:

$$R_{TS1}+R_{TS2}=X \quad [\text{Eq. 3}],$$

in which a total rate value of the image data readout rate $R_{TS1}$ and the audio data readout rate $R_{TS2}$ is a fixed value of [X] or less for enabling a simplified processing is set and a combination of the image data readout rate $R_{TS1}$ and the audio data readout rate $R_{TS2}$ on the basis of the conditional expression Equation 3.

The application of Equation 3 makes it easier to define a condition than Equation 2. In a case where the total rate value [X] is smaller than the read bit rate from the drive $R_{UD}$ in Equation 3, the total buffer size [RB1+RB2] does not change largely in the combination of the $R_{TS1}$ and $R_{TS2}$ allowed in the condition of Equation 3 so that an effect equal to the condition of Equation 2 in which the actual buffer size is fixed is promising.

Figure 24A:
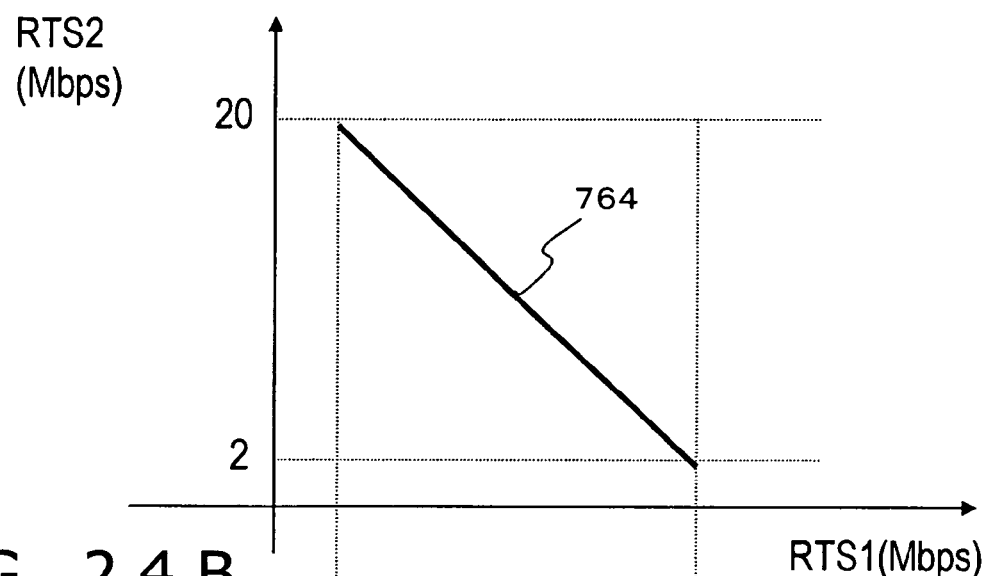
FIG. 24 is a view for explaining a processing example (processing example B) for calculating the combination of the image data readout rate $R_{TS1}$ and the audio data readout rate $R_{TS2}$.

Referring to FIG. 24, the processing adopting Equation 3 is described. FIG. 24A shows a graph of relation between the rates satisfying Equation 3. In the graph, the horizontal axis shows the image data readout rate $R_{TS1}$ Mbps, and the vertical axis shows the audio data readout rate $R_{TS2}$ Mbps. This example shows a case where the total rate value [X] is set to be 22 Mbps. That is, $R_{TS1}+R_{TS2}=22$.

Figure 24B:
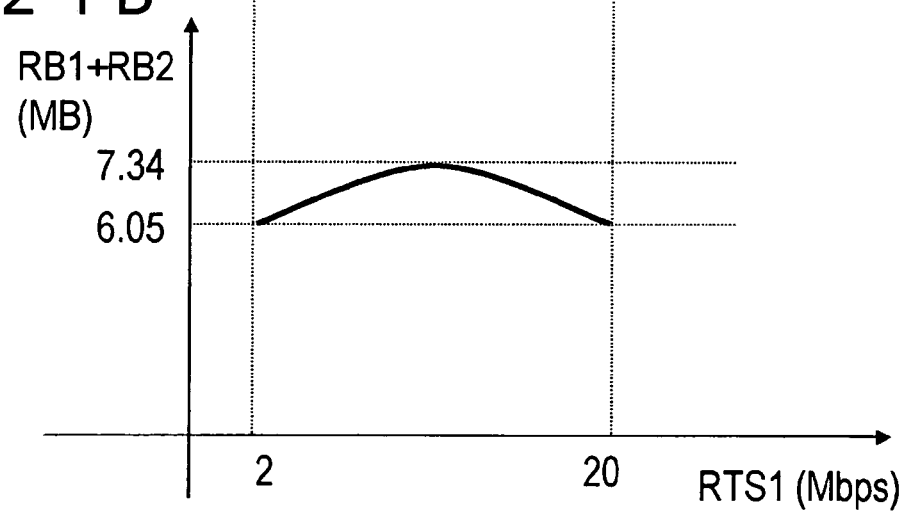

In FIG. 24B, the horizontal axis shows the image data readout rate $R_{TS1}$ Mbps and the vertical axis shows the total buffer size [RB1+RB2] MB. In the processing example, the total buffer size [RB1+RB2] varies between 6.05 and 7.34 to satisfy Equation 2 under the condition of $R_{TS1}+R_{TS2}=22$.

The combination of the image data readout rate $R_{TS1}$ Mbps and the audio data readout rate $R_{TS2}$ Mbps satisfying the equation 4 is any point on a curve 764 in the graph of FIG. 24A and there exist a lot of combinations.

The processing of selecting a specific combination from these many combinations is performed similarly to the above processing example A. However, the equation to be applied is not Equation 2 but Equation 3, and it is possible to easily obtain the combination of the image data readout rate $R_{TS1}$ Mbps and the audio data readout rate $R_{TS2}$.

An assumption is made on, for example, a case of performing an 8-channel LPCM reproduction as a multi-channel surround reproduction. It is assumed that each channel comprises 96 kHz/24 bit data. In this case, the data amount required for reproduction, that is, the readout rate is 96 kHz×24 bit×8 ch=18.432 Mbps so that if the audio data readout rate $R_{TS2}$ is set to around 20 Mbps, the 8-channel LPCM reproduction is made possible.

In this way, first, the required audio data readout rate $R_{TS2}$=about 20 Mbps is obtained and assigned to Equation 3 to calculate the image data readout rate $R_{TS1}$ satisfying Equation 3. This is equivalent to a processing for obtaining the audio data readout rate $R_{TS2}$ and the image data readout rate $R_{TS1}$ corresponding to a point 765 of the curve 764 of the graph in FIG. 25. As can be seen from the figure, in a case where the required audio data readout rate $R_{TS2}$ is smaller than 20 Mbps, it is possible to shorten the reading time of the image data at the time of browsable slide show reproduction by selecting a combination in which the image data readout rate $R_{TS1}$ is large from combinations corresponding to a point on the curve 764 of the graph in FIG. 25.

In the processing example B, similarly to the processing example A, first the required audio data readout rate $R_{TS2}$ is calculated and each data of the total buffer size [RB1+RB2] and the readout rate from the drive $R_{UD}$ is obtained, and further, time required for jumps of full-stroke, half-stroke, and ⅓-stroke is obtained as the jump time $T_{JUMP}$. It becomes possible to calculate the audio data readout rate $R_{TS2}$ and the image data readout rate $R_{TS1}$ satisfying Equation 3 on the basis of each of these obtained values and the browsable slide show reproduction without discontinuity can be guaranteed by recording the data satisfying the above conditions in the information recording medium.

Tables (readout rate setting table) showing the combinations of the audio data readout rate $R_{TS2}$ and the image data readout rate $R_{TS1}$ satisfying Equation 3 and the total buffer size [RB1+RB2] required for the reproducing apparatus in a case of setting the allowable jump distance to full-stroke, half-stroke and ⅓ stroke in correspondence with cases where the total rate value [X] in the expression adopted in the processing example B, that is:

$$R_{TS1}+R_{TS2}=X \quad [\text{Eq. 3}]$$

is set to be:
(a) X=17 Mbps,
(b) X=22 Mbps, and
(c) X=32 Mbps,
are shown in FIGS. 26-28.

It is noted that the table adopts the combination of the audio data readout rate $R_{TS2}$ and the image data readout rate $R_{TS1}$ and does not have a configuration using the combination of the maximum readout rate $R_{MAX1}$ of the image data contained in the record data and the maximum readout rate $R_{MAX2}$ of the audio data contained in the record data. This is because $R_{TS1}$ and $R_{TS2}$ are nothing but the rates of the MPEG-TS (transport stream) and may directly have an effect on the rate limitation of the image data and the audio data.

Figures 25, 26:
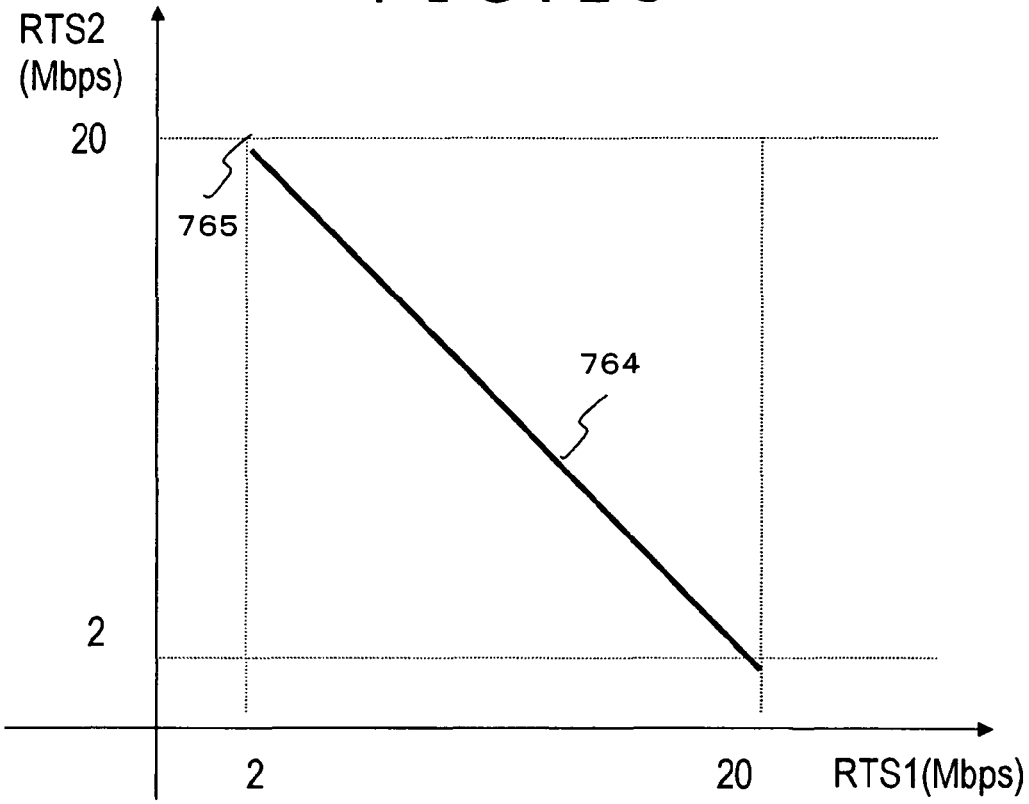
FIG. 25 is a view for explaining a specific example of a rate determining processing in the processing example (processing example B) for calculating the combination of the image data readout rate $R_{TS1}$ and the audio data readout rate $R_{TS2}$.
FIG. 26 is a view showing an example of a readout rate setting table showing data of correspondence between the combination of the audio data readout rate $R_{TS2}$ and the image data readout rate $R_{TS1}$ and the total buffer size [RB1+RB2]

FIG. 26 is a readout rate setting table on the basis of the setting example of $R_{TS1}+R_{TS2}=17$ Mbps. The audio data readout rate $R_{TS2}$ is set within a range of 2-15 Mbps. The table shows the combinations of the audio data readout rate $R_{TS2}$ and the image data readout rate $R_{TS1}$ satisfying Equation 3, that is $R_{TS1}+R_{TS2}=17$ Mbps and the values of the total buffer size [RB1+RB2] required for the reproducing apparatus in the cases of setting the allowable jump distance to full-stroke, half-stroke and ⅓-stroke within the range.

For example, in a case of setting the audio data readout rate $R_{TS2}=15$ Mbps, the image data readout rate $R_{TS1}$ is 2 Mbps. In this case, in the configuration of allowing full-stroke jump, the total buffer size [RB1+RB2] required for the reproducing apparatus is 5.64 MB, in the configuration of allowing half-stroke jump, the total buffer size is 4.59 MB, and in the configuration of allowing ⅓-stroke jump, the total buffer size is 4.09 MB. Subsequently, values of the total buffer size [RB1+RB2] required for the reproducing apparatus in a case of setting each jump distance as the maximum jump distance with regard to each combination of the audio data readout rate $R_{TS2}=15$-2 Mbps and the image data readout rate $R_{TS1}=2$-15 Mbps are obtained.

It is noted that in a case where the total buffer size [RB1+RB2] of the reproducing apparatus is determined in advance, the maximum allowable jump distance in a case of recording content compatible with the browsable slide show in the information recording medium may be determined depending on the table data.

For example, in a case where the total buffer size [RB1+RB2] of the reproducing apparatus is 5.00 MB, if the setting is made within a data area showing the total buffer size being 5.00 or less among the data shown in FIG. 26, that is, within a data area 767 in FIG. 26, the browsable slide show reproduction without discontinuity is made possible in the reproducing apparatus. In other words, in the case of setting the ⅓ stroke as the maximum jump distance, all the combinations of the audio data readout rate $R_{TS2}=15$-2 Mbps and the image data readout rate $R_{TS1}=2$-15 Mbps are allowable.

In addition, in the case of setting the half-stroke as the maximum jump distance, only combinations of the audio data readout rate $R_{TS2}=15$-12 Mbps and the image data readout rate $R_{TS1}=2$-5 Mbps and combinations of the audio data rate $R_{TS2}=5$-2 Mbps and the image data readout rate $R_{TS1}=12$-15 Mbps are allowable.

Furthermore, in the case of setting the full-stroke as the maximum jump distance, no combination of the audio data readout rate $R_{TS2}=15$-2 Mbps and the image data readout rate $R_{TS1}=2$-15 Mbps is allowable.

An entity performing generation of content and data recording is able to set a content mode, that is, the audio data readout rate $R_{TS2}$ and the image data readout rate $R_{TS1}$, and to set a jump distance at the time of data recording on the basis of the table data.

FIG. 27 is a readout rate setting table on the basis of the setting example of $R_{TS1}+R_{TS2}=22$ Mbps. The readout bit rate $R_{TS2}$ of the audio data is set within a range of 2-20 Mbps. The table shows the combinations of the audio data readout rate $R_{TS2}$ and the image data readout rate $R_{TS1}$ satisfying Equation 3, that is $R_{TS1}+R_{TS2}=22$ Mbps and the values of the total buffer size [RB1+RB2] required for the reproducing apparatus in the cases of setting the allowable jump distance to full-stroke, half-stroke and ⅓-stroke within the range.

In the combinations shown in FIG. 27, for example, the combination in the top line, that is, the audio data readout rate $R_{TS2}=20$ Mbps and the image data readout rate $R_{TS1}=2$ Mbps is a combination for realizing reproduction of 8-channel surround audio data composed of data of 96 kHz/24-bit. The readout rate required for the reproduction of the 8-channel surround audio data is 96 kHz×24 bit×8 ch=18.432 Mbps.

The combination in the top line of the audio data readout rate $R_{TS2}=20$ Mbps and the image data readout rate $R_{TS1}=2$ Mbps satisfies the audio data readout rate $R_{TS2}>18.432$ and is a setting example enabling the 8-channel LPCM reproduction.

In this setting, the total buffer size [RB1+RB2] required for the reproducing apparatus in the case of setting the allowable jump distance of full-stroke, half-stroke and ⅓-stroke is 7.42 MB, 6.05 MB and 5.39 MB, respectively. If the total buffer size is equal to or more than these buffer sizes, the browsable slide show reproduction without discontinuity of the 8-channel surround audio data composed of 96 kHZ/24-bit data is made possible.

FIG. 28 is a readout rate setting table on the basis of the setting example of $R_{TS1}+R_{TS2}=32$ Mbps. The read bit rate $R_{TS2}$ of the audio data is set within a range of 2-30 Mbps. The table shows the combinations of the audio data readout rate $R_{TS2}$ and the image data readout rate $R_{TS1}$ satisfying Equation 3, that is, $R_{TS1}+R_{TS2}=32$ Mbps and the values of the total buffer size [RB1+RB2] required for the reproducing apparatus in the cases of setting the allowable jump distance to full-stroke, half-stroke and ⅓-stroke within the range.

In the combinations shown in FIG. 28, for example, the combination in the top line, that is, the audio data readout rate $R_{TS2}=30$ Mbps and the image data readout rate $R_{TS1}=2$ Mbps is a combination for realizing reproduction of 6-channel surround audio data composed of data of 192 kHz/24-bit. The readout rate required for the reproduction of the 6-channel surround audio data is 192 kHz×24 bit×6 ch=27.648 Mbps.

The combination in the top line of the audio data readout rate $R_{TS2}=30$ Mbps and the image data readout rate $R_{TS1}=2$ Mbps satisfies the audio data readout rate $R_{TS2}>27.648$ and is a setting example enabling the 6-channel LPCM reproduction.

In this setting, the total buffer size [RB1+RB2] required for the reproducing apparatus in the case of setting the allowable jump distance of full-stroke, half-stroke and ⅓-stroke is 11.40 MB, 9.28 MB and 8.27 MB, respectively. If the total buffer size is equal to or more than these buffer sizes, the browsable slide show reproduction without discontinuity of the 6-channel surround audio data composed of 192 kHZ/24-bit data is made possible.

In the case of the processing example A, that is, the case where Equation 2 is directly applied, it is also possible to generate a table similar to those shown in FIGS. 26-28, that is, the readout rate setting table, and it is also possible to calculate the total buffer size [RB1+RB2] required for the reproducing apparatus depending on the table to set a maximum allowable jump distance to be set at the time of recording content. In both of the processing examples A and B, it is possible to calculate the total buffer size [RB1+RB2] required for the reproducing apparatus not adopting the table but adopting Equation 2 or Equation 3 to set the maximum allowable jump distance to be set at the time of recording content.

Figure 29:
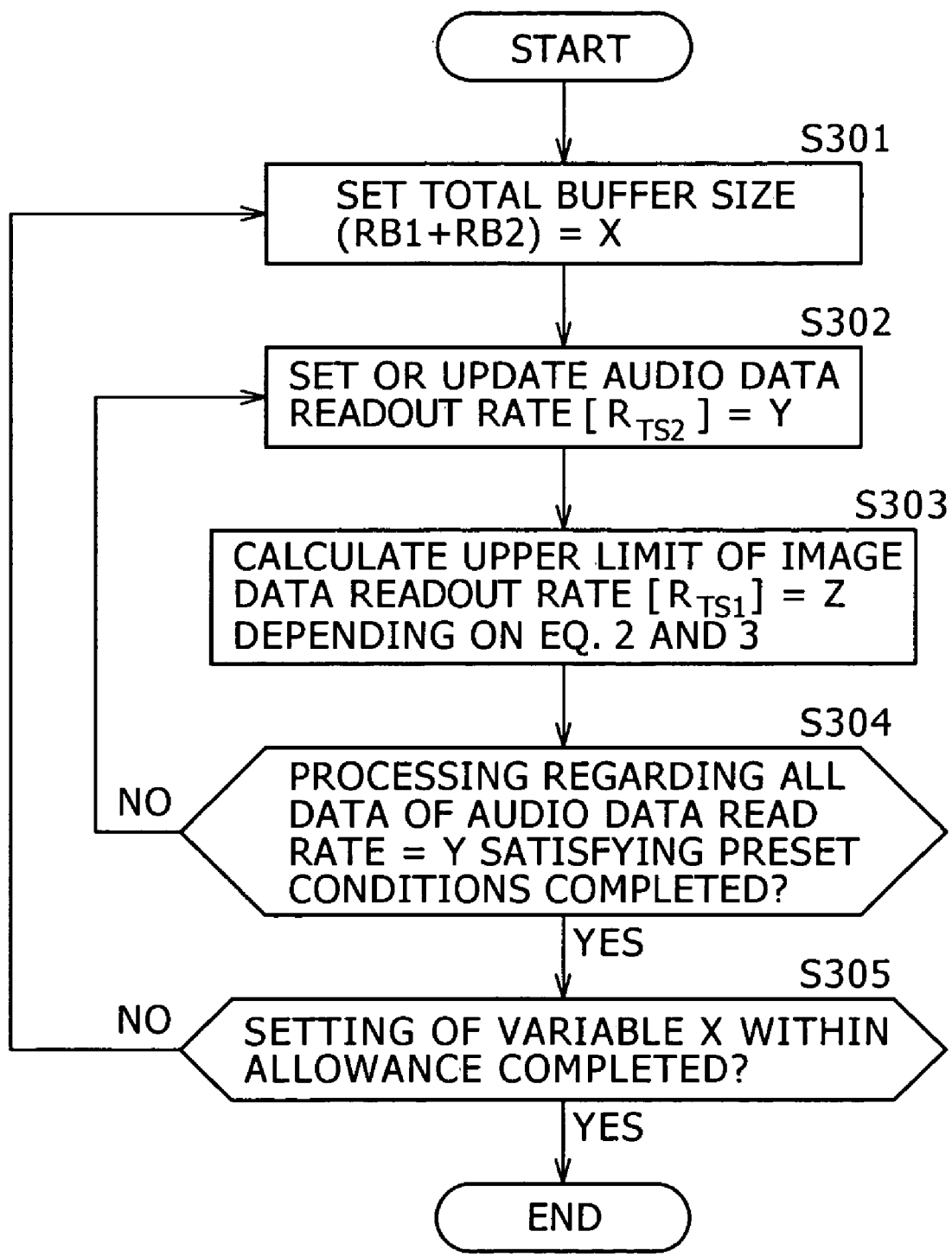
FIG. 29 is a flowchart for explaining a processing of generating the readout rate setting table.

A processing of generating the readout rate setting table will be described with reference to a flowchart shown in FIG. 29. First, in step S301, the total buffer size [RB1+RB2] is set to [X]. [X] is a value defined between the upper limit and the lower limit of the total buffer size preliminarily defined. In step S302, the value of the audio data readout rate $R_{TS2}$ is set to a value [Y] defined between the upper limit and the lower limit of the audio data readout rate $R_{TS2}$ preliminarily defined.

In step S303, an upper limit value [Z] of the settable image data readout rate $R_{TS1}$ with regard to the audio data readout rate $R_{TS2}=Y$ is calculated. This calculation processing adopts Equation 2 in the above processing example A and Equation 3 in the processing example B.

In step S304, it is judged whether or not a processing regarding to all data (2-20 Mbps, for example) of the preset audio data readout rate $R_{TS2}=Y$, and in a case where the processing is not completed, the audio data readout rate $R_{TS2}=Y$ is updated (every 1 Mbps, for example) in step S302, and the processing of step S303 is repetitively carried out.

In step S304, in a case where it is judged that the processing regarding all data (2-20 Mbps, for example) of the preset audio data readout rate $R_{TS2}=Y$ is completed, the process goes to step S305 to judge whether or not the total buffer size [RB1+RB2]=X is calculated within a range defined between the upper limit and the lower limit of the predefined total buffer size. In a case where there is an unprocessed value, the process goes back to step S301 to update the total buffer size [RB1+RB2]=X and the processing after step S302 is repetitively carried out.

For the values of the total buffer size RB1+RB2=X and the audio data readout rate $R_{TS2}=Y$, only values requiring calculation may be selected to perform respective updating processing. In accordance with the processing shown in the flowchart, the combination of the total buffer size [RB1+RB2]=X, the audio data readout rate $R_{TS2}=Y$, and the image data readout rate $R_{TS1}=Z$ is determined, and a readout rate setting table such as those shown in FIGS. 26-28 is generated.

In the readout rate setting tables shown in FIGS. 26-28, the data configuration shows the total buffer size [RB1+RB2] in the cases of setting the maximum jump distance to full-stroke, half-stroke and ⅓ stroke, respectively. On condition that the jump time $T_{JUMP}$ for cases setting various maximum jump distances are respectively calculated to assign the calculation result to satisfy Equation 2, if a processing of determining an allowable setting range of values of the total buffer size [RB1+RB2]=X and the audio data readout rate $R_{TS2}=Y$ is carried out at the time of executing the flow shown in FIG. 29, it becomes possible to calculate data in correspondence with each maximum jump distance.

(3) Contents Authoring and Content Recording Processing

Next, content authoring and content recording processing for cases adopting the above-described processing examples A and B, respectively, will be described.

Figure 30:
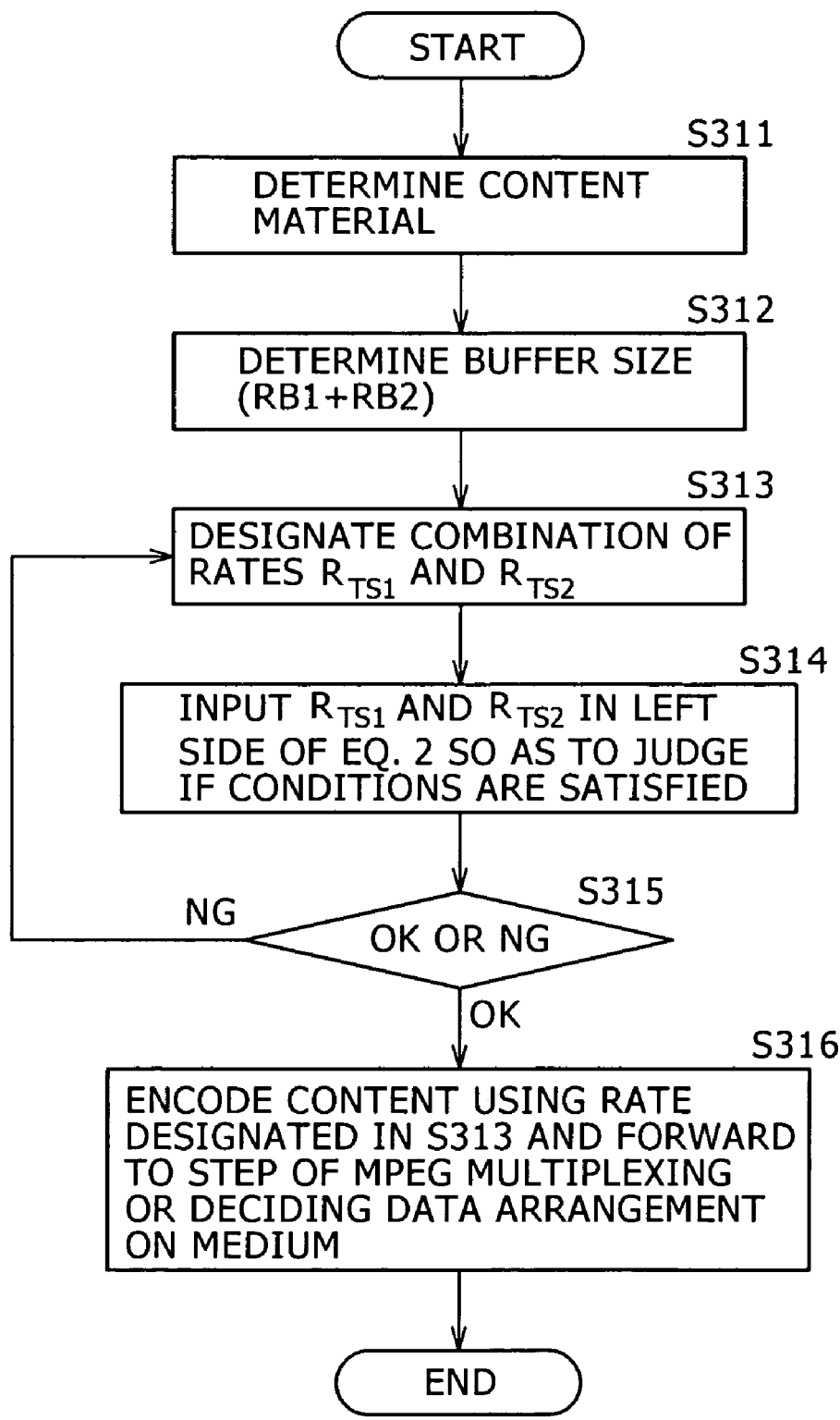
FIG. 30 is a flowchart showing a processing of calculating the image data readout rate $R_{TS1}$ and the audio data readout rate $R_{TS2}$ depending on Equation 2.

First, in accordance with the processing example A, that is, Equation 2 described above, two processing examples for calculating the image data readout rate $R_{TS1}$ and the audio data readout rate $R_{TS2}$ will be described with reference to flowcharts shown in FIG. 30 and FIG. 31. The processing flow of FIG. 30 is the one showing processing steps for a case where the audio data readout rate $R_{TS2}$ or the image data readout rate $R_{TS1}$ is preliminarily determined. The processing flow of FIG. 31 is the one showing processing steps for a case where these rates have not been determined yet.

First, referring to FIG. 30, content authoring and content recording processing in the case where the audio data readout rate $R_{TS2}$ or the image data readout rate $R_{TS1}$ is determined in advance are described.

In step S311, a content material is determined. In other words, content to be recorded in an information recording medium is determined. Herein, the content means content compatible with the browsable slide show. Next, in step S312, the total buffer size [RB1+RB2] of the reproducing apparatus is acquired. It is assumed that the total buffer size is preliminarily determined depending on the reproducing apparatus. For example, the buffer size of each device is acquired from a table recording total buffer sizes of respective devices. In specific, there may be a table in which the total buffer size [RB1+RB2] of each device is determined to be Ba, Bb or Bc for (1) a total buffer size of a mobile device=Ba (MB), (2) a total buffer size of a mobile reproducing apparatus (Player)= Bb (MB) and (3) a total buffer size of a high-end device=Bc (MB), or the like.

Next, in step S313, a combination of the audio data readout rate $R_{TS2}$ and the image data readout rate $R_{TS1}$ is determined. For example, in a case where each channel is required to perform 8-channel LPCM reproduction as a multi-channel surround reproduction composed of 96 kHz/24-bit data, the audio data readout rate $R_{TS2}$ of about 20 Mbps is necessary. In addition, in a case of 6-channel LPCM reproduction composed of 192 kHz/24-bit data, the audio data readout rate $R_{TS2}$ of about 30 Mbps is necessary. Similarly, with regard to the image data readout rate $R_{TS1}$, a necessary readout rate which corresponds to authoring content is set.

In step S314, data of the combination of the set audio data readout rate $R_{TS2}$ and image data readout rate $R_{TS1}$ and the total buffer size acquired in step S312 are input to Equation 2 and whether or not they satisfy Equation 2 is judged. In a case where Equation 2 is not satisfied ("NO" in step S314), the process goes back to step S313 to reset the necessary readout rate corresponding to the authoring content, that is, the combination of the audio data readout rate $R_{TS2}$ and the image data readout rate $R_{TS1}$.

The processing step is carried out until a value satisfying Equation 2 is obtained, and in a case where the value satisfying Equation 2 is obtained at last ("YES" in step S314), the process goes to step S315 to record the content data having the combination of the audio data readout rate $R_{TS2}$ and the image data readout rate $R_{TS1}$ satisfying Equation 2 in the information recording medium. The data recording processing on the information recording medium includes an encoding processing of content, an MPEG multiplexing processing, and a determining processing of data arrangement conditions.

On determining the data arrangement conditions, for example, it is necessary to record audio and image data after defining the maximum allowable jump distance (full-stroke, half-stroke, ⅓-stroke). It is necessary to set the maximum allowable jump distance to a jump distance satisfying Equation 2 when the jump time $T_{JUMP}$ is input to Equation 2.

The recording of the content in the information recording medium in this way realizes content recording satisfying Equation 2, and enables reproduction without data discontinuity in a case of browsable slide show reproduction in the reproducing apparatus.

Figures 31A, 31B:
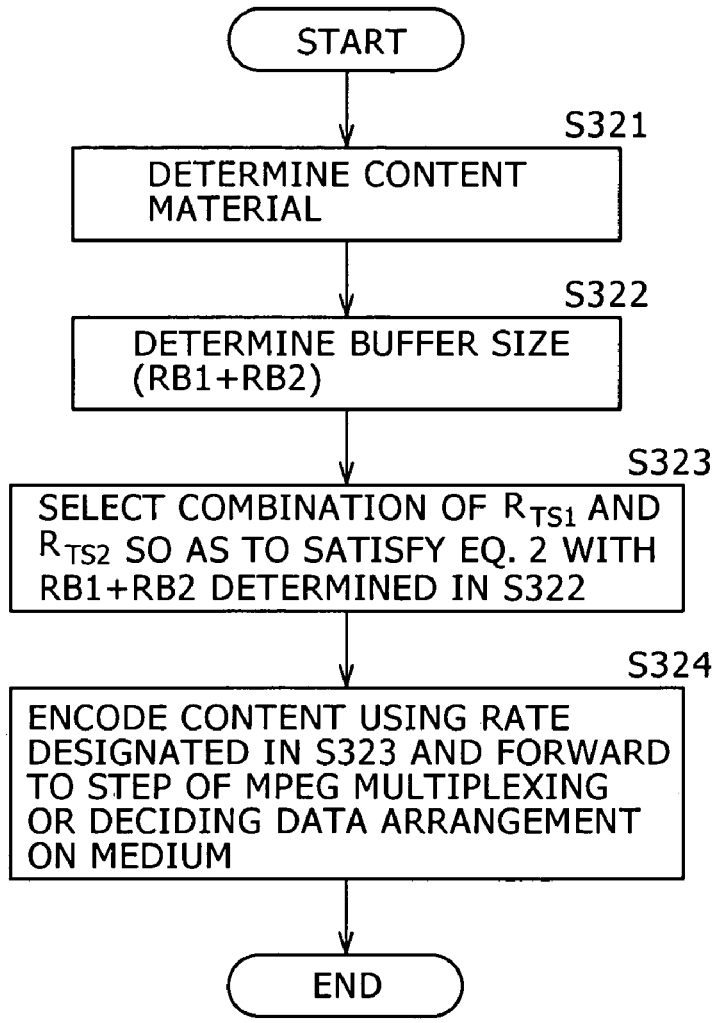
FIG. 31A is a flowchart showing a processing of calculating the image data readout rate $R_{TS1}$ and the audio data readout rate $R_{TS2}$ depending on Equation 2.
FIG. 31B is a table listing combinations of the image data readout rate $R_{TS1}$ and the audio data readout rate $R_{TS2}$.

Next, referring to FIG. 31A, content authoring and content recording processing in the case where the audio data readout rate $R_{TS2}$ and the image data readout rate $R_{TS1}$ have not been determined are described.

In step S321, a content material is determined. In other words, content compatible with the browsable slide show, which is to be recorded in an information recording medium, is determined. Next, in step S322, the total buffer size [RB1+ RB2] of the reproducing apparatus is acquired. The total buffer size is acquired in the similar way to the above processing example, that is, using a table or the like, in which the total buffer size [RB1+RB2] of each device is determined to be Ba, Bb or Bc for (1) a total buffer size of a mobile device=Ba (MB), (2) a total buffer size of a mobile reproducing apparatus (Player)=Bb (MB) and (3) a total buffer size of a high-end device=Bc (MB).

In step S323, a combination of the audio data readout rate $R_{TS2}$ and the image data readout rate $R_{TS1}$ is selected in accordance with Equation 2 or selected a readout rate setting table satisfying Equation 2, that is, a readout rate setting table in which the audio data readout rate $R_{TS2}$, the image data readout rate $R_{TS1}$ and the total buffer size [RB1+RB2] are set. For example, the combination of the audio data readout rate $R_{TS2}$ and the image data readout rate $R_{TS1}$ satisfying Equation 2 in the case of total buffer size [RB1+RB2]=X, there exist a lot of combinations, such as the image data readout rate $R_{TS1}$=2-20 and the audio data readout rate $R_{TS2}$=20-2 shown in FIG. 31B, and it is possible to select a desired one from them.

For example, in a case where each channel is required to perform 8-channel LPCM reproduction as a multi-channel surround reproduction composed of 96 kHz/24-bit data, since the audio data readout rate [$R_{TS2}$] of about 20 Mbps is necessary, a combination of the audio data readout rate $R_{TS2}$=20 Mbps and the image data readout rate $R_{TS1}$=2 Mbps may be selected.

Next, in step S324, content data having the combination of the audio data readout rate $R_{TS2}$ and the image data readout rate $R_{TS1}$ satisfying Equation 2 set in step S323 is recorded in the information recording medium. The data recording processing on the information recording medium includes an encoding processing of content, an MPEG multiplexing processing, and a determining processing of data arrangement conditions. On determining the data arrangement conditions, similarly to the flow described with reference to FIG. 30 above, for example, it is necessary to record audio and image data after defining the maximum allowable jump distance (full-stroke, half-stroke, ⅓-stroke).

Figure 32:
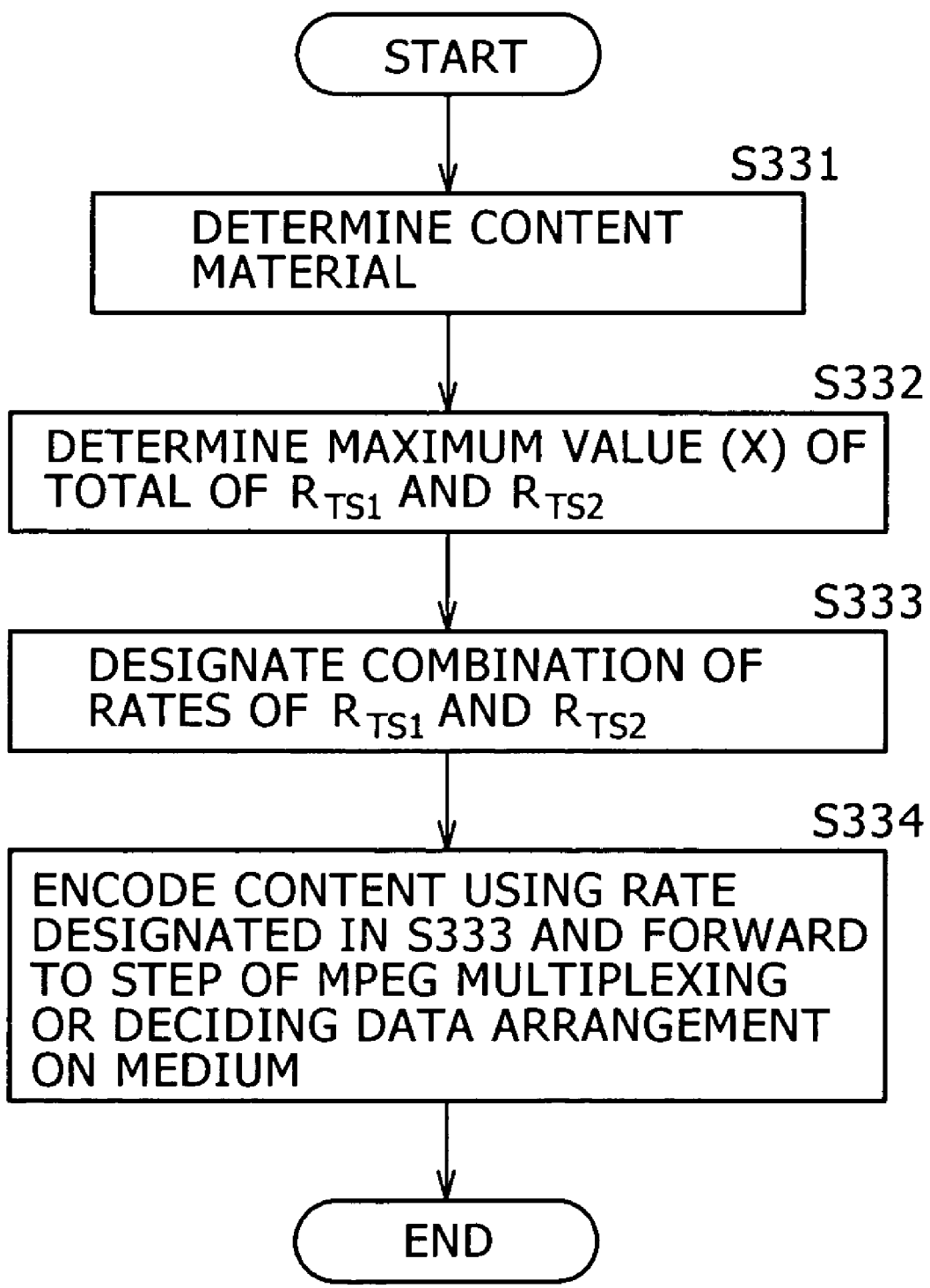
FIG. 32 is a flowchart showing a processing of calculating the image data readout rate $R_{TS1}$ and the audio data readout rate $R_{TS2}$ depending on Equation 3.

Next, with reference to a flowchart shown in FIG. 32, content authoring and content recording processing including a processing of determining the image data readout rate $R_{TS1}$ and the audio data readout rate $R_{TS2}$ in accordance with the processing example B, that is, the above Equation 3 [$R_{TS1}$+$R_{TS2}$<=X]

In step S331, a content material is determined. In other words, content compatible with the browsable slide show, which is to be recorded in an information recording medium, is determined. In step S332, a maximum value [X] of the total value of the audio data readout rate $R_{TS2}$ and the image data readout rate $R_{TS1}$.

For example, a case of $R_{TS1}$+$R_{TS2}$=X=17 Mbps corresponds to the readout rate setting table of FIG. 26, a case of $R_{TS1}$+$R_{TS2}$=X=22 Mbps corresponds to the readout rate setting table of FIG. 27 and a case of $R_{TS1}$+$R_{TS2}$=X=32 Mbps corresponds to the readout rate setting table of FIG. 28.

In step S333, the combination of the audio data readout rate $R_{TS2}$ and the image data readout rate $R_{TS1}$ is determined in accordance with the value [X] determined in step S332. This is determined as a combination satisfying Equation 3 and it is possible to select from any of the tables in FIGS. 26-28, for example, in accordance with the value [X].

Next, in step S334, content data having the combination of the audio data readout rate $R_{TS2}$ and the image data readout rate $R_{TS1}$ satisfying Equation 3 set in step S333 is recorded in the information recording medium. The data recording processing on the information recording medium includes an encoding processing of content, an MPEG multiplexing processing, and a determining processing of data arrangement conditions. On determining the data arrangement conditions, similarly to the flows corresponding to the processing example A, described with reference to FIG. 30 and FIG. 31A above, for example, it is necessary to record audio and image data after defining the maximum allowable jump distance (full-stroke, half-stroke, ⅓-stroke).

The recording of the content in the information recording medium in this way realizes content recording satisfying Equation 2, and enables reproduction without data discontinuity in a case of browsable slide show reproduction in the reproducing apparatus.

Next, with reference to FIG. 33 and FIG. 34, functional structure of a data processing apparatus performing a processing of determining record data configuration of the image data and audio data applied to the above browsable slide show will be described.

Figure 33:
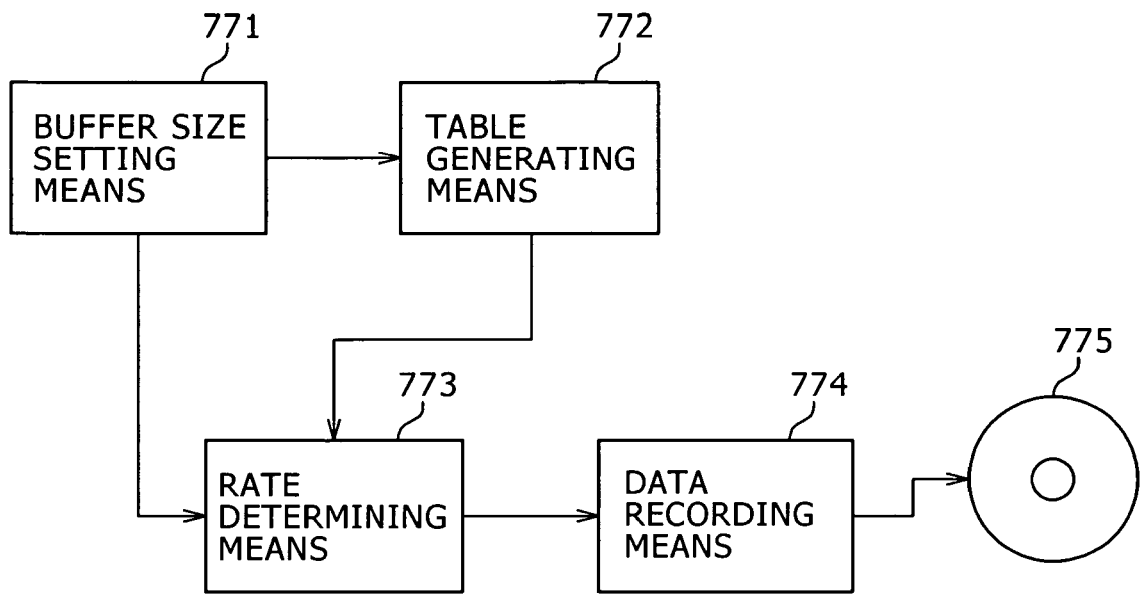
FIG. 33 is a block diagram for explaining a functional structure of a data processing apparatus performing a processing of determining record data configuration of the image data and the audio data applied to the above browsable slide show.

FIG. 33 shows a functional structure of the data processing apparatus performing a processing of determining the image data and audio data by adopting the processing example A, that is, Equation 2. The data processing apparatus has buffer size setting means 771, table generating means 772, rate determining means 773 and data recording means 774, as shown in FIG. 33.

The buffer size setting means 771 sets a total buffer size of the image data and the audio data in a reproducing apparatus performing a browsable slide show reproduction processing as a fixed value. For example, total buffer size [RB1+RB2] information of a reproduction target device, such as (1) a total buffer size of a mobile device=Ba (MB), (2) a total buffer size of a mobile reproducing apparatus (Player)=Bb (MB) and (3) a total buffer size of a high-end device=Bc (MB), is acquired.

The table generating means 772 generates a table listing correspondence between a combination of an image data readout rate and an audio data readout rate satisfying the above Equation 2 and a total buffer size of the reproducing apparatus. For example, a readout rate setting table having data configuration shown in FIGS. 26-28.

The rate determining means 773 determines the image data readout rate and the audio data readout rate depending on each of the total buffer size of the reproducing apparatus, the maximum jump time permitted for data reproduction and the data readout rate in the reproducing apparatus. The rate determining means 773 determines the readout rates of the image data and the audio data by adopting the rate setting table generated by the table generating means 772 or determines the readout rates as values satisfying the above Equation 2 without using the rate setting table.

The data recording means 774 executes a processing of recording the image data and the audio data having a data format matching the readout rates determined by the rate determining means 773 on an information recording medium 775 or a master information recording medium.

Figure 34:
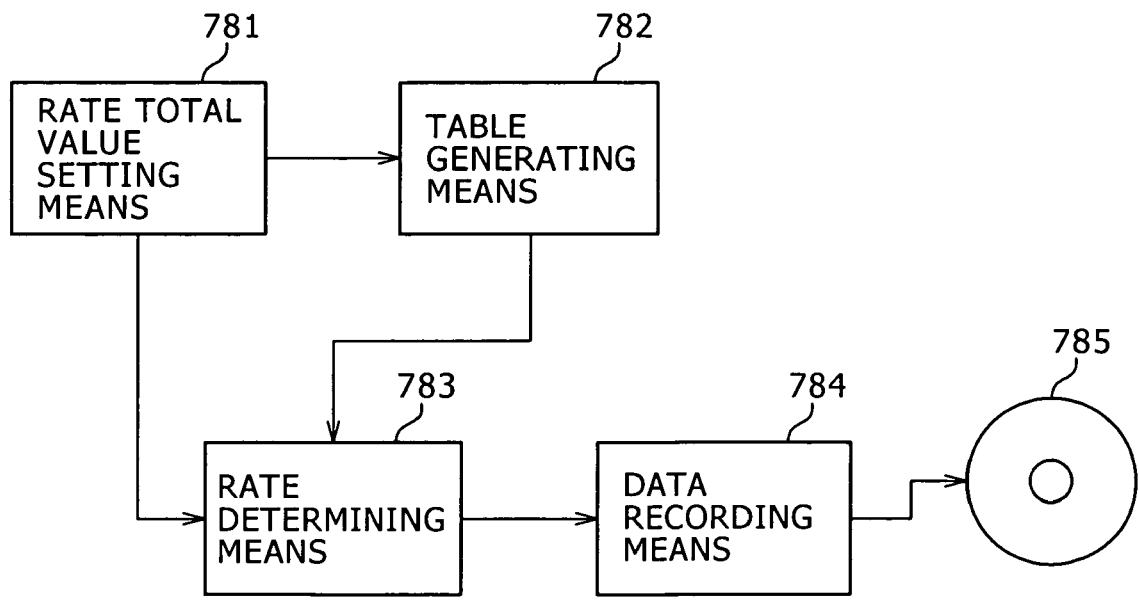
FIG. 34 is a block diagram for explaining a functional structure of a data processing apparatus performing a processing of determining record data configuration of the image data and the audio data applied to the above browsable slide show.

FIG. 34 shows a functional structure of the data processing apparatus performing a processing of determining the image data and the audio data by adopting the processing example B, that is, Equation 3. The data processing apparatus has rate total value setting means 781, table generating means 782, rate determining means 783 and data recording means 784, as shown in FIG. 34.

The rate total value setting means 781 sets a rate total value X as a sum of an image data readout rate and an audio data readout rate applied to a browsable-slide show.

The table generating means 782 generates a table satisfying Equation 3, and further, listing correspondence between a combination of the image data readout rate and the audio data readout rate satisfying Equation 3 and the total buffer size of the reproducing apparatus, for example, a readout rate setting table having data configuration shown in FIGS. 26-28.

The rate determining means 783 determines the image data readout rate $R_{TS1}$ and the audio data readout rate $R_{TS2}$ depending on Equation 3 or a table record set in accordance with Equation 3. At the time of this determination, a process of determining the image data readout rate $R_{TS1}$ and the audio data readout rate $R_{TS2}$ satisfying the expression: $R_{TS1}$+$R_{TS2}$<=X is carried out.

The data recording means 784 executes a processing of recording image data and audio data having a data format matching the image data readout rate and the audio data readout rate determined by the rate determining means 783 on an information recording medium 785 or a master information recording medium.

The information recording medium thus formed is configured to be an information recording medium, which comprises a data recording configuration having data arrangement in which image data and audio data corresponding to the image data readout rate and the audio data readout rate determined depending on each of a total buffer size of the image data and the audio data of a reproducing apparatus executing a browsable slide show reproduction processing, a maximum jump time allowed for data reproduction and a data readout rate in the reproducing apparatus have a jump distance in which a jump processing at reproduction is executable within the maximum jump time.

In specific, the information recording medium is configured to have data record configuration having the combination of the image data readout rate and the audio data readout rate in which the readout rates satisfy the above expression (Equation 2 or Equation 3).

[6. Configuration of Reproducing Apparatus]

Next, one embodiment of the configuration of the data processing apparatus that performs the above data processing and further realizes the data recording and reproduction processing performed with the information recording medium mounted is now described with reference to FIG. 35. The data processing apparatuses of FIG. 20 and FIGS. 33-34 are shown in the form of a block diagram for illustrating the functions of the present invention, and the data processing apparatus of FIG. 35 is shown in the form of a view for illustrating a specific hardware configuration of performing the functions shown in FIG. 20.

A data processing apparatus 800 has a drive 890 that drives an information recording medium 891 to perform the input and the output of a data recording reproduction signal, a CPU 870 that performs the data processing in conformity with various programs, a ROM 860 available as a storage area for the programs and the parameters etc., a memory 880, an input/output I/F 810 that performs the input and the output of a digital signal, an input/output I/F 840 that performs the input and the output of an analog signal and has an A/D and D/A converter 841, an MPEG codec 830 that performs the encoding and the decoding of the MPEG data, TS/PS processing means 820 that performs the TS (Transport Stream)/PS (Program Stream) processing, and encryption processing means 850, such as an encryption LSI, that performs various encryption processing, and each block is connected to a bus 801.

An operation at the time of the data recording is firstly described. Two cases, that is, a case of digital signal input and a case of analog signal input case, are assumed to be available for the data to be recorded.

In the case of the digital signal, the digital signal is supplied through the input/output I/F 810 for the digital signal, and the data obtained through an appropriate encryption processing using the encryption processing means 850 at need is stored in the information recording medium 891. Alternatively, when storing the data through a change of the data format of the supplied digital signal, the data is stored in the information recording medium 891 through the appropriate encryption processing using the encryption processing means 850 after the change into a storage data format using the MPEG codec 830, the CPU 870, and the TS/PS processing means 820.

In the case of the analog signal, the analog signal supplied to the input/output I/F 840 is converted into the digital signal using the A/D converter 841, and is further changed, using the MPEG codec 803, into a codec available at the time of the recording. Then, the change into AV multiplexed data available as the format of the record data is performed using the TS/PS processing means 820, and the data obtained through the appropriate encryption processing using the encryption processing means 850 at need is stored in the recording medium 891.

In the case of the recording of the contents composed of the AV stream data formed with the MPEG-TS data, for instance, the contents are encrypted with the encryption processing means 850 using a unit key after the segmentation of the content into content management units (content protection system (CPS) units), and are then recorded in the recording medium 891 through the drive 890.

The processing applied to the case of the data reproduction from the information recording medium is now described. When performing the reproduction of the AV stream data composed of the MPEG-TS data specified as the content, for instance, an identification of the content management unit is applied to the data read from the information recording medium 891 through the drive 890. Then, the processing of acquiring the unit key corresponding to the identified contents management unit is performed, leading to a separation of the data into the Video, the Audio, and the subtitle etc. using the TS (Transport Stream)/PS (Program Stream) processing means 820 through a decryption by the encryption processing means 850 based on the acquired unit key.

The digital data decoded with the MPEG decoder 830 is outputted through the conversion into the analog signal with the D/A converter 841 included in the input/output I/F 840. Alternatively, in a case of the digital output, the MPEG-TS data decoded with the encryption processing means 850 is outputted as the digital data through the input/output I/F 810. The output in this case is provided for a digital interface such as IEEE 1394, an Ethernet cable, and a wireless LAN. It is noted that, in a case of supporting a network connection function, the input/output I/F 810 provides a function of the network connection. Further, in a case of the output through the change of the data into a format acceptable to an output destination apparatus within the reproduction apparatus, the rate change and codec change processing is once applied in the MPEG codec 830 to the Video, the Audio and the subtitle etc. that are obtained through the separation by the TS/PS processing means 820, in which case, the data obtained by being multiplexed again with the MPEG-TS and MPEG-PS etc. by the TS/PS processing means 820 is outputted through the digital input/output I/F 810. Alternatively, the CPU 870 may be used to output the data through the digital input/output I/F 810 after the change into the codec and the multiplexed file other than the MPEG data.

The reproducing apparatus of the present invention is configured as, for example, a reproducing apparatus for executing a reproduction processing of an information recording medium in which record data including an image data clip containing image data and an audio data clip containing audio data, applied to a browsable slide show performing an audio reproduction processing in parallel with a consecutive reproduction of a still image is recorded at a predetermined interval. The reproducing apparatus comprises an image data buffer which stores read image data from the information recording medium, an audio data buffer which stores read audio data from the information recording medium and reproducing means which acquires data from the image data buffer and the audio data buffer to perform a reproducing processing. The reproducing apparatus is configured as the one having a controlling unit which executes data read control to start a jump operation at an audio data recording position at the predetermined interval in the information recording medium in a case where the image data buffer holds image data at a maximum. Execution of such data read control realizes browsable slide show reproduction without discontinuity and effectively utilizing the buffer.

It is noted that the program that implements the reproduction and recording processing is stored in the ROM 860, and in the course of a running of the program, the memory 880 is used for the storage of the parameters and the data and also as a work area at need. It is noted that, while FIG. 35 has described the apparatus configuration capable of performing the data recording and reproduction, an apparatus that provides only the reproduction function and an apparatus that provides only the recording function are supposed to be also configurable, and the present invention may be also applied to these apparatuses.

In the foregoing, the present invention has been described in detail with reference to the specific embodiments. However, it is to be understood that it is obvious to those skilled in the art that modifications and changes of the embodiments are possible without departing from the scope of the present invention. That is, it is to be understood that a disclosure of the present invention is given in the form of illustrations and not restrictive. It is also to be understood that bounds of claims as set forth in the beginning should be construed to define the scope of the invention.

It is noted that a series of the processing having been described in the specification may be performed with the hardware, the software or a combination of the hardware with the software. In the case of the processing with the software, the program containing the processing sequence is allowed to run through an installation of the program into the memory in the computer incorporated in the dedicated hardware, or into a general-purpose computer capable of performing various processing.

The program may be contained preliminarily in the recording medium such as the hard disc and the ROM (Read Only Memory), for instance. Alternatively, the program may be also contained (recorded) temporarily or permanently in a removable recording medium such as a flexible disc, a CD-ROM (Compact Disc Read Only Memory), a MO (Magneto optical) Disc, a DVD (Digital Versatile Disc), a magnetic disc and a semiconductor memory. The removable recording medium described above may be provided as so-called package software.

Incidentally, in addition to the installation from the above removable recording medium into the computer, the program may be radio-transferred from a download site into the computer, or wire-transferred to the computer through the network such as the LAN (Local Area Network) and the Internet, in which case, the computer may receive the program transferred as described above to install into the incorporated recording medium such as the hard disc.

It is noted that the various processing stated in the specification may be performed not only in time series according to the description but also in parallel or individually depending on the processing capability of the apparatus that performs the processing, or at need. Further, the system stated in the specification is in the form of a logical aggregate composed of more than one unit, and the units contained in the logical aggregate are not always incorporated in an identical casing.

As has been described above, according to the configuration of the present invention, the configuration of individually recording the image data clip and the audio data clip in the disc such as the Blu-ray disc and the DVD disc, for instance, adopts the configuration of determining the allowable range of the image data clip-to-audio data clip jump required at the time of the data reading that takes place in the so-called browsable slide show of performing the audio reproduction processing in parallel with the consecutive reproduction of the still image, thereby determining, on the basis of the determined allowable jump range information, the arrangement conditions of the data stored in the information recording medium, so that the seamless reproduction is made possible without causing any discontinuity of the data at the time when performing the browsable slide show for the parallel reproduction of the audio and the still image.

Further, the present invention adopts the configuration of calculating, on the basis of the determined allowable jump range information, the time required for the jump, thereby determining, on the basis of the calculated required jump time, the size of the image data buffer containing the image data read from the information recording medium and the size of the audio data buffer containing the audio data, so that the configuration of performing the seamless reproduction in the browsable slide show may be realized with the small buffer that meets the minimum requirements.

In addition, according to the configuration of the present invention, in a processing of determining a record data configuration of image data and audio data applied to a browsable slide show performing an audio reproduction processing in parallel with a consecutive reproduction of a still image, the total buffer size of the image data and the audio data of the reproducing apparatus performing the browsable slide show is set to be a fixed value, and the image/audio readout rate are determined depending on each of the total buffer size of the reproducing apparatus, the maximum jump time permitted for data reproduction and the data readout rate in the reproducing apparatus. Accordingly, it becomes possible to record and reproduce data with a rate freely selected from a plurality of combinations of the image data readout rate and the audio data readout rate satisfying conditions for reproduction without data discontinuity, and thus, a configuration of recording/reproducing high quality data, such as 8-channel LPCM data, may be realized.

In addition, according to the configuration of the present invention, in a processing of determining a record data configuration of image data and audio data applied to a browsable slide show performing an audio reproduction processing in parallel with a consecutive reproduction of a still image, the total value of the image data readout rate and the audio data readout rate is set to be a fixed value [X] and the image/audio data readout rate is determined depending on the set condition. Accordingly, it becomes possible to record and reproduce data with a rate freely selected from a plurality of combinations of the image data readout rate and the audio data readout rate satisfying conditions for reproduction without data discontinuity, and thus, a configuration of recording/reproducing high quality data, such as 8-channel LPCM data, may be realized.

What is claimed is:

1. A reproducing apparatus for executing a reproduction processing of an information recording medium in which a source packet stream including an image data clip containing image data and an audio data clip containing audio data applied to a browsable slide show performing an audio reproduction processing in parallel with a consecutive reproduction of a still image is recorded at a predetermined interval by alternately jumping from the image data clip to the audio data clip to read data from the image data clip and the audio data clip after each alternate jump, the allowable jump range being a jump range from a point of reading image data in the image data clip to a point of reading audio data in the audio data clip, said apparatus comprising:
- an image data buffer of minimum size RB1 which stores the image data read from said information recording medium;
- an audio data buffer of minimum size RB2 which stores the audio data read from said information recording medium;
- reproducing means which acquires data from said image data buffer and said audio data buffer to execute a reproduction processing; and
- a control unit which executes data read control to start a jump operation at an audio data recording position at the predetermined interval in said information recording medium in a case where said image data buffer holds image data at a maximum, wherein $$RB1 >= R_{MAX1} \times \left(2T_{JUMP} + \frac{RB2}{R_{UD} - R_{MAX2}}\right)$$

$$RB2 >= R_{MAX2} \times \left(2T_{JUMP} + \frac{RB1}{R_{UD} - R_{MAX1}}\right),$$

in which $T_{JUMP}$=a Jump time in the alternately jumping,
$R_{UD}$=a Bit rate of reading the source packet stream from the recording medium,
$R_{MAX1}$=a maximum read bit rate of the image data, and
$R_{MAX2}$=a maximum read bit rate of the audio data.

* * * * *